(12) United States Patent  
Dayan et al.

(10) Patent No.: US 10,474,339 B2  
(45) Date of Patent: Nov. 12, 2019

(54) SYSTEM AND METHOD FOR MARKET VISUALIZATION

(71) Applicants: Emmanuel Dayan, Saint-Cloud (FR); Florent Myara, Paris (FR); Serge Lejan, Paris (FR)

(72) Inventors: Emmanuel Dayan, Saint-Cloud (FR); Florent Myara, Paris (FR); Serge Lejan, Paris (FR)

(73) Assignee: SISMO SAS, Paris (FR)

( * ) Notice: Subject to any disclaimer, the term of this patent is extended or adjusted under 35 U.S.C. 154(b) by 262 days.

(21) Appl. No.: 15/344,228

(22) Filed: Nov. 4, 2016

(65) Prior Publication Data

US 2018/0129365 A1    May 10, 2018

(51) Int. Cl.
*G06F 3/0484*    (2013.01)
*G06Q 40/04*     (2012.01)
*G06F 16/248*    (2019.01)

(52) U.S. Cl.
CPC ........ *G06F 3/04847* (2013.01); *G06F 16/248* (2019.01); *G06Q 40/04* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,583,794 B1* | 6/2003 | Wattenberg | ....... | G06F 17/30994 707/999.102 |
| 8,145,544 B2* | 3/2012 | Leal | ....... | G06Q 30/02 705/26.1 |
| 8,806,321 B2* | 8/2014 | Helfman | ....... | G06T 5/009 715/212 |
| 8,910,084 B2* | 12/2014 | Helfman | ....... | G06T 11/206 715/854 |
| 9,032,314 B2* | 5/2015 | Mital | ....... | G06F 3/04847 715/763 |
| 9,372,592 B1* | 6/2016 | Goodspeed | ....... | G06F 3/0481 |

(Continued)

*Primary Examiner* — Hien L Duong

(74) *Attorney, Agent, or Firm* — IPSILON USA, LLP

(57) ABSTRACT

A system for visualization of financial market comprises a data processor for receiving financial data belonging to a plurality of stocks from an external data source. The financial data includes a plurality of available indicator values, where each indicator value corresponds to information relevant to the stocks. A visualization module is configured to provide a navigation bar on a user's display device, enabling the user to select a plurality of indicators from a list of available indicator values, for visualization of the indicators on the user's display device. The visualization module further provides information for displaying a plurality of tiles on the display device, each tile representing a stock from a selected universe of stocks, wherein each tile includes a multi-dimensional information corresponding to one or more indicators from the user selected indicators. The first dimension of information is position of the tile on the display device depending on a value of a first selected indictor. The second dimension of information is the background color of the tile on the display device depending on a value of a second selected indicator. The third dimension is visibility of the tile depending on a value of a third selected indicator.

18 Claims, 52 Drawing Sheets

(56) References Cited

U.S. PATENT DOCUMENTS

| | | | |
|---|---|---|---|
| 2002/0052820 A1* | 5/2002 | Gatto | G06Q 40/00 705/36 R |
| 2002/0070953 A1* | 6/2002 | Barg | G06Q 10/10 715/700 |
| 2005/0144096 A1* | 6/2005 | Caramanna, II | G06Q 40/06 705/30 |
| 2006/0031187 A1* | 2/2006 | Pyrce | G06F 3/04815 |
| 2006/0069635 A1* | 3/2006 | Ram | G06Q 30/08 705/37 |
| 2007/0203720 A1* | 8/2007 | Singh | G06Q 10/00 705/7.11 |
| 2007/0203816 A1* | 8/2007 | Costache | G06Q 40/00 705/35 |
| 2007/0217689 A1* | 9/2007 | Yang | G06K 9/00127 382/227 |
| 2007/0233726 A1* | 10/2007 | Torrens | G06F 17/30017 |
| 2008/0278496 A1* | 11/2008 | Helfman | G06T 11/206 345/441 |
| 2008/0295038 A1* | 11/2008 | Helfman | G06T 11/206 715/853 |
| 2009/0006226 A1* | 1/2009 | Crowder | G06Q 10/06 705/30 |
| 2009/0006241 A1* | 1/2009 | Zhao | G06Q 40/04 705/37 |
| 2009/0006271 A1* | 1/2009 | Crowder | G06Q 40/04 705/36 R |
| 2009/0013270 A1* | 1/2009 | Helfman | G06F 3/0481 715/764 |
| 2009/0013271 A1* | 1/2009 | Helfman | G06F 17/30572 715/764 |
| 2009/0013281 A1* | 1/2009 | Helfman | G06F 17/30572 715/788 |
| 2009/0048959 A1* | 2/2009 | Omura | G06Q 40/00 705/35 |
| 2011/0016432 A1* | 1/2011 | Helfman | G06F 3/0482 715/843 |
| 2011/0258569 A1* | 10/2011 | Weir | G06F 3/04847 715/771 |
| 2011/0320384 A1* | 12/2011 | Chang | G06Q 40/06 705/36 R |
| 2012/0303548 A1* | 11/2012 | Johnson | G06Q 40/04 705/36 R |
| 2014/0067713 A1* | 3/2014 | Gerber | G06Q 40/06 705/36 R |
| 2014/0074753 A1* | 3/2014 | Weiske | G06Q 10/06 705/36 R |
| 2014/0172751 A1* | 6/2014 | Greenwood | G06Q 40/06 705/36 R |
| 2014/0278754 A1* | 9/2014 | Cronin | G06F 17/30539 705/7.29 |
| 2014/0279865 A1* | 9/2014 | Kumar | G06F 17/30699 707/609 |
| 2014/0304133 A1* | 10/2014 | La Roda, II | G06Q 40/04 705/37 |
| 2015/0269679 A1* | 9/2015 | Padilla | G06Q 40/06 705/36 R |
| 2015/0324918 A1* | 11/2015 | Ward | G06Q 40/06 705/36 R |

* cited by examiner

COVERAGE Indicators — SISMO

Price & Volume (152)
- Price — Price
- Market Cap — BkV
- Enterprise Value — EntV
- Dividend — Div
- Volume — Vol
- Liquidity — Lbt

Return (154)
- Stock performance — xStock
- Dividend yield — DivY
- Total return — TotR

Risk (156)
- Volatility — Vol
- Volatility vs. index — RtxI
- Beta — Beta
- Correlation — Cor
- Rp — Rp
- Skewness — Skew
- Kurtosis (excess) — Kurt

Historical Financials (158)
- Sales — Sales
- EBITDA — EBITDA
- EBIT — EBIT
- Normalized Net Income — Net Inc
- Gaap Net Income — Gp Inc
- Payout ratio — PayO
- Net Debt — NetD

Sell-Side Coverage (160)
- Active brokers — xBrok
- Active brokers (3) — xBrok3
- Publications — xPub
- Publications (3) — xPub3
- Publications / Active brokers (3) — xPub/xBrok3

Sell-side Consensus (162)
- Target Price — TP
- Target Price Premium — TPP
- Sales — Sales
- EBITDA — EBITDA
- EBIT — EBIT
- Normalized Net Income — NI.nrm
- Gaap Net Income — NI.gp
- Reco (%) — Reco%

Fit Guidance Surprises (164)
- Target Price — TP
- Target Price Premium — TPP
- Sales — Sales
- EBITDA — EBITDA
- EBIT — EBIT
- Normalized Net Income — NI.nrm
- Gaap Net Income — NI.gp
- TP vs. consensus — TPCs
- Sales vs. Consensus — SalesCs
- EBITDA vs. Consensus — EbtdaCs
- EBIT vs. Consensus — EbtCs
- Normalized Net Income vs. Consensus — NI.nrmCs
- Gaap Net Income vs. Consensus — NI.gpCs

Trading Multiples (166)
- Sales — xSales
- EBITDA — xEBITDA
- EBIT — xEBIT
- xNormalized Net Income — xNI.nrm
- xGaap Net Income — xNI.gp
- Price to Book — PTB
- Price to Cash Flow — PCF

Valuation (168)
- Multiple-derived CoE — CoE
- CAPM CoE — CoE.c
- CoE gap — CoE.gap
- Reco premium — RecP

FIG. 3

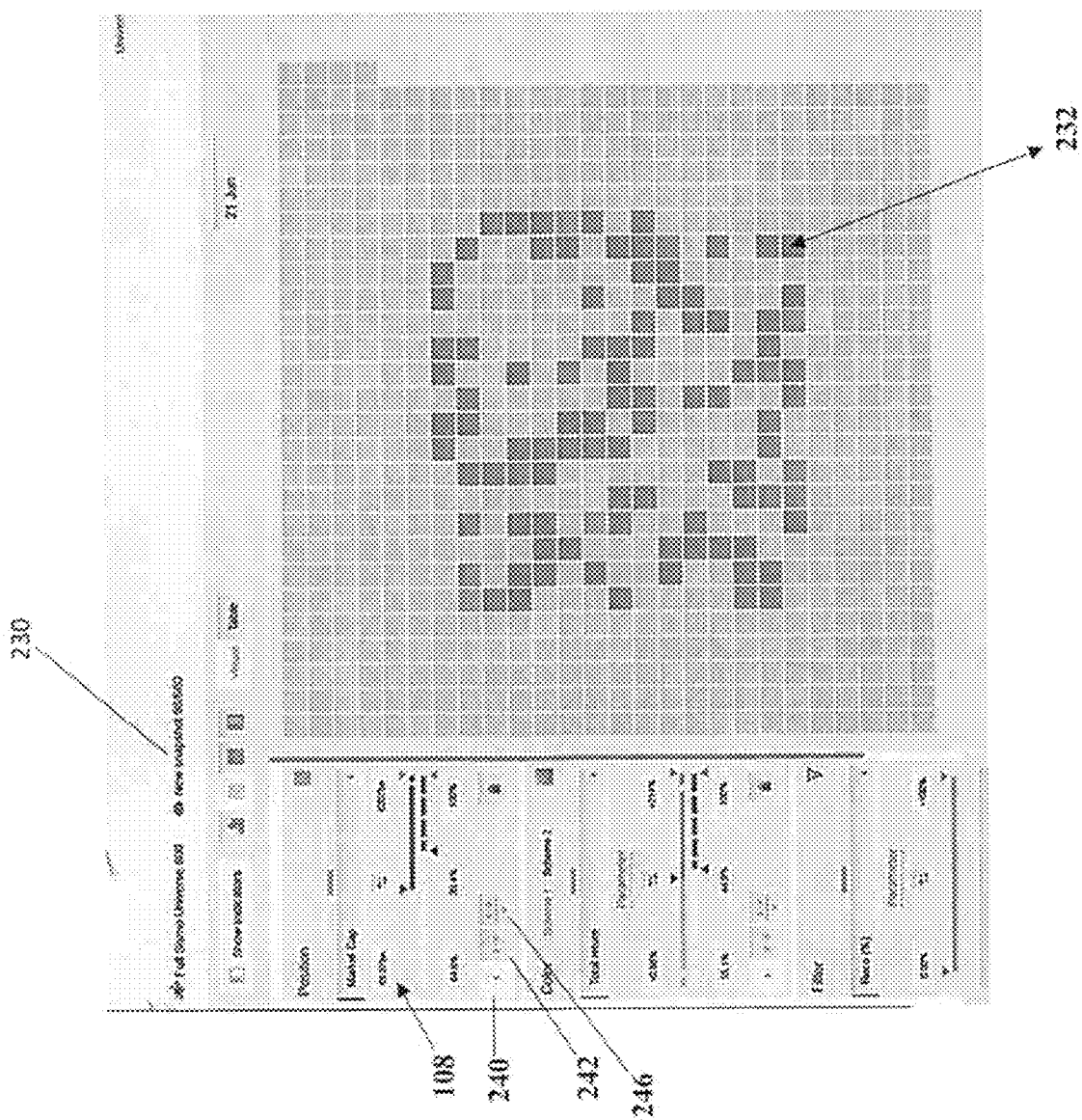

| Graphical form | V1 - Shape<br>Histogram classes of frequency | V2 - Rank<br>Paving | V3 - Quartile<br>Complex paving | V4 - Decile<br>Graphical data matrix |
|---|---|---|---|---|
| *Objective of the visualizations* | | | | |
| Reading and understanding of the overall distribution | | | | |
| Single-dimensional ranking | | | | |
| Direct reading of the correlation for 2 attributes and bi-dimensional filtering | | | | |
| Generalization of multidimensional correlations | | | | |
| *Correspondence by cognitive and analytical task* | | | | |
| Global apprehension and recognition of the distribution | | | | |
| Anomalies research | | | | |
| Comparison and distinction | | | | |
| Categorization and association | | | | |
| Ranking | | | | |

FIGURE 7

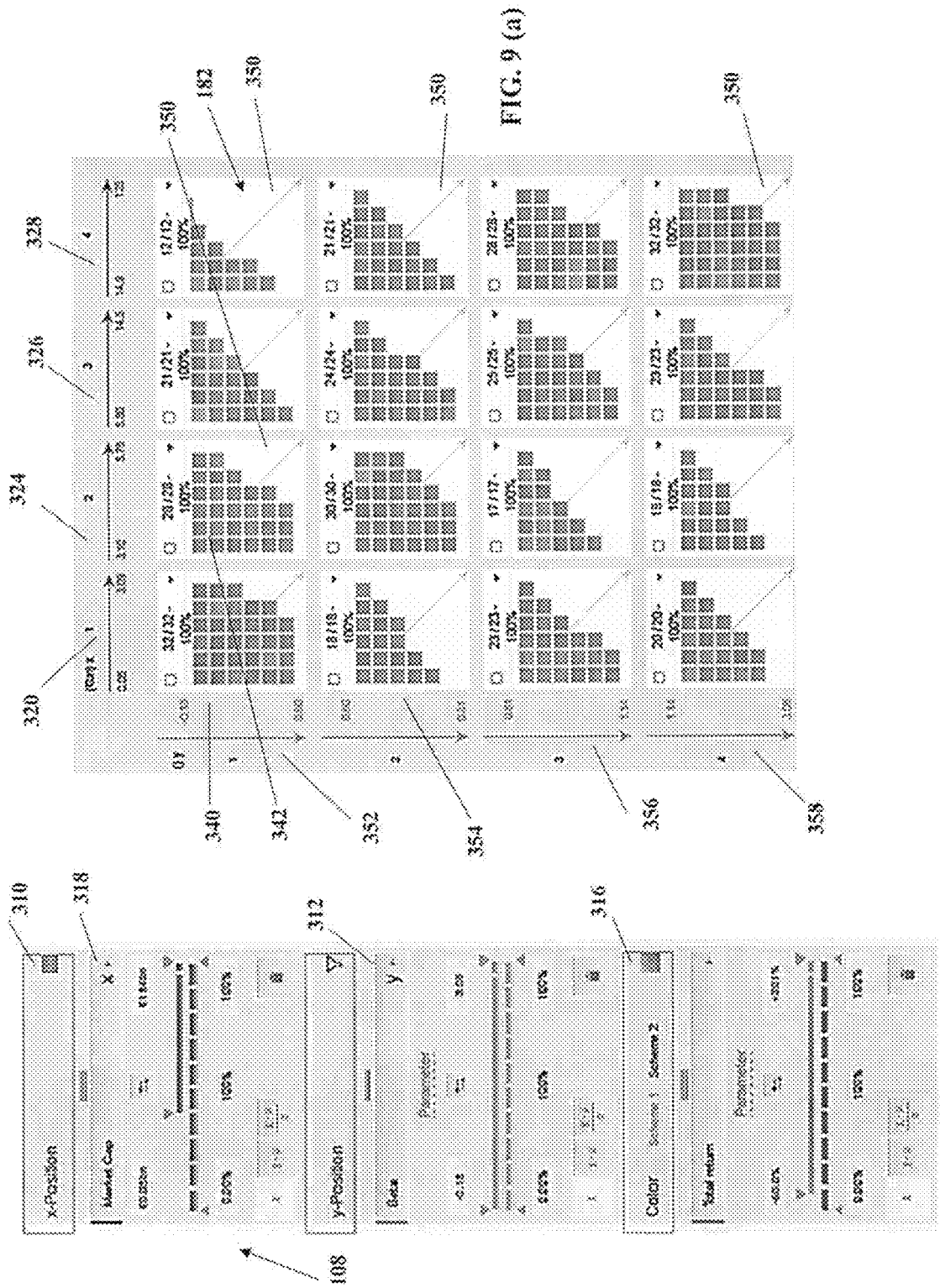

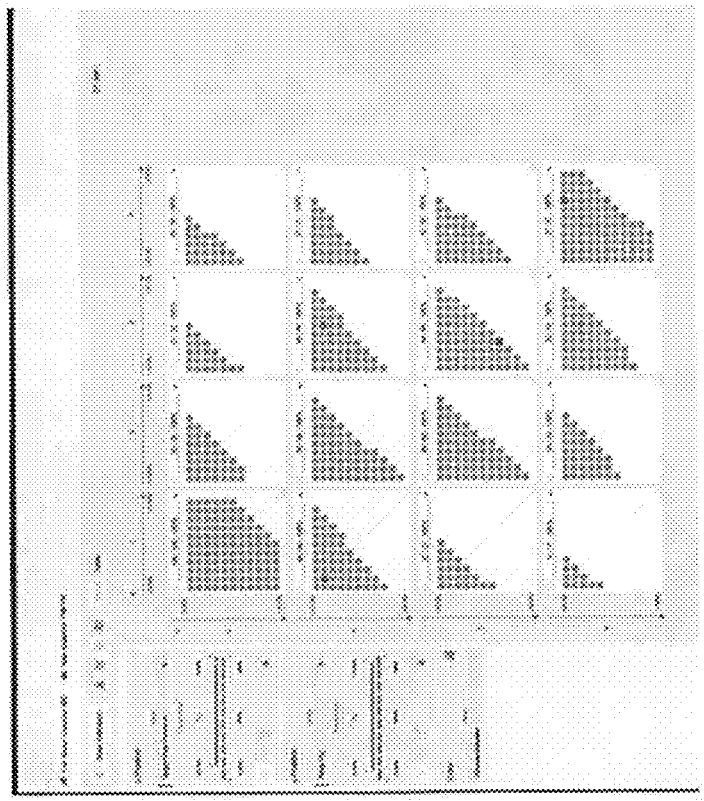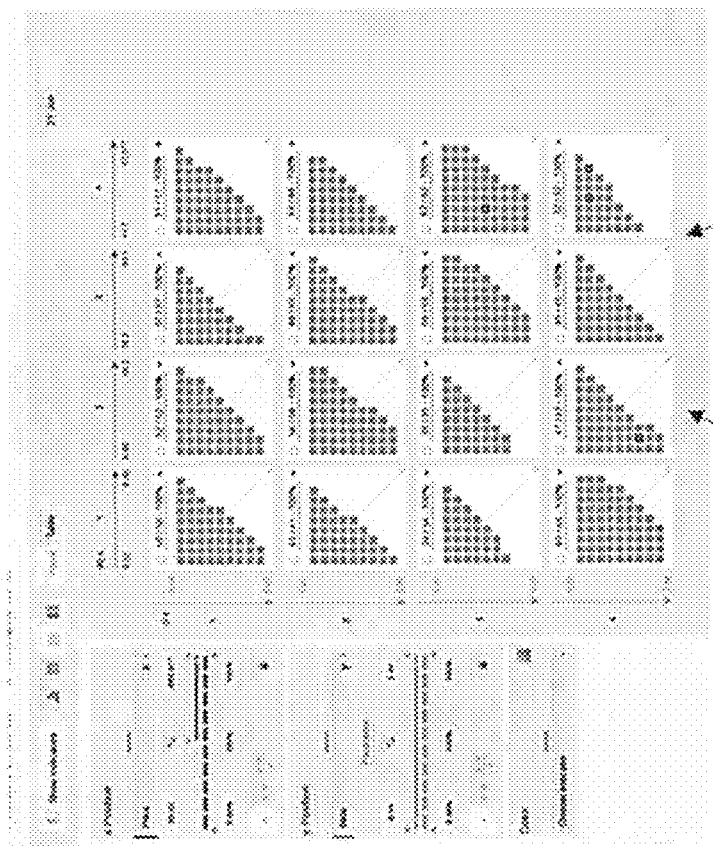
Fig. 10 stock_ws_historical_financial
- id — integer
- stock_id — integer
- year — smallint
- fye_date — date
- book_value — numeric(19,6)
- net_debt — numeric(19,6)
- cash_flow — numeric(19,6)
- total_intangibles — numeric(19,6)
- num_of_shares — bigint
- payout_ratio — numeric(19,6)

722 stock_forecast_consensus
- id — integer
- stock_id — bigint
- period — smallint
- measure_code — bigint
- per_date — date
- est_date — date
- currency — varchar
- est_count — integer
- median_val — numeric(19,6)
- mean_val — numeric(19,6)
- std_dev_val — numeric(19,6)
- max_val — numeric(19,6)
- min_val — numeric(19,6)

724

FIG. 20 stock_target_price_consensus
- id — integer
- stock_id — bigint
- est_date — date
- currency — varchar(64)
- est_count — integer
- median_val — numeric(16,4)
- mean_val — numeric(16,4)
- std_dev_val — numeric(16,4)
- max_val — numeric(16,4)
- min_val — numeric(16,4)

726 stock_mean_std
- id — integer
- stock_id — bigint
- date — date
- frequency_type_id — bigint
- indicator_type_id — bigint
- rolling_period_type_id — bigint
- mean — numeric(15,6)
- std — numeric(15,6)

728

FIG. 21 stock_volume_price
- id — integer
- stock_id — bigint
- date — date
- mean_price_3m — numeric(18,6)
- volume_3m — numeric(18,6)
- mean_price_6m — numeric(18,6)
- volume_6m — numeric(18,6)
- mean_price_9m — numeric(18,6)
- volume_9m — numeric(18,6)
- mean_price_12m — numeric(18,6)
- volume_12m — numeric(18,6)

740 stock_performance
- id — integer
- stock_id — bigint
- date — date
- type — performance_type
- performance — numeric(18,6)
- cur_ref_id — bigint
- prev_ref_id — bigint

- stock_daily
- id
- stock_id
- date
- close_price
- market_cap
- daily_float
- daily_volume
- created_on
- free_float
- shares_outstanding
- dividend_yield
- return_index
- market_value

| quote | |
|---|---|
| stock_id | integer |
| ticker | varchar(256) |
| company_name | varchar(256) |
| sector | varchar(256) |
| country | varchar(256) |
| thomson_id | bigint |
| currency | varchar(256) |
| removed | boolean |
| ignore_ev | boolean |
| stock_split_amount | bigint |
| short_name | varchar(32) |
| update_date | date |
| country_type | bigint |
| constituent_code | varchar(10) |
| type | quote_type |
| long_name | varchar(150) |
| top_name | varchar(32) |
| bottom_name | varchar(32) |
| sismo_sector_id | integer |
| ibes_currency | varchar(8) |
| ws_currency | varchar(8) |

Indicator values in slot 2 will define tiles background color.

Items are colored with a color gradient defined on two intervals:

- From most negative (currently associated with red color) to Neutral (currently associated with grey color);
- From Neutral (currently associated with grey color) to Positive (currently associated with green color).

Gradient is always used only on the continuous part of the distribution (5-sigma interval).

- If min (max) value of the distribution is outside 5-sigma interval, discrete part i.e. values between min(xi) and m-2.5s (m+2.5s and max(xi)) have a single color: the most negative (positive) one on the whole discrete interval.
- If min (max) is within the 5-sigma interval, color gradient is set starting from the most negative (positive) color inside the continuous interval.

Each indicator has its own defined point for neutral color. There are 2 categories of indicators:

- Centered around mean;
- Centered around predefined value (any number that is specifically defined, such as 0 for example).

All indicators trigger the same algorithm:

- Calculate edge-values of the 5-sigma interval;
- Define centered value;
- Use gradient from negative to neutral for items distributed from max(min(x_i), µ-2.5σ) to centered value, where x_i are items in selected population;
- Use gradient from neutral to positive for items distributed from centered value to min(max(x_i), µ+2.5σ), where x_i are items in selected population;
- If min (max) is outside the 5-sigma interval, use the same single color - the most negative (positive)

FIG. 31 (b)

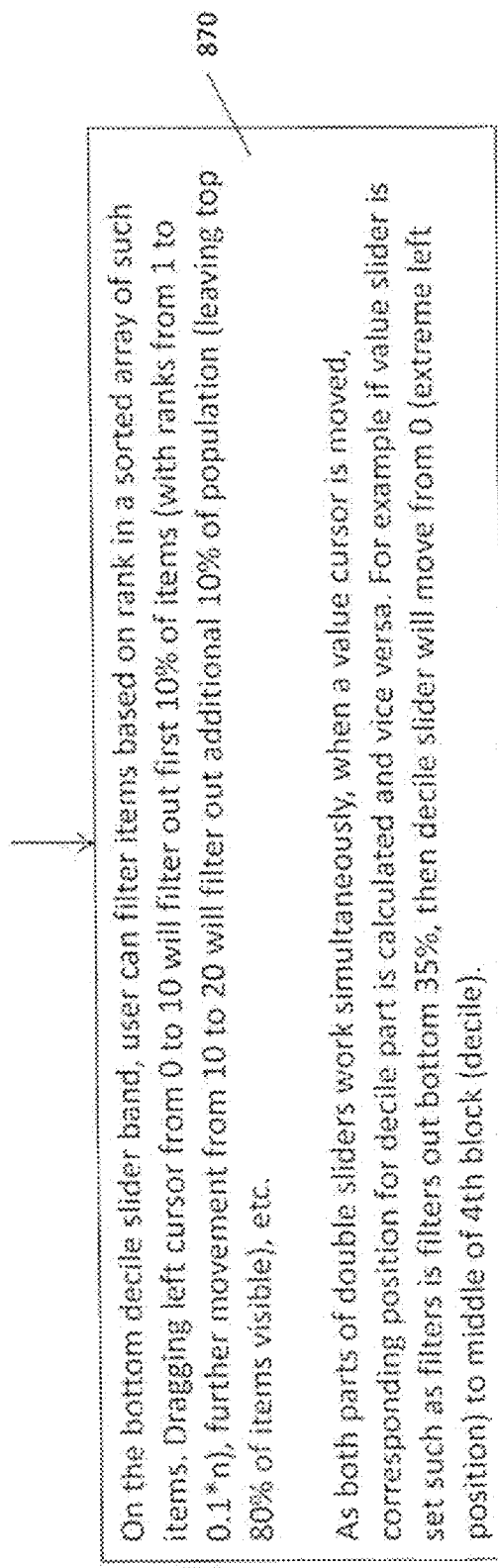

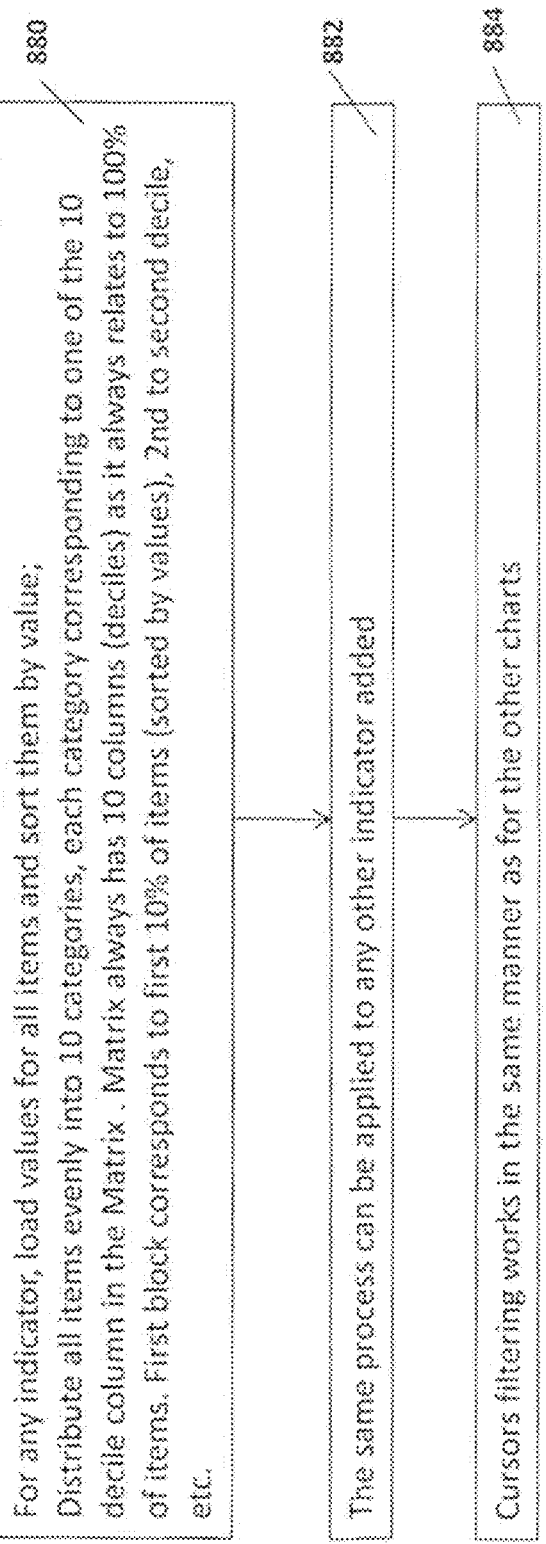

SYSTEM AND METHOD FOR MARKET VISUALIZATION

FIELD OF THE INVENTION

This invention relates to a system and method for allowing users to interactively visualize securities market performance based on any desired market indicator through a dynamic arrangement. More specifically, the invention relates to a system and method for visualizing securities market positioning based on any combination of financial and non-financial indicators through a dynamic arrangement. The interactive tools allow users to surmise patterns and characteristics not easily achieved by currently available analytic tools.

BACKGROUND

A major objective in securities market analysis is to capture huge amounts of data that has a short lifespan. Investors need to make critical decisions, many times in extremely short time spans by scouring through the multitude of market and individual stock indicators. In this landscape, visualization techniques have become important tools for investors and market analysts alike.

One of the earliest and innovative visualization tools introduced to the market, which has become popular in the industry is the Map of the Market™ described in U.S. Pat. No. 6,583,994 issued to Martin Wattenberg. The interface system, in accordance with the patent, provides a visual display of a financial market with a display of the financial sectors, and stocks represented as rectangles, where the size and background color of each rectangle on the display represents the market capitalization and performance of the sector for a defined period of time. The size of each rectangle is optimized to be as close as possible to a square. Various display layers allow the user to visualize a group of companies within a sector, where each company is also represented by a square with a size and background color corresponding to the market cap and performance. Such sector analysis has led to a widespread use of proportional maps also known as tree maps.

Another market visualization tool has been described in U.S. Pat. No. 8,972,295 issued to Johnson et. al. The patent teaches arrangements for interactively displaying large set of financial data on devices with limited size display screens such as smartphones or tablets. In one embodiment, the patent describes arranging the location of displayed items in a spiral format, with the largest companies spiraling out from the center of the display. As such, rather than size of the tile representing the market cap, as discussed in the '994 patent, the '295 patent enables the user to determine the size of the company based on its location on the spiral arrangement.

Although the above advances in visualizing market performance have been the right steps towards visual analytics, there is a need for a system that allows various interactive graphical representations of market data that allows the user to make a selection of available indicators and perform a cross analysis based on the selected indicators.

SUMMARY OF EMBODIMENTS

The system and method of the present invention in accordance with various embodiments provides the ability to identify patterns, trends and outliers out of a huge dataset, irrespective of the lifespan of the dataset. Advantageously, the system provides the tools for managing fundamental analysis, irrespective of the users' desire to conduct algorithmic trading. In accordance with one embodiment a system for visualization of a financial market comprises a data processor for receiving financial data belonging to a plurality of stocks from an external data source, said financial data including a plurality of available indicator values, where each indicator value corresponds to information relevant to said plurality of stocks. A visualization module is configured to provide a navigation bar on a user's display device, enabling the user to select a plurality of indicators from a list of said available indicator values, for visualization of said indicators on said user's display device. The visualization module further provides information for displaying a plurality of tiles on said display device, each tile representing a stock from a selected universe of stocks, wherein each tile includes a multi-dimensional information corresponding to one or more indicators from said user selected indicators, wherein a first dimension of information is position of said tile on said display device depending on a value of a first selected indictor, the second dimension of information is the background color of said tile on said display device depending on a value of a second selected indicator and the third dimension is visibility of said tile depending on a value of a third selected indicator.

In accordance with another embodiment a system for visualization of financial market comprises a data processor for receiving financial data belonging to a plurality of stocks from an external data source, said financial data including a plurality of available indicator values, where each indicator value corresponds to an information relevant to said plurality of stocks. A visualization module is configured to provide a navigation bar on a user's display device, enabling said user to select a plurality of indicators from a list of said available indicator values, for visualization of said indicators on said user's display device.

The visualization module further provides information for displaying a plurality of tiles on the display device, each tile representing a stock from a selected universe of stocks, wherein each tile includes a multi-dimensional information corresponding to one or more indicators from said user selected indicators, wherein a first dimension of information is a horizontal position of said tile on said display device depending on a value of a first selected indictor, the second dimension of information is a vertical position of said tile on the display device depending on a value of a second selected indicator and the third dimension of information is the background color of said tile on the display device depending on a value of a third selected indicator.

In accordance with yet another embodiment, a system for visualization of financial market comprises a data processor for receiving financial data belonging to a plurality of stocks from an external data source. The financial data includes a plurality of available indicator values, where each indicator value corresponds to an information relevant to a plurality of stocks.

A visualization module is configured to provide a navigation bar on a user's display device, enabling the user to select a plurality of indicators from a list of the available indicator values, for visualization of said indicators on said user's display device. The visualization module further provides information for displaying a plurality of tiles on the display device, each tile representing a stock from a selected universe of stocks.

The display has a plurality of position slots for the user to select an indicator such that the tiles are presented in a matrix arrangement with a horizontal axis divided into a plurality of columns and a vertical axis divided into a plurality of rows, wherein a selected number of rows is allocated for each of the position slots and each tile populates the columns and the selected number of rows based on its indicator value.

In accordance with another embodiment, the visualization module further provides on said display one or more variable slider controls corresponding to the position, color and filter slots, allowing the user to define a range of values for a corresponding selected indicator within which tiles displayed on the display remain visible if each of their corresponding indicator values falls within the value range defined by the slider control.

Furthermore, in accordance with one embodiment a first slider control receives a range of defined values based on the minimum and maximum values available for a selected indicator, and a second slider control receives a range of defined value as a percentage based on the minimum and maximum values available for a selected indictor. A change of value of either one of the first and second slider controls proportionally varies the value of the other slider control.

The system further includes a benchmarking option, wherein a tile representing a defined benchmark is displayed among the plurality of tiles based on a mean indicator value of the benchmark.

BRIEF DESCRIPTION OF THE DRAWINGS

FIG. 3 illustrates a list menu illustrating an exemplary list of available indicators for selection by a user, in accordance with one embodiment;

FIGS. 7, 7(a), 7(b), 8(a), 8(b), 9(a), 9(b), 10, 11(a), 11(b) illustrate the shape of the stock tiles in the four available picking views, in accordance with one embodiment;

FIGS. 19-30 illustrate the various data tables that system server employs so as to prepare the picking views for visualizing stock, in accordance with one embodiment;

FIG. 35 is a flow chart for displaying a Matrix Chart, in accordance with one embodiment.

DETAILED DESCRIPTION

Figure 1:
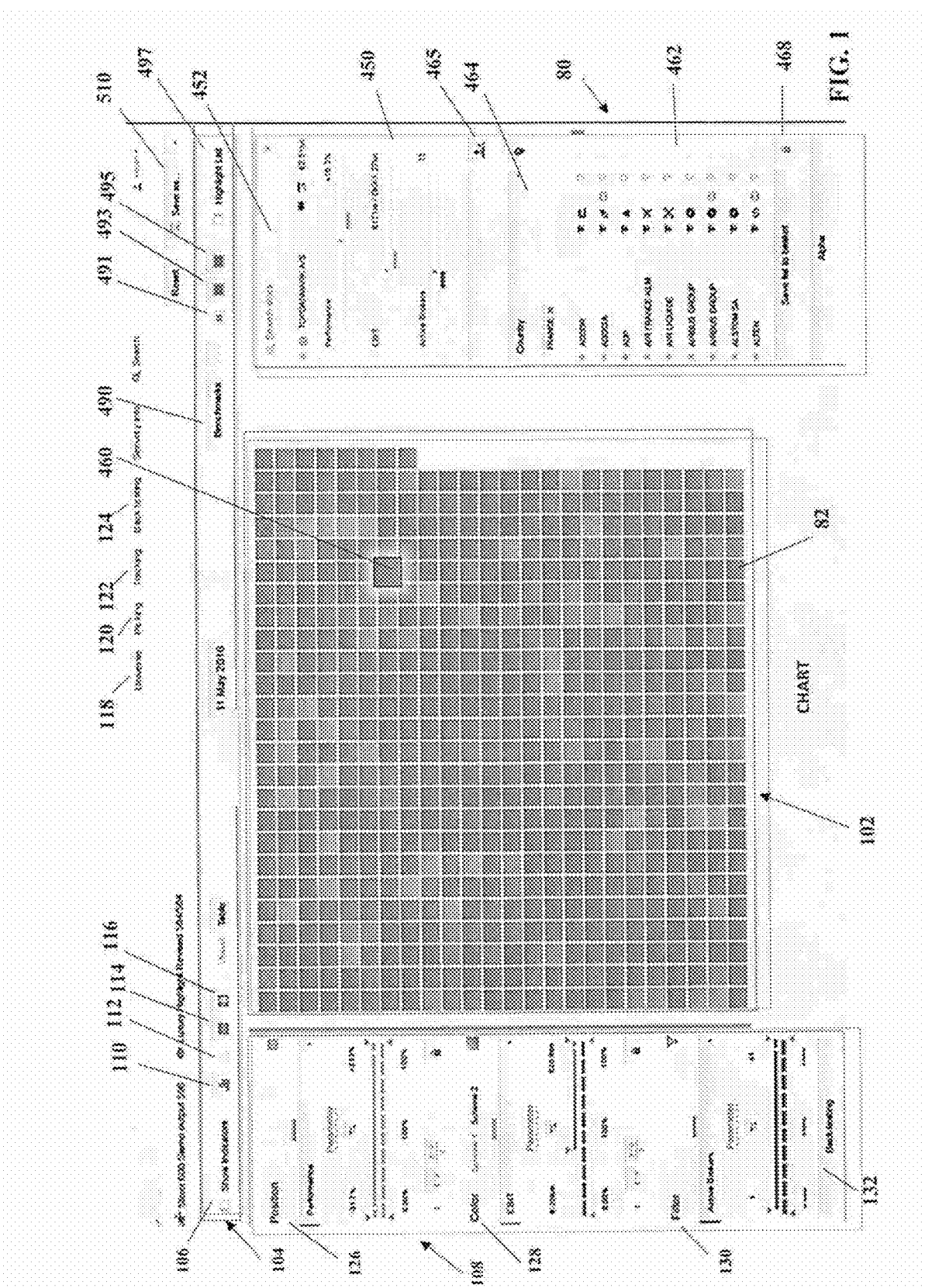
FIG. 1 illustrates a display screen for implementing a visual analytic system for analyzing a financial market, in accordance with one embodiment.

In accordance with one embodiment FIG. 1 illustrates a display screen for implementing a visual analytic system for analyzing a financial market. The middle portion 102 of display 80 provides the visual space for observing a plurality of tiles 82, each of which represent a company stock. It is understood by those skilled in the art, that although the examples discussed in accordance with this embodiment relate to stocks, the techniques and arrangements disclosed herein can be applied to any type of financial securities, including bonds, commodities, and derivatives.

Navigation bar 104 includes a tag or button 106 that allows the user to view all the indicators available for cross referencing. In accordance with one embodiment, a user can select up to three indicators at the same time and arrange for visualization of those indicators by manipulating the controls provided on left panel 108. Navigation bar 104 also includes a selection of four available picking view buttons, 110, 112, 114 and 116. Each picking view allows the user to see the relative position of a large amount of stocks for various indicators at the same time. The selection of each of the picking views leads to the display of a corresponding picking chart within middle portion 102 of display 80.

The picking charts displayed in response to selecting the picking view buttons include a Shape Chart upon selection of picking view button 110, as well as a Rank Chart upon selection of picking view button 112, as well as Quartile Chart upon selection of picking view button 114 and Matrix Chart upon selection of picking view button 116. In accordance with one embodiment of the invention display 80 includes picking button 120 that allows the user to gain access to a separate display that explains the available picking views in further detail.

The four picking charts are important visual features of the system allowing users to perform advanced analysis of the financial markets. To this end picking view button 110 allows the user to view a selected Universe of stocks in a shaped tile pattern, each tile representing a stock, in a distribution plot as illustrated by chart 140 in FIG. 2(*a*). The Shape Chart provides an indication where any given stock or its peers stand in the overall distribution. The default display separates distribution tails from the central part of the distribution, where the central part is shown on a continuous scale and the tails as discrete. In the central part, stocks are distributed below and above mean ($\mu$) along a linear scale expressed in standard deviation ($\sigma$).

Distribution tails in market data can extend beyond multiple standard deviation distance from mean. To optimize display of distribution including scarce data points located at large distance and numerous data points relatively close one to the other that are forming the central part of the distribution, the continuous scaling only applies to the central part of the distribution, while bottom tail stocks and top tail stocks are grouped in two distinct sub groups and located at both extremities of the continuous block of data points. Tooltips allows the user to easily identify each stock's exact distance from mean, whether or not such position is reflected per the position of the tile along an axis.

Figure 7:
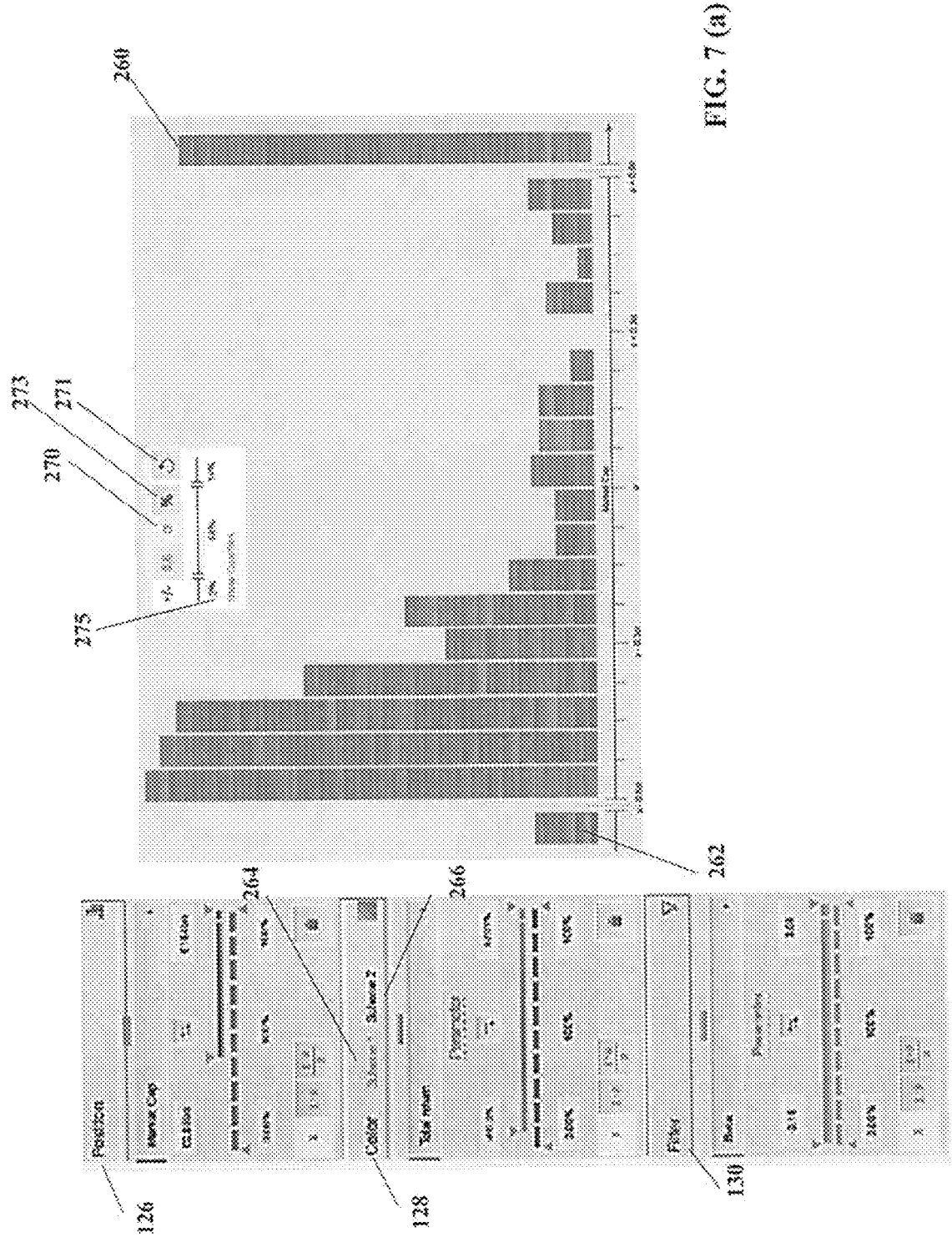
Figure 7:
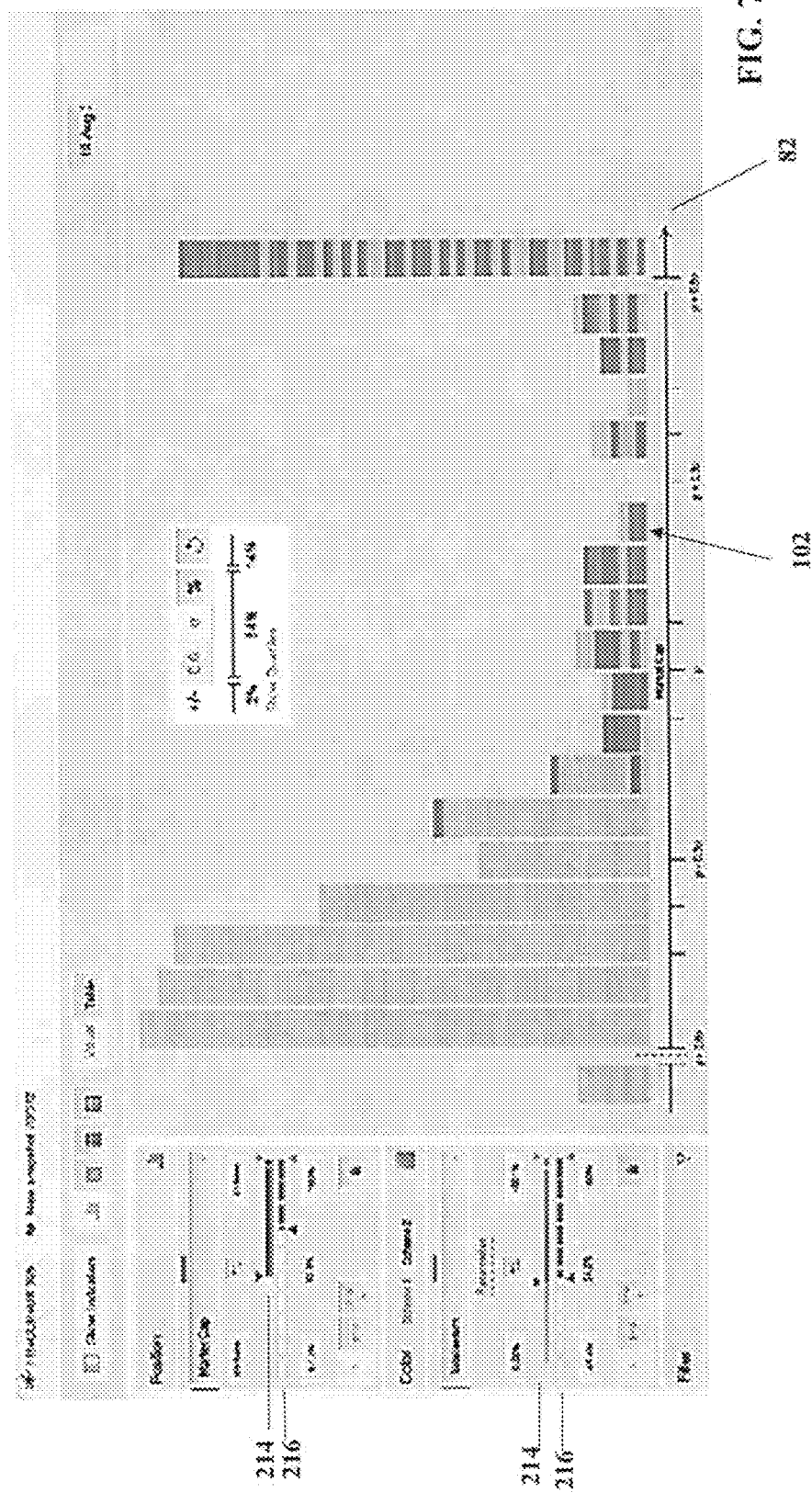

In accordance with one embodiment, by clicking on percent (%) button 273 within pad control 270 (FIG. 7(*a*)), a user can define the percentage of stocks allocated to tails. Selecting 5% for instance will allocate bottom 5% of stocks to bottom tail and top 5% of stocks to top tail.

Picking view button 112 allows the user to view the Universe of stocks as a ranked tile pattern, also referred as a heat map pattern, each tile representing a stock. A Rank Chart provides a spatial distribution based on a regular tiling with helicoid arrangement from center to periphery. The rank of each stock on the first indicator determines its position in the snail pattern as illustrated by chart 142 in FIG. 2(*b*). The Rank Chart can be used to get a visual reading of a stock's relative position in the overall distribution, reflected by its distance to the center of the screen.

Picking view button 114 allows the user to view the Universe of stocks in a quartile pattern. A Quartile Chart provides a double-quartile distribution display. Each displayed stock belongs to one of the 16 blocks or sub-quartiles on display, based on its quartile position for a first indicator that is represent on the horizontal axis and for a second indicator that is represented on the vertical axis as illustrated by chart 144 in FIG. 2(*c*). For instance, a stock ranked in the 3rd quartile for the first indicator and the 4th quartile for the second indicator will be displayed in the block at the intersection of the 3rd column and the 4th row. Inside any block, stocks are distributed from top left corner to bottom right in diagonal patterns.

Figure 2:
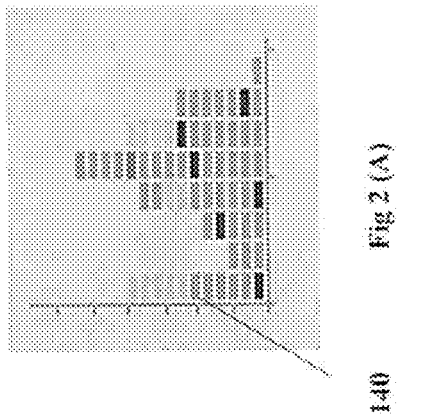
FIG. 2(a) is a distribution plot illustrating a shape chart in accordance with one embodiment.
FIG. 2(b) is a distribution plot illustrating a rank chart in accordance with one embodiment.
FIG. 2(c) is a distribution plot illustrating a quartile chart in accordance with one embodiment.
FIG. 2(d) is a distribution plot illustrating a matrix chart in accordance with one embodiment.
Figure 2:
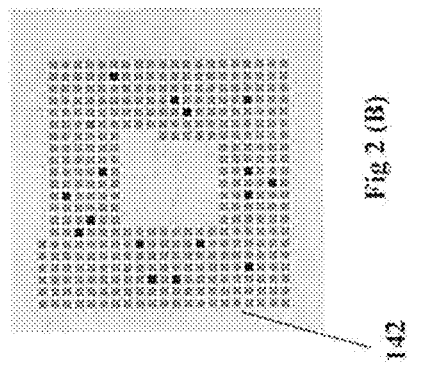
Figure 2:
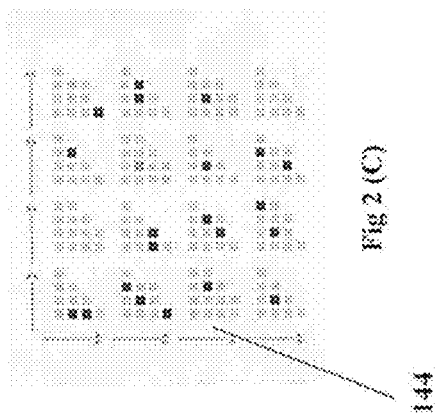
Figure 2:
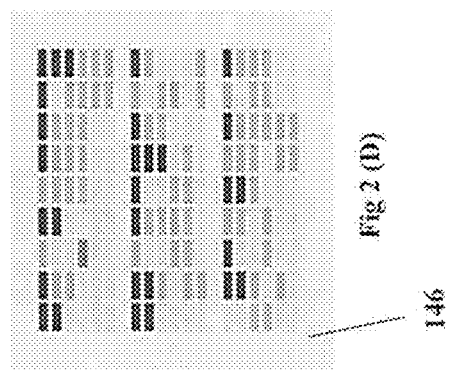

Finally picking view button 116 allows the user to view the selected Universe of stocks in a matrix pattern. A Matrix Chart provides a multiple-distribution-decile display. Next to each indicator, the complete distribution is available in a multi-column decile matrix, with the first selected number of rows visible by default and a full matrix display activated by the arrow control on the following line. Stocks outside any indicator value ranges as defined by selected controls are greyed out on all indicator matrices simultaneously. A Matrix Chart 146 as illustrated in FIG. 2(*d*) can be used to get a reading of multiple indicators cross distributions and correlations and check out any stock or its peers' relative position in multiple indicators distribution. In accordance with other embodiments, instead of a decile arrangement other divisions for distributing the display of the stocks can be employed.

In order to select the Universe of stocks that a user desires to perform an analysis, button 118 allows the user to access the Universe of stocks that are subject to the analysis. The user can have access to a default Universe, or alternatively the user can define a desired Universe of Stocks. For example, stocks listed in various exchanges can be separately selected, or a group of stocks from a specific industry, listed in different exchanges can be combined to define a unique Universe as specified by the user. A group of stocks based on their sector or industry can be selected as well. In other words, any collection of stocks based on a characteristic desired by the user can be defined as the selected Universe of stocks.

Display 80 also includes a tracking button 122 that allows the user to gain access to a separate display so as to select a desired tracking chart as will be explained in more detail below. The various available tracking chart selections allow the user to visualize in a unique arrangement details concerning a particular stock among the Universe selected by the user.

Display 80 also includes a back testing button 132 that allows the user to gain access to a separate display so as to seamlessly provide a back testing analysis derived from the analysis that is currently in progress by the user. In accordance with another embodiment, a separate back testing button 124 would lead the user to a more detailed back testing home page, requiring the user to load a selected set of indicators, or select an already saved chart so as to automatically load the indicators used for the saved chart.

Left panel 108 of display 80 includes an area of the display that enables the user to perform dynamic analysis of a large amount of stocks contained in the Universe of stocks selected or defined by the user. Left panel 108 provides and displays selection buttons that allow the user to visualize the financial data of a selected Universe in a three dimensional arrangement. As is known by those skilled in the financial investment science, there are numerous parameters that characterize each stock. These parameters are referred to as indicators. To this end, left panel 108 depending on the picking view selected by the user allows the visualization of data where each stock in the selected Universe of stocks is displayed as a tile.

In accordance with one embodiment of the invention, left panel 108 is divided into three slots 126, 128 and 130, each representing a unique dimension of the data to be displayed. For example, for slot 126 a user may select the position dimension of data which represents the relative position of each tile compared to the remaining stocks, and for slot 128 a user may select the color dimension of data which represent the relative background color of each tile compared to the remaining tiles, and for slot 130 a user may select the filter dimension of data which represents a filtered view that determines whether a tile should be visible or hidden based on a determination of whether the selected indicator for that filter meets a certain criteria selected by the user.

As mentioned above, based on the picking view selected by the user, the stock data can be visualized in three dimensions of position, color and filter. For each dimension, the user can select an indicator. The three picking views for Shape Charts, Rank Charts and Quartile charts allow the simultaneous visualization of 3 indicators. For Shape and Rank Charts the three indicators are selected as one for the Position slot, one for the Color slot and one for the Filter slot. For Quartile charts, the three indicators are selected as one for the horizontal X axis, one for the vertical Y axis and one for the Color thresholds.

The indicator for the Position slot allows the user to visualize the stocks' relative position for a selected indicator depending on the tile positions on display 80. The indicator for the Color slot allows the user to visualize the stocks' relative position for a selected indictor depending on the tiles' background color. The indicator of the Filter slot allows the user to visualize binary information of visible or hidden. Stocks outside the filtering threshold range are greyed out or appear dimmed and as such may appear hidden to the user. Stocks within the filtering threshold range are visible to the user.

In accordance with one embodiment of the invention, when the user selects Shape Chart 110, or Rank Chart 112, slot 126 is defined by position of data, slot 128 is defined by the color of data and slot 130 is defined by the criteria filter. When the user selects Quartile Chart 114, slot 126 is defined by position of data, along the horizontal X axis, slot 128 is also defined by position of the data, along the vertical Y axis, and slot 130 is defined by the color of data. When the user selects multi-dimensional Matrix Chart 116, left panel 108 provides a selection of N slots, where N is the dimension of a Matrix displayed by display 80. Each dimension is defined by at least one indicator relating to a stock. To this end, the same indicator can be selected more than once for one or more dimensions. In accordance with one embodiment of the invention, any combination of indicators can be selected so as to display stocks based on the selected indicators.

In accordance with one embodiment of the invention, FIG. 3 illustrates chart 150 that includes an exemplary list of available indicators for selection by a user. However, as it is understood by those skilled in the art of investment and stock analysis, the indicators illustrated in FIG. 3 are by no means an exhaustive list and other indicators can also be included in accordance with various embodiments of the invention.

As illustrated in FIG. 3 various categories of indicators include Price and Volume category 152, Return category 154, Risk category 156, Historical Financials category 158, Sell-Side Coverage category 160, Sell-side Consensus category 162, Per Broker Estimates category 164, Trading Multiples category 166, and Valuation category 168. For each of the categories identified above, the user may select a sub-category as listed in FIG. 3.

Returning to FIG. 1, in accordance with one embodiment of invention, a user may employ left panel 108 and each of the slots 126, 128 and 130 to select an indicator category and sub-category for each of the three dimensions of the data to be visualized. For example, as illustrated in FIG. 1, for slot 126, the user has selected for the first dimension the stock performance sub-category from Return category 154 to represent the position of stocks based on their performance in any of the desired picking views. For slot 128 the user has selected for the second dimension the EBIT (earnings before interest and taxes) from Historical Financials category 158 to represent the colors of stocks based on their EBIT rankings in any of the desired picking views. For slot 130, the user has selected the Active Brokers sub-category from Sell-side Coverage category 160 that provides the number of brokers covering a stock and using a threshold number as a filter for determining whether any of the stocks represented based on the first and second dimensions will be displayed or remain hidden. For example, a user may select a threshold of 10 brokers, where any of the selected stocks with less than 10 brokers covering it, will remain hidden to the user.

Figure 4:
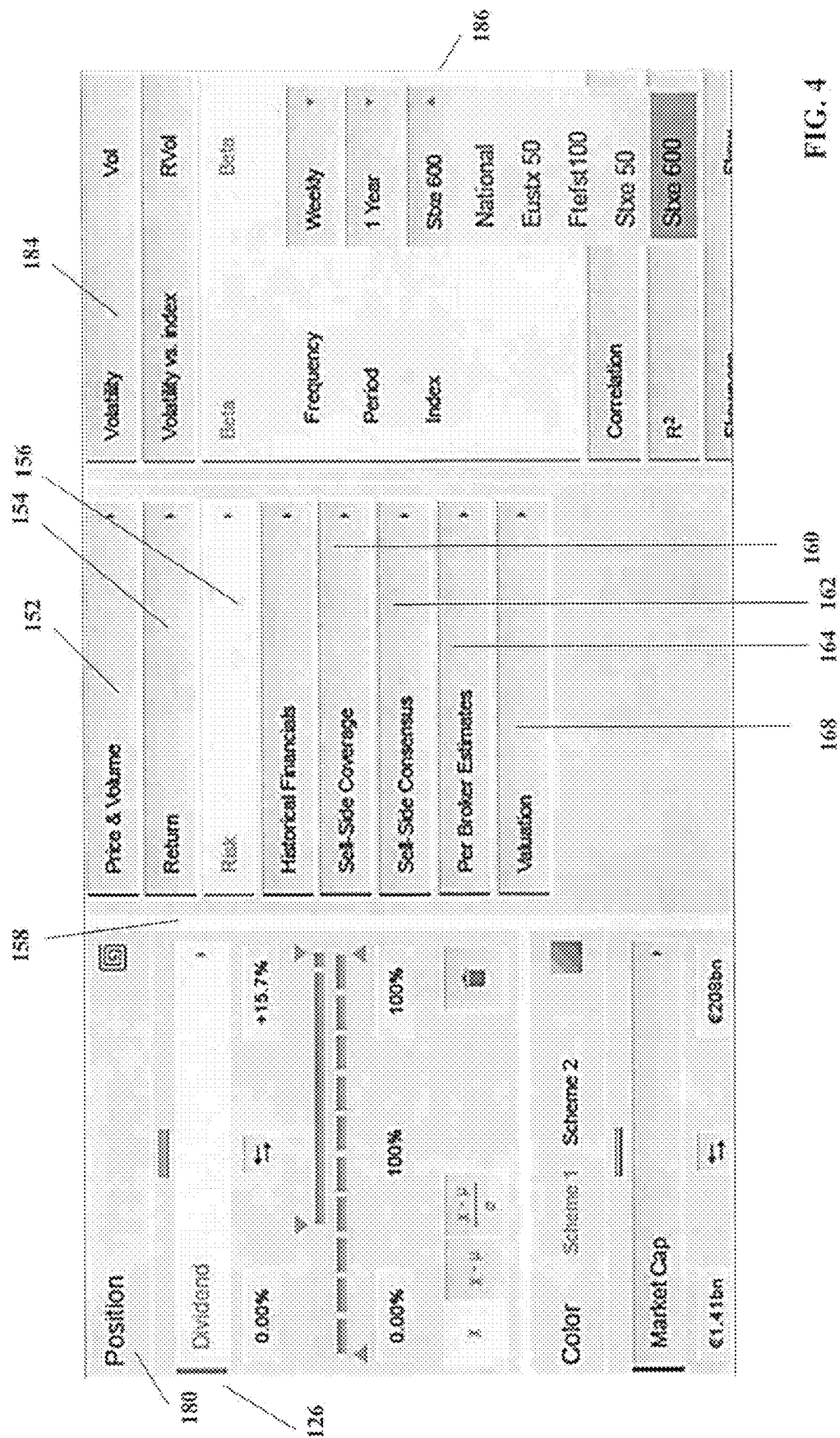
FIG. 4 illustrates a more detailed view of selecting indicators based on available categories and sub-categories illustrated in FIG. 3, in accordance with one embodiment.

FIG. 4 illustrates a more detailed view of selecting indicators based on available categories and sub-categories illustrated in FIG. 3. As such, for position slot 126, the user can select a Dividend indicator at slot 180, which may have been provided as a selection from a drop down menu, that includes an exemplary list of categories, such as Price and Volume indicator 152, Return indicator 154, Risk indicator 156, Historical Financials indicator 158, Sell-Side coverage indicator 160, Sell-Side consensus indicator 162, Per Broker Estimates indicator 164, and Valuation indicator 168. Furthermore, as illustrated in FIG. 4, for an indicator such as Risk indicator, a broad range of parameters are available for the user. To this end, upon activating Risk indicator button, a drop down menu is displayed so as to allow the user to select a sub-category indicator such as the Beta indicator further allowing the user to specify the Frequency, Period and Index for the Risk indication, as illustrated at area 186 of FIG. 4.

Figure 5:
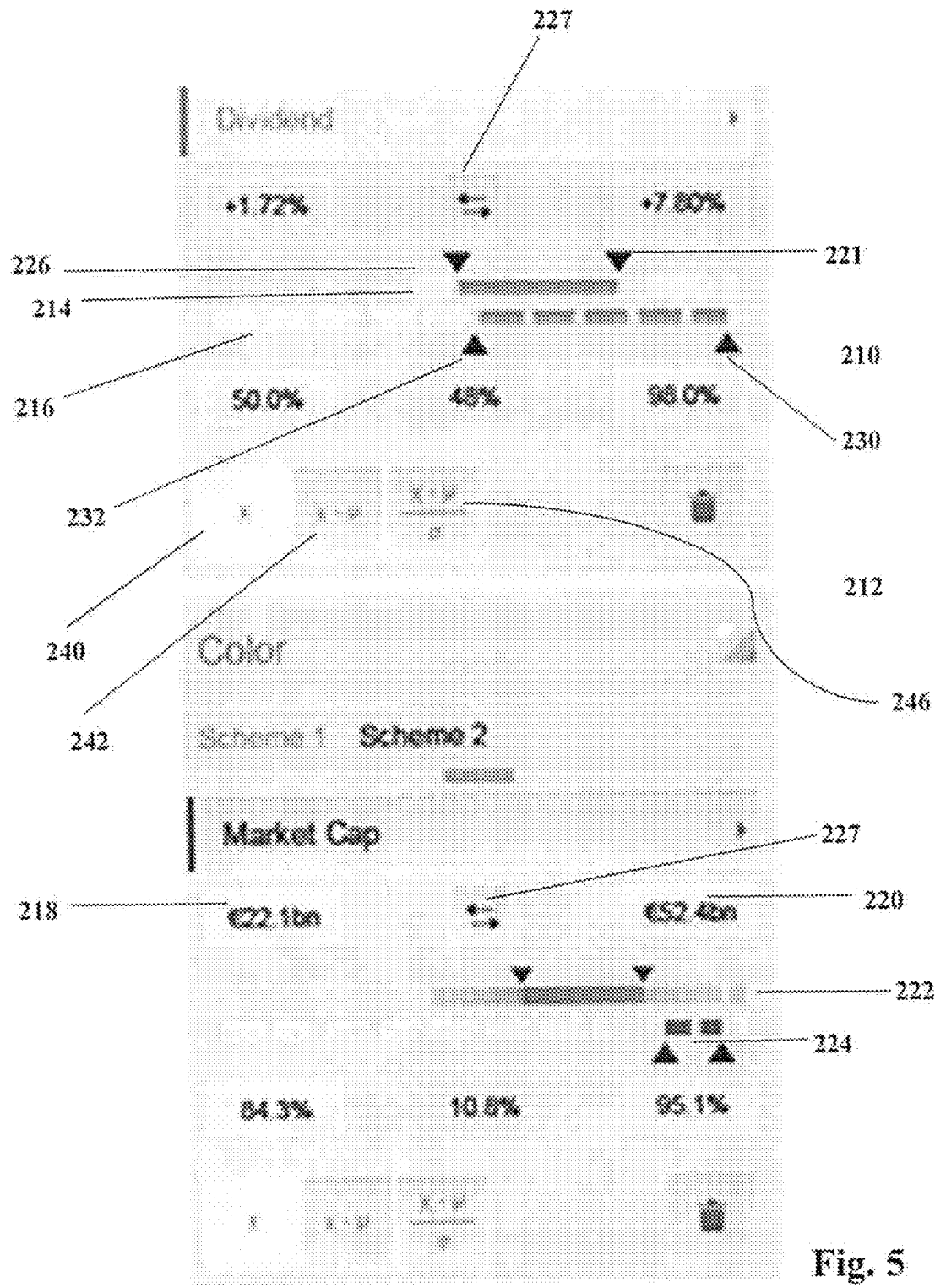
FIG. 5 illustrates a slide control feature for improving visualization of the financial data, in accordance with one embodiment.

FIG. 5 illustrates another feature for improving visualization of the financial data in accordance with one embodiment. Specifically, a portion of left panel 108 is illustrated with the Dividend indicator being selected in the position slot and Market Cap indicator being selected in the color slot. For each indicator, corresponding to the position slot, display 80 and left panel 108 in particular includes two variable slider controls 214 and 216. Slider control 214 allows the user to define a range of values within which the tiles displayed in middle portion 102 of display 80 remain visible if each of their corresponding indicator value falls within the value range defined by slider control 214. Slider control 216 performs a similar task to slider control 214, with the only difference that it allows the user to define a percentage or decile range within which the tiles displayed in the middle portion 102 of display 80 remain visible if each of their corresponding indicator value falls within the decile range defined by slider control 216.

As an example, FIG. 5 illustrates that for the Dividend indicator the user has the choice to define a preferred range by choosing values between 1.72% and 7.80%. As the user varies the slider control 214 by moving the left marker 226 or the right marker 221 the corresponding values 210 keep changing until the desired 1.72% and 7.80% are reached. Simultaneously the markers 230 and 232 follow the movement of slider control 214. So when the user is satisfied with the numbers on slider control 214, the corresponding numbers 212 for slider control 216 display the values of 50% and 98%. This means that of all the stocks that were originally positioned based on their dividend values, only those that fall within the range defined by the two sliders remain visible and the rest become hidden to the user. It is appreciated by those skilled in the art that slider controls 214 and 216 work in tandem, such that when the user controls one of them, the other automatically varies its range so that the resulting selected stocks are the same in terms of value range or decile range.

Slider controls 214 and 216 offer the user the ability to express in two different ways a desired query, either in value or in terms of a stock's relative position in the distribution. This feature allows the user who may not be familiar with a value range for a particular indicator to still select a reasonable range based on the decile or percentage range of the stocks within a defined range. For example, for the indicator Kurtosis which is a sub-category of Risk category 156 in FIG. 3, if the user has no precise idea of the values taken by this indicator (while knowing what a high or a low Kurtosis means in terms of risk) or if the user is more interested in the relative position of the stocks, decile slider control 216 is a better option to control the range of the stocks to be visualized based on their percentage range. For example, for the Kurtosis indicator, the user may select the top 30% of stocks whatever their Kurtosis value. Once slider 216 is varied until the top 30% are selected, the user can see the value range of the Kurtosis for those stocks by reviewing the numbers corresponding to the value slider control 214.

Conversely, a user may not have a precise idea of the percentage range of values taken by a given indicator. In that case, by varying the value slider control 214 for that indicator, the percentage numbers corresponding to decile slider control 216 become apparent. For instance, a user might want to see the stocks with a beta coefficient below 0.30. But when the user moves value slider control 214 accordingly and sees on the decile slider control that the chosen 0.30 value corresponds to only 10% of the total number of stocks, the user may instantly reject the initially selected threshold value as being too narrow and selective for a reasonable investment strategy.

In accordance with another embodiment of the invention, and referring to FIG. 5, for each pair of slider controls 214 and 216, a reverse ranking button 227 is available to reverse the default classification order of the selected indicator. For example, for each of the desired picking views, each stock is linked to a given rank in the whole distribution of the stocks in a selected universe. By default, stocks are ranked from lowest value or lowest decile, to highest value and highest decile. This correspondence may seem reasonable for indicators like Sales Growth, where the higher value is the more desired feature. However, the opposite may be sought for other indicators such as volatility, where a lower value is more desired. In that case, the user may reverse the ranking process by pressing the reverse ranking button 227 for volatility specifically. In response, a stock ranked in the top decile for Sales Growth and Volatility indicators will be a stock with high Sales growth and low volatility. Otherwise the stocks would be selected based on high Sales Growth and high volatility.

FIGS. 6(a)-6(c) provide an example illustrating how the control of variable slider controls 214 and 216 can affect the visualization of stocks in a financial market. To this end, FIG. 6(a) illustrates an arrangement where the indicator for the position slot is the market cap ranking, the indicator for the color slot is Total Return ranking and the indicator for the filter slot is the percentage of sell-side recommendations or Reco (%) ranking. As illustrated if the variable slider controls 214 and 216 are not touched by the user all stocks within the universe appear visible. The user has selected the Ranking Chart for this example. The market caps range from 0.01 billion Euros to 207 billion Euros. The Total Returns values range from −76.6% to +214%. All stocks with recommendation percentages from 0.00% to +100% are also illustrated. New snapshot indicator 230 shows that 680 out of 680 available stocks are visible.

In FIG. 6(b) value slider 214 moved to the right to select Market cap values above 9.07 billion Euros. At the same time decile value slider 216 automatically moves to the right and as illustrated in space 232, a population equal to 35.4% of the total number of stocks or 241 stocks remain visible as shown by snapshot indicator 230.

Finally in FIG. 6(c) value slider 214 is moved to the right for the second indicator which is Total Return indicator, to select values above 0.98% return. This further narrows down the number of visible tiles to 98 stocks as indicated by new snapshot indicator 230 and shown in space 232.

Figure 6:
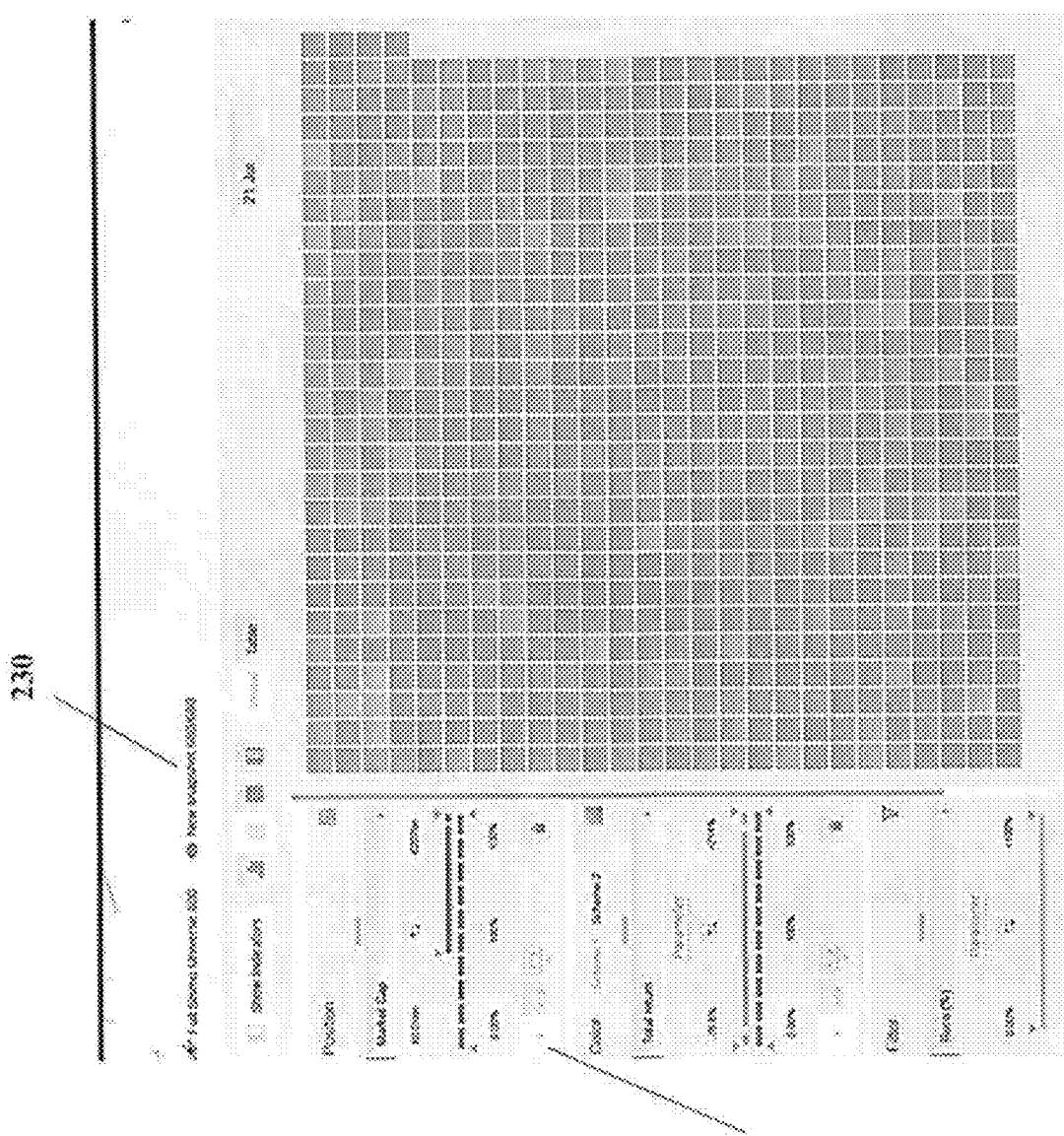
FIGS. 6(a)-6(c) provide an example illustrating how the control of variable slider controls 214 and 216 can affect the visualization of stocks in a financial market, in accordance with one embodiment.
Figure 6:
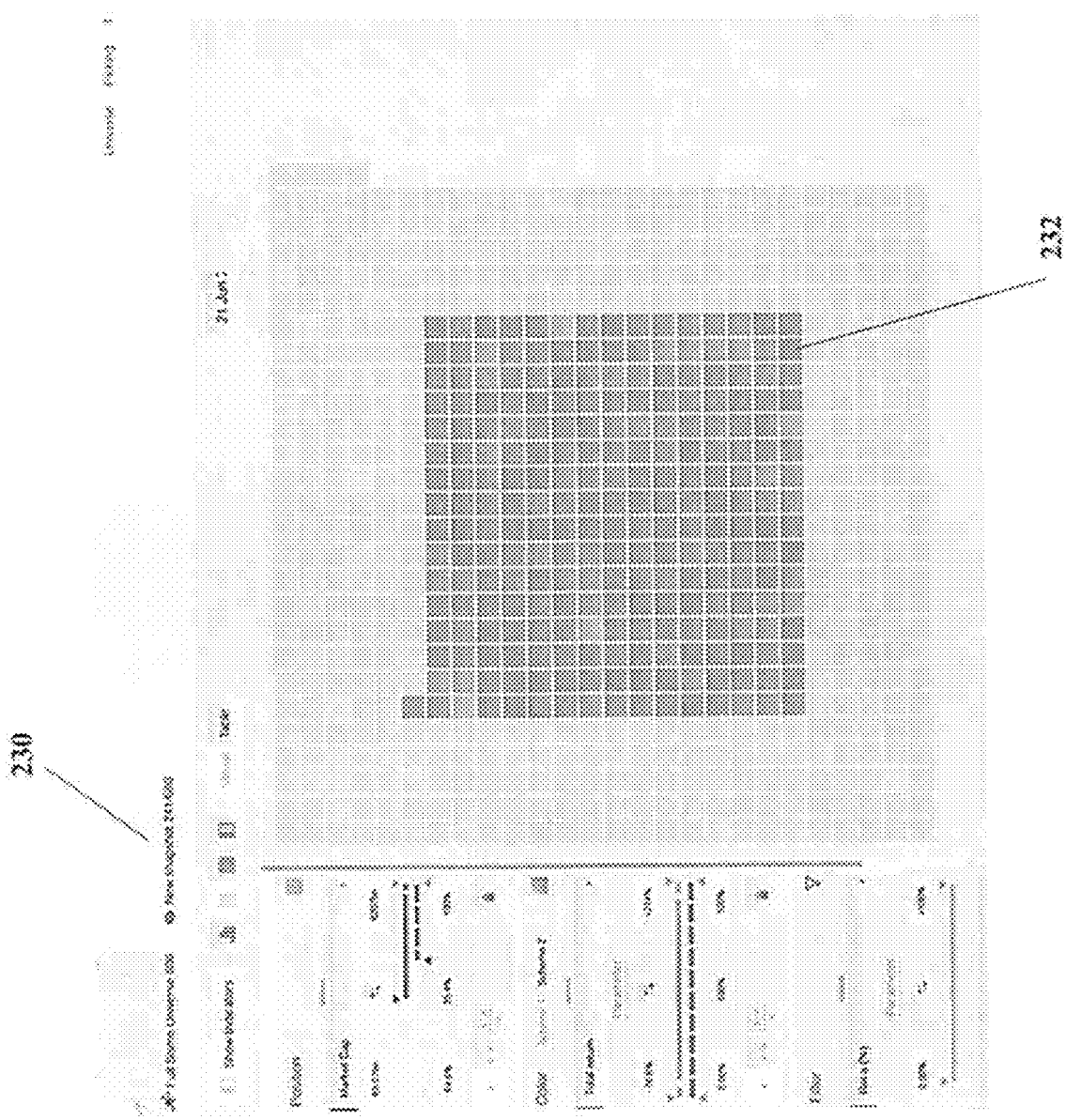

In accordance with another embodiment of the invention, FIG. 6(c) illustrates additional mean distribution buttons 240, 242 and 246 corresponding to the Position and Color slots of left panel 108. Button 240 represents the standard raw value button. These buttons are also available in Filter slot (although not visible on FIG. 6 (c)). When this button is pressed, display 80 depicts the tiles based on the corresponding indicator raw value. Button 242 is a Mean-centered button. When button 242 is activated, the values displayed on display 80 are not based on the indicator raw value. The values displayed are based on the raw value minus the average value of the entire distribution range relating to the selected indicator. This feature allows the user to quickly flag where a stock is located relative to the average value of the distribution. Advantageously, averaging or standardizing with buttons 242 and 246 does not change the relative position of the tiles. It is just the value itself that is transformed as user can see through tooltips. The user can quickly assess which stocks are above or below the mean of the distribution for the indicator for which button 242 is pressed Button 246 is a Standardized button. When button 246 is activated, the values displayed on display 80 are indicator values that are expressed in (positive or negative) standard deviation from the mean value relating to the selected indicator.

Value slider 214 and decile value slider 216 can be employed on all four picking views described above. Furthermore the value sliders 214 and 216 can be employed with three indicators at the same time. This means that a user can filter the stocks matching the intersection of up to 3 or more filtering criteria at once with the ability to adjust them dynamically simply by moving the sliders to the right or left.

Mean-centered display or Standardized display features do not affect the position of the tiles. They offer an alternative way to read the indicator value and help the user to perform relative positioning analysis.

In an exemplary application, a user might select an indicator's range in standard deviation, which is another way of expressing an investment policy. For instance, after pressing button 246, a user can select stocks within a value range comprised between −1 and +1 standard deviation around mean for any indicator by entering −1 and +1 for values 210. Furthermore, by pressing thereafter button 240, value 210 is displayed as the raw indicator values corresponding to the [−1; +1] standard deviation interval around mean. For instance, if a distribution is Gaussian, 95% of the distribution is expected to fall inside ±2 standard deviation from mean. By selecting 246 and entering −2 and +2 for value 210, a user can check whether this is actually the case by looking at values 212 [actually through direct reading of the decile width which is the number in-between 212 in FIG. 5 but not referenced], thus being able to easily discard the Gaussian hypothesis.

FIGS. 7-11 illustrate the shape of the stock tiles in accordance with the four available picking views. For example, with reference to FIG. 7(a), a Shape Chart is illustrated based on the selection of two indicators Market Cap in the position slot and Total Return in the color slot, and Beta coefficient for the Filter slot. As mentioned earlier, the position slot 126 allows the visualization of the relative position of the stocks for the selected indicator depending on the tiles' position from bottom left to the top right. By default the top right tile represents the indicator with the highest value and the bottom left tile represents the indicator with the lowest value. To this end, tile 260 in FIG. 7(*a*) represents a stock with the highest Market Cap among the stocks contained in the selected Universe. Tile 262 in FIG. 7(*a*) represents a stock with the lowest Market Cap among the stocks contained in the selected Universe.

As mentioned earlier, color slot 128 allows the visualization of the relative position of the stocks for the selected indicator based on the background color of the tiles. Each tile in FIG. 7(*a*) has a background color corresponding to the indicator value relative to the other represented companies. The range of color spans from red to green passing from grey for neutral. Color slot 128 provides two options for color schemes selectable by buttons 264 for the first color scheme and button 266 for the second color scheme.

As for the first color scheme, the various shades of color for the displayed tiles follow a continuous intensity spectrum from one color that represents the minimum value for the selected indicator to another color that represents the maximum value for the selected indicator. Any tile background color depends on its difference in value (expressed in standard deviation) between the indicator value of the stock and the average value of the indicator value for all the stocks in the selected Universe. As for the second color scheme, the tiles acquire discrete decile color schemes. To this end, one color corresponds to one decile in the range of the selected indicator values. To this end the display provides ten separate colors, where each color represents a value within a 10% range. The stocks with an indicator value falling within the top 10% range will display with one color. The stocks with an indicator value falling within the next top 10% range acquire a second distinct color and so forth.

With reference to FIG. 7(*a*) again, a table or pad 270 is displayed that provides the statistical distribution details for the Shape Chart. In addition to providing statistical data, table or pad 270 enables the user to apply a scaling feature relative to the position slot, that allows the user to either rely on optimized automatic scaling (by default and reloadable with the curved arrow button 271) or to manually input scale either symmetrical from mean and expressed in standard deviation ($\sigma$) or asymmetrical from mean, by expressing the size of the left and right distribution tails in % by using button 273. As illustrated in FIG. 7(*a*), the selected ±0.6$\sigma$ scaling option indicates that the user has chosen a symmetrical scaling with continuous representation inside ±0.6$\sigma$ around mean, and all other stocks aggregated in tails representations below and beyond such interval. Furthermore, table or pad 270 indicates that a consequence of such scaling is that the bottom tail represents 2% of all stocks in the distribution and the top tail represents 14% of all stocks the distribution. In addition, by clicking on Show Quartile button 275, the user can highlight tiles representing min, max and all interquartile values. The distance to the mean is also shown on the bottom of the Shape chart axis legend To this end, the mean is computed as the average value of the distribution on the position slot indicator. Standard deviation {$\sigma$} is also computed on the same indicator for the entire distribution. The +/−0.6$\sigma$ denotes the population that is within {mean−0.6$\sigma$} and {mean+0.6$\sigma$}. In the example illustrated in FIG. 7(*a*), a user can recognize that the range of tiles illustrated within the specified standard deviation range corresponds to 84% of the population. As such 14% of the population is above {mean+0.6$\sigma$} and 2% of the population is below {mean−0.6$\sigma$}. The filter slot allows the visualization of stocks corresponding to the selected indicator value, for this case beta, that fall within the range defined by the filtering parameter. Stocks outside this filtering range are greyed out.

FIG. 7(*b*) illustrates the operation of value slider 214 and decile slider 216 and the way it affects the visualization of the tiles within the Shape Chart. For example, value slide 214 is moved so as to define a market cap range between 9.54 billion Euros and 184 billion Euros. For the color slot, the value sliders 214 and 216 are adjusted such that the Total Return indicator falls within a range between 0.00% and 201%. As illustrated middle portion 102 of display 80 displays the tiles that meet the criteria set by the variable sliders for the Market Cap indicator in the Position dimension and for the Total Return indicator in the Color dimension. FIG. 7(*b*) does not show the selected indicator for the Filter dimension. Although in accordance with other embodiments of the invention, a user may also select a Filter dimension to further control the visibility of tiles based on a third indicator.

Figure 8:
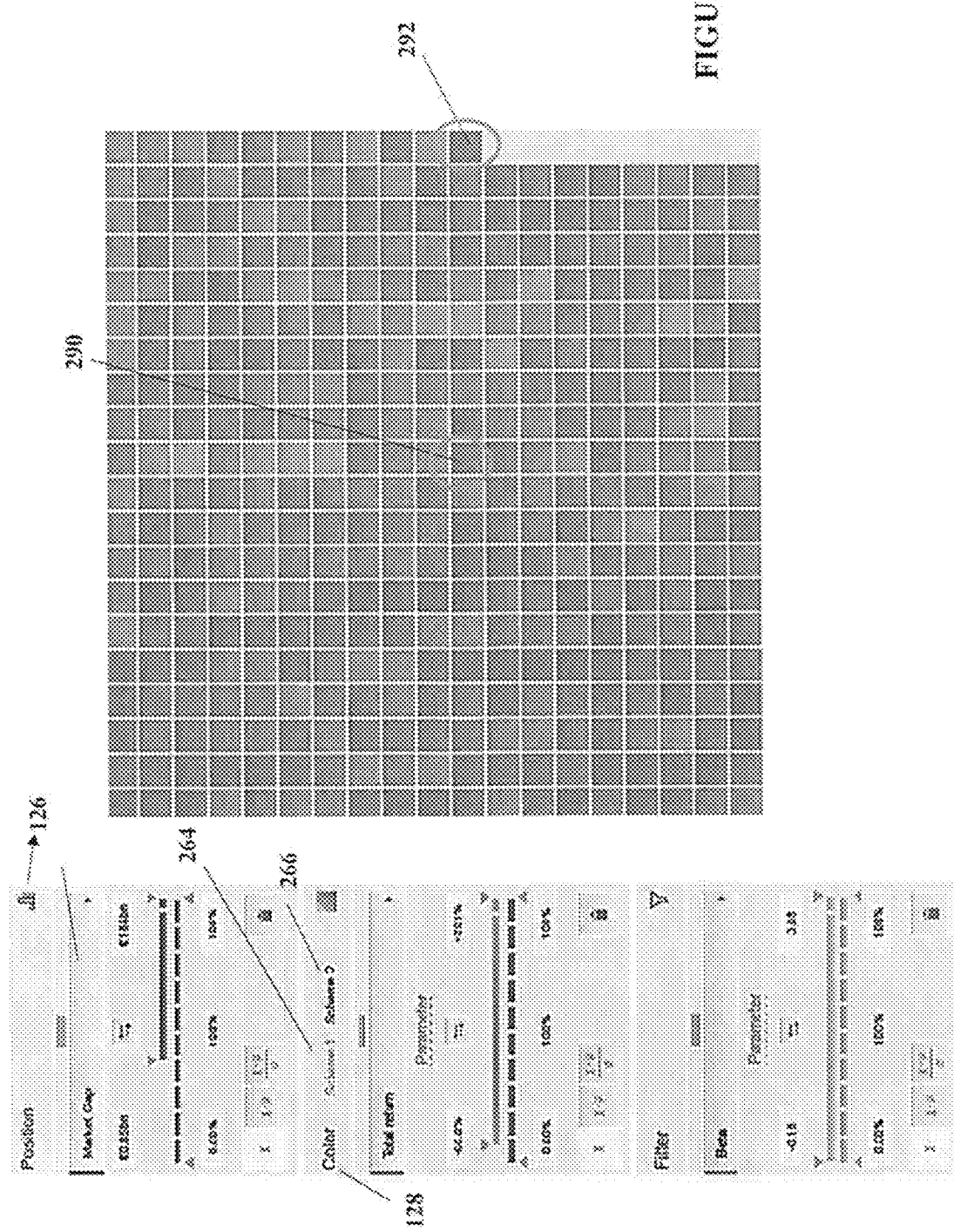
Figure 8:
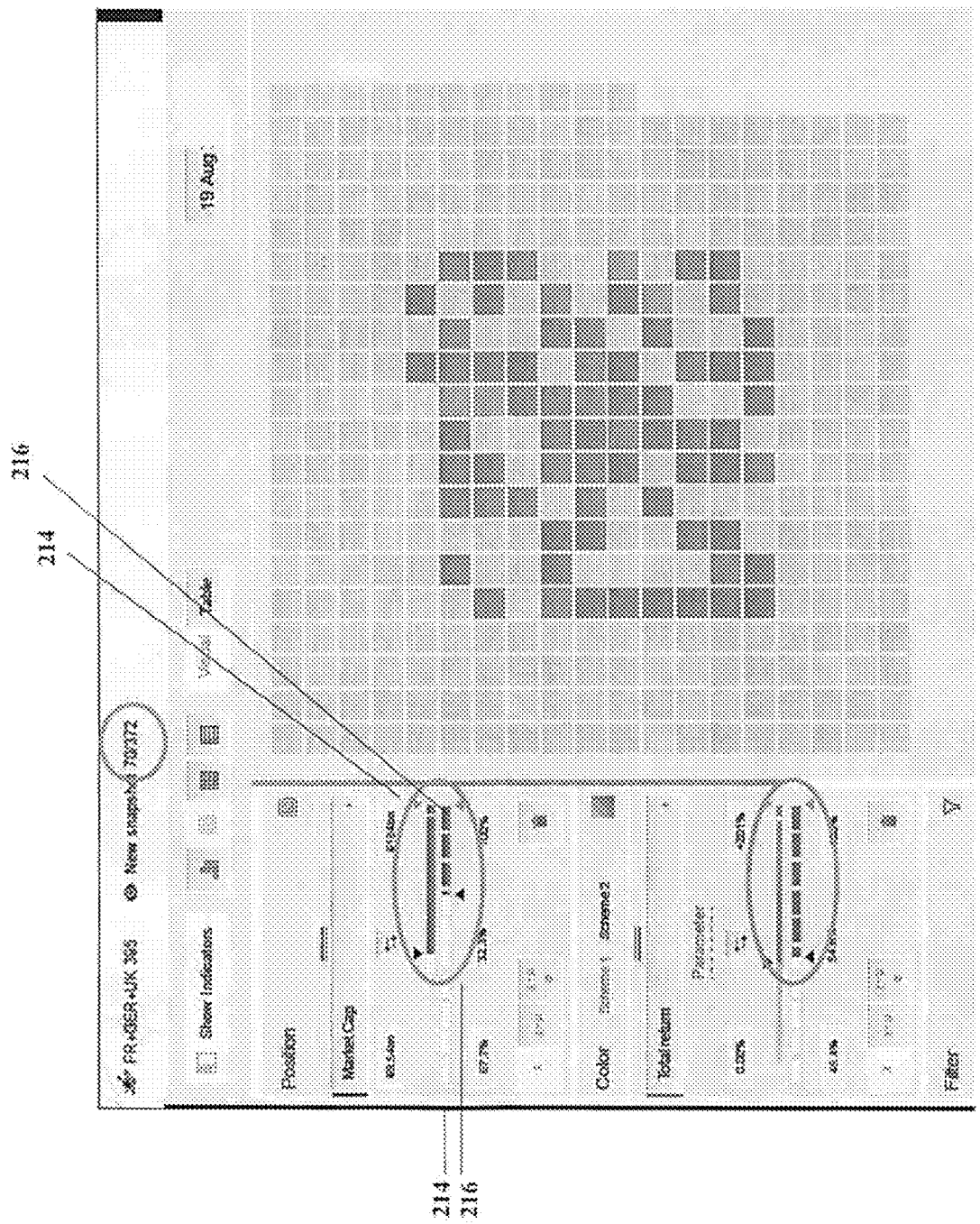

With reference to FIG. 8(*a*), the user can select the Rank Chart picking view as illustrated, keeping intact the selection of two indicators Market Cap in the position slot and Total Return in the Color slot, and Beta coefficient indicator for the Filter slot. In the Rank Chart mode, the position slot 126 allows the visualization of the relative position of the stocks for the selected indicator depending on the tiles' position in a snail formation. By default the center tile represents the indicator with the highest value and the most outside right tile represents the indicator with the lowest value. To this end, tile 290 in FIG. 8(*a*) represents a stock with the highest Market Cap among the stocks contained in the selected Universe. Tile 292 in FIG. 8(*a*) represents a stock with the lowest Market Cap among the stocks contained in the selected Universe.

As mentioned earlier, Color slot 128 allows the visualization of the relative position of the stocks for the selected indicator based on the background color of the tiles. Each tile in FIG. 8(*a*) has a background color corresponding to the indicator value relative to the other represented companies. The range of color spans from red to green passing from grey for neutral. Color slot 128 provides two options for color schemes selectable by buttons 264 for the first color scheme and button 266 for the second color scheme.

As for the first color scheme, the various shades of color for the displayed tiles follow a continuous intensity spectrum from one color that represents the minimum value for the selected indicator to another color that represents the maximum value for the selected indicator. Any tile color depends on its difference in value (expressed in standard deviation) between the indicator value of the stock and the average value of the indicator value for all the stocks in the selected Universe. As for the second color scheme, the tiles acquire discrete decile color schemes. To this end, one color corresponds to one decile in the range of the selected indicator values. To this end the display provides ten separate colors, where each color represents a value within a 10% range. The stocks with an indicator value falling within the top 10% range will display with one color. The stocks with an indicator value falling within the next top 10% range acquire a second distinct color and so forth.

FIG. 8(*b*) illustrates the same Rank Chart described in FIG. 8(*a*) with the user controlling the visibility of the tiles based on varying the range of values defined by value sliders 214 and 216. As illustrated, the variable sliders in FIG. 8(*b*)

are set to the same levels as those described in reference with FIG. 7(*b*). To this end, the user can visualize the tiles in the Rank Chart based on the filtering criteria set forth by the variable sliders. Stocks that are dimmed and do not appear visible are those that are outside the range specified by the user by employing the variable sliders, based on the range defined for the Market Cap indicator and the range defined for the Total Return indicator.

Figure 9:
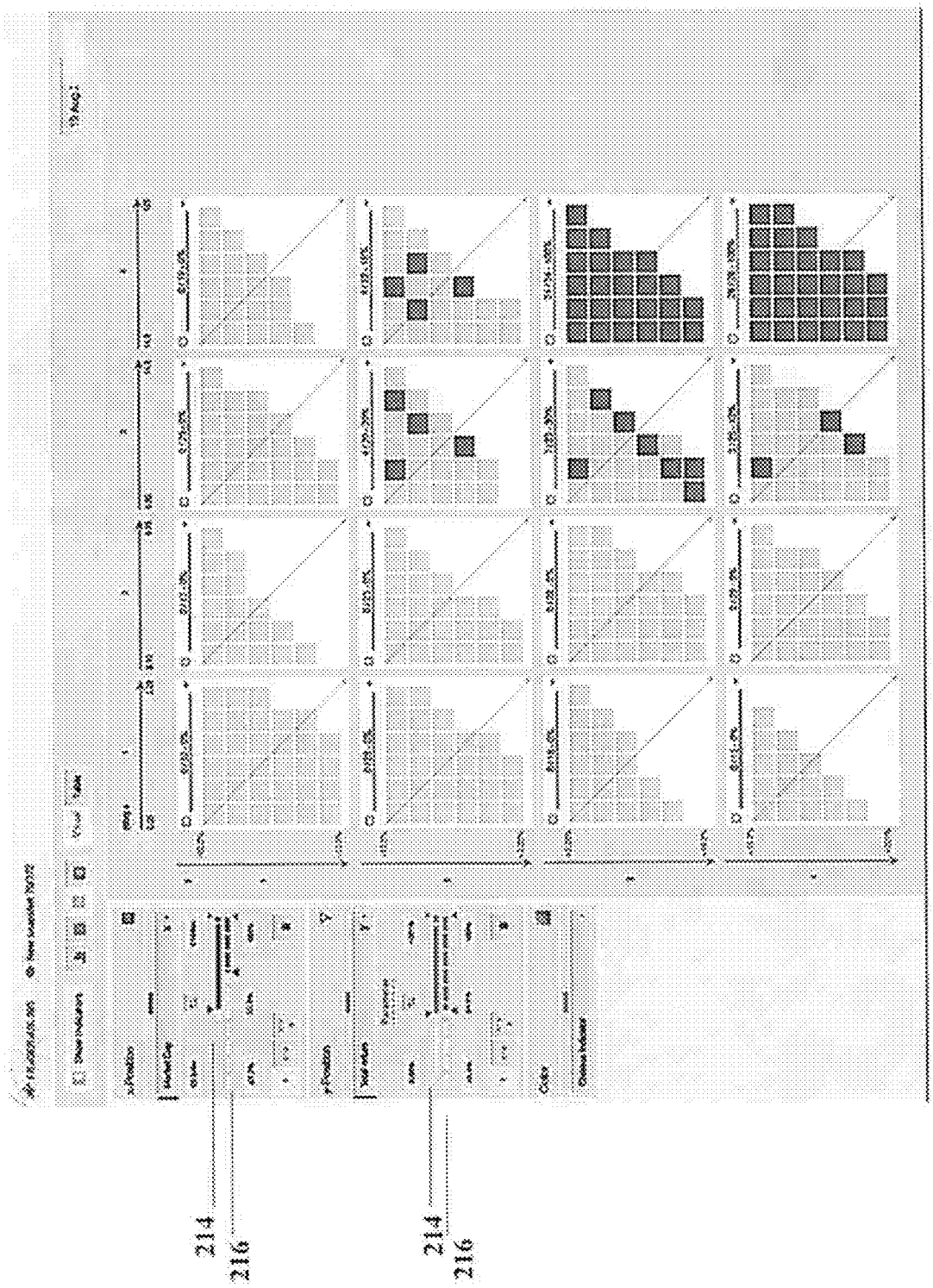

With reference to FIG. 9 (*a*), the user can select the Quartile Chart picking view as illustrated. The Quartile Chart has three slots including horizontal X-Position slot 310, a vertical Y-Position slot 312, and a Color slot 316. For each of these slots, the user can select a desired indicator. As mentioned earlier, the Quartile Chart picking view allows the user to visualize a retrieved set of stocks in a two-dimensional arrangement enabling the user test potential statistical relations or correlations between two indicators by just viewing the resultant chart. For instance the user can quickly notice if there is a statistical relation between stocks' volatility level and their market cap. Based on the quartile selection both in the horizontal and vertical planes all Quartile Chart picking views include 16 divisions where each division includes a quarter of stocks having a range of values corresponding to a one fourth of the entire value range of the indicator values along the horizontal axis for a first selected indicator and further corresponding to one fourth of the entire value range of the indicator values along the vertical axis for a second selected indicator.

To this end, with reference to FIG. 9(*a*), the user by selecting an indicator for X-Position slot can visualize the relative position of stocks for the selected indicator depending on the position of the tiles from horizontal quartiles 1-4. For example, the user can select the Market Cap indicator for X-position slot as illustrated by button 318. The user has also selected the Beta coefficient indicator for Y-Position slot which allows the user to visualize the relative position of stocks for this indicator depending on the position of the tiles from vertical quartile 1 to vertical quartile 4.

As illustrated in FIG. 9 (*a*), display area 182 is divided into four horizontal and four vertical quartiles for a total of 16 subsections. For the example illustrated in FIG. 9(*a*), the horizontal quartiles include a first quartile 320 that contains all the stocks with market capitalization ranging between 0.05 billion Euros to 3.09 billion Euros. A second quartile 322 contains all the stocks with market capitalization ranging between 3.10 and 5.78 billion Euros. A third quartile 328 contains all the stocks with market capitalization ranging between 5.80 and 14.5 billion Euros. A fourth quartile 328 contains all the stocks with market capitalization ranging between 14.9 and 125 billion Euros. The distribution of the stocks includes an arrangement where the lowest value is on top left tile, for each quartile, such as 340 for quartile 320, 342 for quartile 324, following a transversal path as shown by arrows 350.

The vertical quartiles include a first quartile 352 that contains all the stocks with Beta coefficient indicator ranging between −0.18 and 0.60, a second quartile 354 that contains all the stocks with Beta coefficient indicator ranging between 0.60 and 0.81, a third quartile 356 that contains all the stocks with Beta coefficient indicator ranging between 0.81 and 1.14 and a fourth quartile 358 that contains all the stocks with Beta coefficient indicator ranging between 1.14 and 3.08. By viewing the quartile chart, a user can determine that low market cap stocks with low Beta coefficient value are densely populating the top left quartile. In the same way the highest market cap stocks with the highest Beta coefficient values are also densely populating the lowest right quartile. As such the user can surmise that Market Cap values and Beta coefficient indicator are partially positively correlated.

Finally color slot 316 allows the user to visualize the relative position of stocks for a selected indicator such as Total Return based on the background color of each tile. Each tile has a background color corresponding to the selected indicator value relative to other represented companies, ranging from red to green passing from grey for, neutral as discussed before with reference with Position Chart and Rank Chart displays.

FIG. 9(*b*) illustrates the same Quartile Chart described in FIG. 9(*a*) with the user controlling the visibility of the tiles based on varying the range of values defined by value sliders 214 and 216. As illustrated, the variable sliders in FIG. 9(*b*) are set to the same levels as those described in reference with FIG. 7 (*b*) and FIG. 8(*b*). To this end, the user can visualize the tiles in the Quartile Chart based on the filtering criteria set forth by the variable sliders. Stocks that are dimmed and do not appear visible are those that are outside the range specified by the user by employing the variable sliders, based on the range defined for the Market Cap indicator and the range defined for the Total Return indicator.

FIG. 10 illustrates another Quartile Chart 360, where the X-Position indicator is Price and the Y-Position indicator is the Beta coefficient indicator. As shown by the number of the tiles in each of the 16 sub-divisions, the population of the stocks are relatively equally distributed within each of the quartiles. A user can surmise that Price values and Beta coefficient indicator are not statistically correlated. In another example as illustrated in FIG. 10, a user can surmise a strong statistical correlation as expected between the percentage of brokers with a Buy recommendation and the difference expressed in percentage between the latest stock price and the brokers consensus target price. The bigger such difference, the higher the overall level of Buy recommendations.

Figure 11:
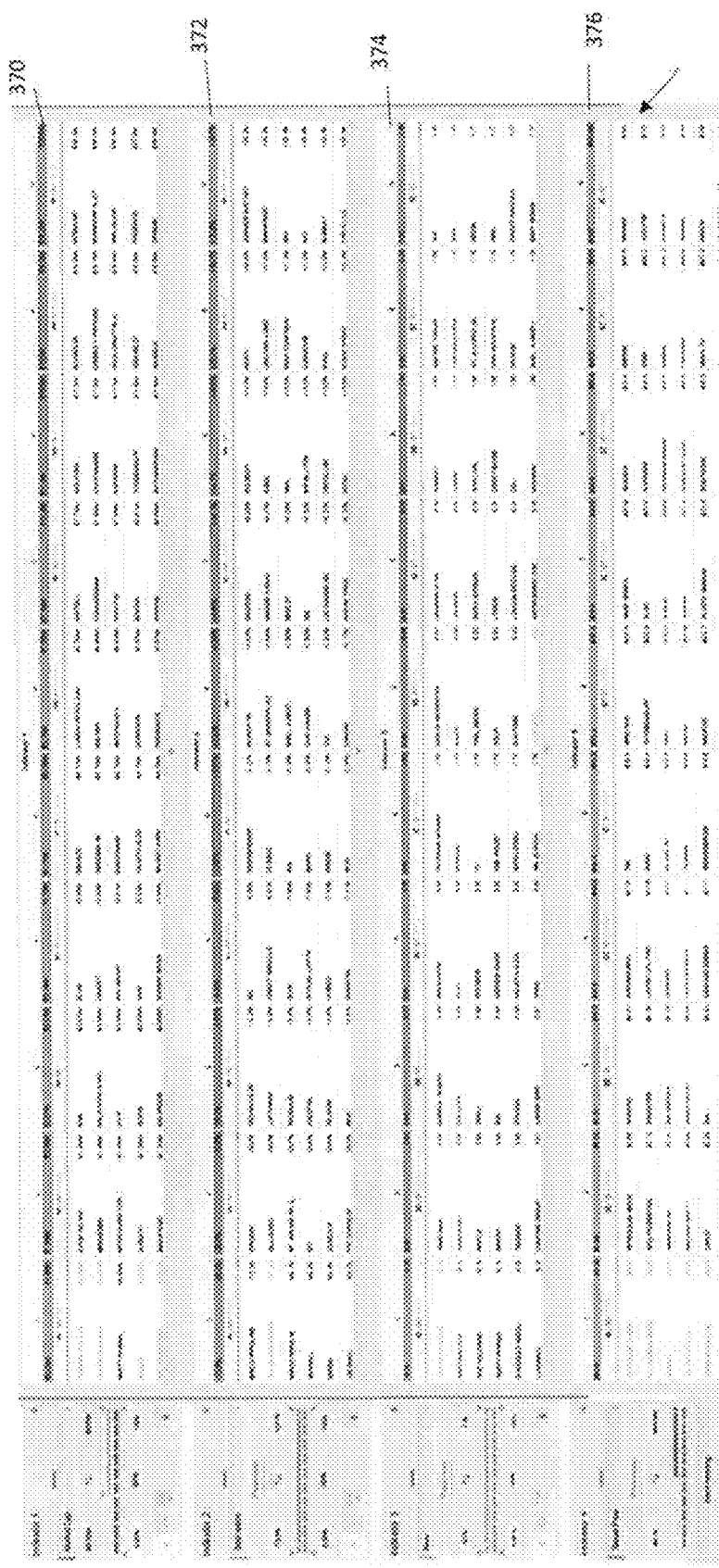
Figure 11:
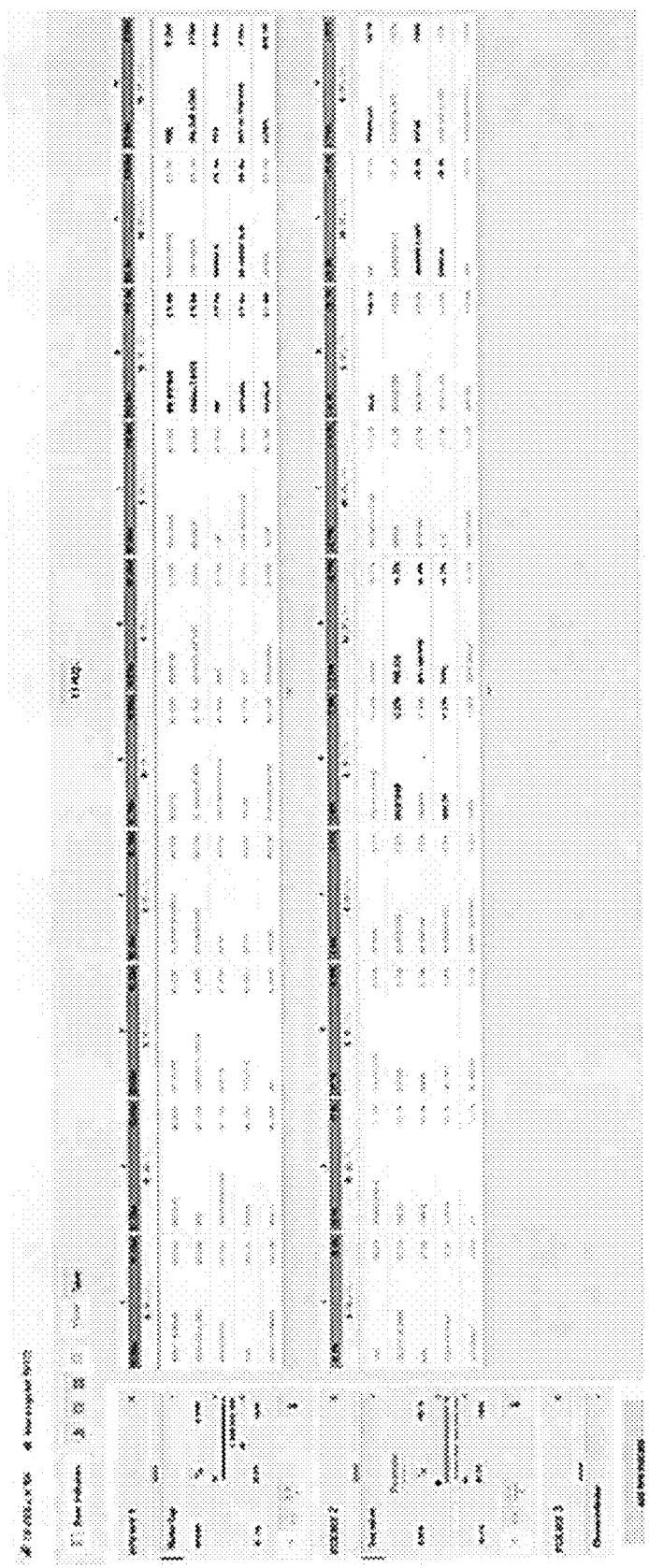

FIG. 11(*a*) illustrates a Matrix Chart picking view with four indicators. As mentioned earlier, this picking view allows the user to study more than 3 indicators at once. On each row each company within the selected Universe of stocks is classified depending on its decile position. As illustrated in FIG. 11(*a*) the first indicator is the Market Cap and the second indicator is Total Return and the third indicator is the Beta coefficient and the fourth indicator is the Target Price. In accordance with one embodiment, the horizontal axis is divided into 10 deciles so as to contain one tenth of the stocks within the selected Universe that fall within a corresponding one tenth value for the selected indicator. For each indicator distribution a background coloring band such as 370, 372, 374 and 376 convey information about the value distribution. For example, color band 372 which represents the Total Return indicator displays a gradual change of color from red indicating negative returns (losses) to dark green indicating highest returns.

The first 5 rows of each decile column are visible by default and a full matrix display can be activated by a control button such as 371 on the sixth line of all indicator bands. Any stock user may look up from retractable right hand side panel 80 in response to which stocks are automatically highlighted and dragged in the first row of the corresponding column in all matrices simultaneously, therefore providing direct visual recognition.

When stocks are added in the buffer list for instance or a list of stocks is loaded on the right hand panel 80, the user can visualize as a priority the highlighted stocks in the first 5 rows of each decile. For example, if 600 stocks are loaded each decile comprises 60 stocks. If all stocks from CAC40 index is loaded the user sees the stocks of CAC40 in the first 5 rows of each decile. This allows the user to quickly flag most CAC40 stocks' position in each decile for each indicator, rather than opening the drop down pane for each indicator.

In other words, the matching stocks are move up in ranks in the first 5 rows or more lines in their responsive columns. Although accuracy may be lost, since relative position in each column is not followed, but there is a gain by not having to open the full matrix to locate those matching stocks.

Other lookup options like peer group visualization also drag relevant stocks up in their corresponding column so as to be visible by default to the extent possible. By default the stocks are sorted from lowest to highest values in each decile.

With reference to FIG. 11(b), the same Matrix Chart described in FIG. 11(a), where the user has selected the Market Cap indicator and the Total Return indicator, further controlling the visibility of the tiles can be achieved based on varying the range of values defined by value sliders 214 and 216. As illustrated, the variable sliders in FIG. 11(b) are set to the same levels as those described in reference with FIG. 7 (b), FIG. 8(b) and FIG. 9(b). To this end, the user can visualize the tiles in the Matrix Chart based on the filtering criteria set forth by the variable sliders. Stocks that are dimmed and do not appear visible are those that are outside the range specified by the user by employing the variable sliders, based on the range defined for the Market Cap indicator and the range defined for the Total Return indicator.

FIGS. 7, 7(a), 7(b), 8(a), 8(b), 9(a), 9(b), 10, 11(a), 11(b) illustrate the ease of visualizing stocks for the same indicators and the same filter ranges in various picking views. A user can seamlessly switch the picking views for the same selection criteria simply by choosing a desired picking view, for example by selecting one of the bottoms 110, 112, 114 or 116. Each picking view chart has a desired visualization purpose and the complimentary use of the picking views provides better insight to the user. Table 1 below illustrates the various advantages of each of the picking view charts compared to the others for various analysis objectives.

As illustrated by Table 1 in FIG. 7, Shape chart view provides a high degree of reading and understanding the overall distribution of the stocks. As for single-dimensional ranking, Rank Chart provides the best visualization for the user. To some extent, Decile picking view is also suited for single-dimensional ranking. As for direct reading of the correlation for 2 attributes and bi-dimensional filter, Quartile chart is the best option and Rank and Decile Charts provide some insight to the user. For multidimensional correlations, Decile Chart view is the best option for the user.

As for the significance of the charts in Table 1, FIG. 7, for cognitive and analytical tasks, Shape charts provide the best insight for global apprehension and recognition of the distribution of the stocks for any desired set of indicators. Similarly, for research on determining anomalies, Shape charts provide the best insight. As can be seen, Rank Charts, Quartile Charts and Decile Charts provide excellent insight for comparison and distinction of the stocks. For categorization and association, both Quartile and Decile Charts provide excellent insight. Finally, for visualizing the ranking of the stocks based on the selected indicators, Rank Charts provide the most natural insight, followed by Quartile Charts and Decile Chart.

In accordance with one embodiment of the invention, once the user selects a first indicator for a first slot, such as the Position slot and a second indicator for a second slot, such as the Color slot and views a chart based on one of the selected picking views, the user can switch the order of the indicators assigned to the selected slots. By switching indicators for instance from Position slot to Color slot and vice versa, the user is enabled to have another reading of the same information. Indicator values for the previous slot 2 will be readable on the tile and the sorting applied would convey a more precise relative positioning visualization than while the indicator was in color slot.

When the user selects indicator 1 and 2 respectively in Position and Color slot, it will be easier for the user to assess relative positioning for slot 1 than slot 2 because user can see the distance between tiles and also the value of the indicator inside each tile (in Rank view).

If the user simply switches indicator 2 from Color slot to Position slot, he will be able to immediately see the stocks relative positioning depending on indicator 2 instead of indicator 1. If indicator 1 is switched to Color slot, now the information on indicator 1 will solely be the color background which still gives an indication of the position but that is less precise than positioning slot.

For example, the spatial distribution permits the user to assess relative positioning more precisely than the color distribution. For instance, for a given indicator, if the values for 5 stocks are very close, the spatial distribution will be of better help to assign a clear positioning ranking of each stock. If color slot is used, color might be the same or very close between stocks so that it won't be possible for user to grasp a clear difference in rank between the 5 stocks. However for 5 stocks with very different values, both positioning and color distribution will allow user to get a grasp of the magnitude of the differences.

Furthermore, by allowing the user to switch the position of the indicators the results of a user's query, based on the user's initial idea of having indicator 1 in spatial distribution and indicator 2 in color distribution, might lead the user to consider the inverse orders as being more relevant. The switch enables to instantly change the order, instead of having to reload the indicators for each slot.

In accordance with one embodiment, and in reference with FIG. 1, right panel 450 enables the user to view any of the stocks displayed on middle portion 102 of display 80. This option can be accomplished advantageously in two ways. For example, the user can type the stock identification in field 452. The details of the stock are then displayed within a designated area on the right panel. A tile, such as 460, corresponding to the identified stock is then highlighted on middle portion 102 of display 80. Display 80 also provides the capacity for the user to identify tiles within the displayed chart that belong to a specific category as defined by the user through a drop down menu field 464. For example in FIG. 1 the user by selecting the Country category and further selecting France, allows the display to highlight all the French companies displayed meeting the selected criteria in field 108.

In accordance with one embodiment the user can highlight any one of the tiles currently displayed so as to visualize further details about the stock in stock identification field 452. The user can also visualize other tiles representing companies that can be considered peers to the selected stock identified in stock identification field 452, by selecting an option to view piers from field 464.

Advantageously, two types of peers are available for the user to visualize. The first type is system-defined peers based on sector classifications, and the second type of peers is those created in a user-defined list. By default, user-defined is pre-filled by the system's default sector peers selection but user can then add and delete stocks as desired. Checking out for peers is actually one way to distinguish a certain subgroup of stocks out of the one on display in 82, but other ways to distinguish a certain subgroup are also possible. Indeed, in accordance with various embodiments, any combination of sector, country and index components could form a relevant highlight list as well as any individual stock added and saved by the user. These additional stocks may have been identified by the user as a result of previous analysis, or for instance as pre-loaded existing portfolios of investment managers.

As such right panel 80 advantageously functions as a comprehensive highlighting panel, where in response to the user's selections, the system attaches recognizable patterns, such as a combination of bigger tiles, border colors and shading effects to the tiles on display 82. Additionally, the right panel gives user the ability to create and manage any list of stocks for saving as a list referred to as basket 463. The user can also gain access to a temporary buffer-list. In a list of the peer stocks relating to the stock identified by the user in field 462 of display 80. As mentioned before, the user has the ability to identify and highlight a stock, by either entering the stocks name or abbreviation code in field 452, in response to which the details of the stock would appear at panel 450, or conversely, the user can highlight a tile such as 460, and display 80 would provide all the pertinent information corresponding to the highlighted tile, such as the name of the stock and its related indicators. Field 462 displays a list of stocks that have been selected based on a category, such as peers to the highlighted stock, or stocks from a particular sector, industry, country, index or a selected previously stored list or basket. The tiles corresponding to the stocks listed in field 462 are advantageously highlighted on the displayed chart.

In accordance with one embodiment of the invention, a user can click on Alpha button 468, allowing the user to further visualize the historical performance of a portfolio constituted of the list of stocks displayed in area 462. The historical performance is therefore the performance of any list of stocks defined or recalled in the highlighted panel 80. It can be peers as well as any combination of sector, index and country components and single stocks added, buffer list or previously saved list.

Figure 12:
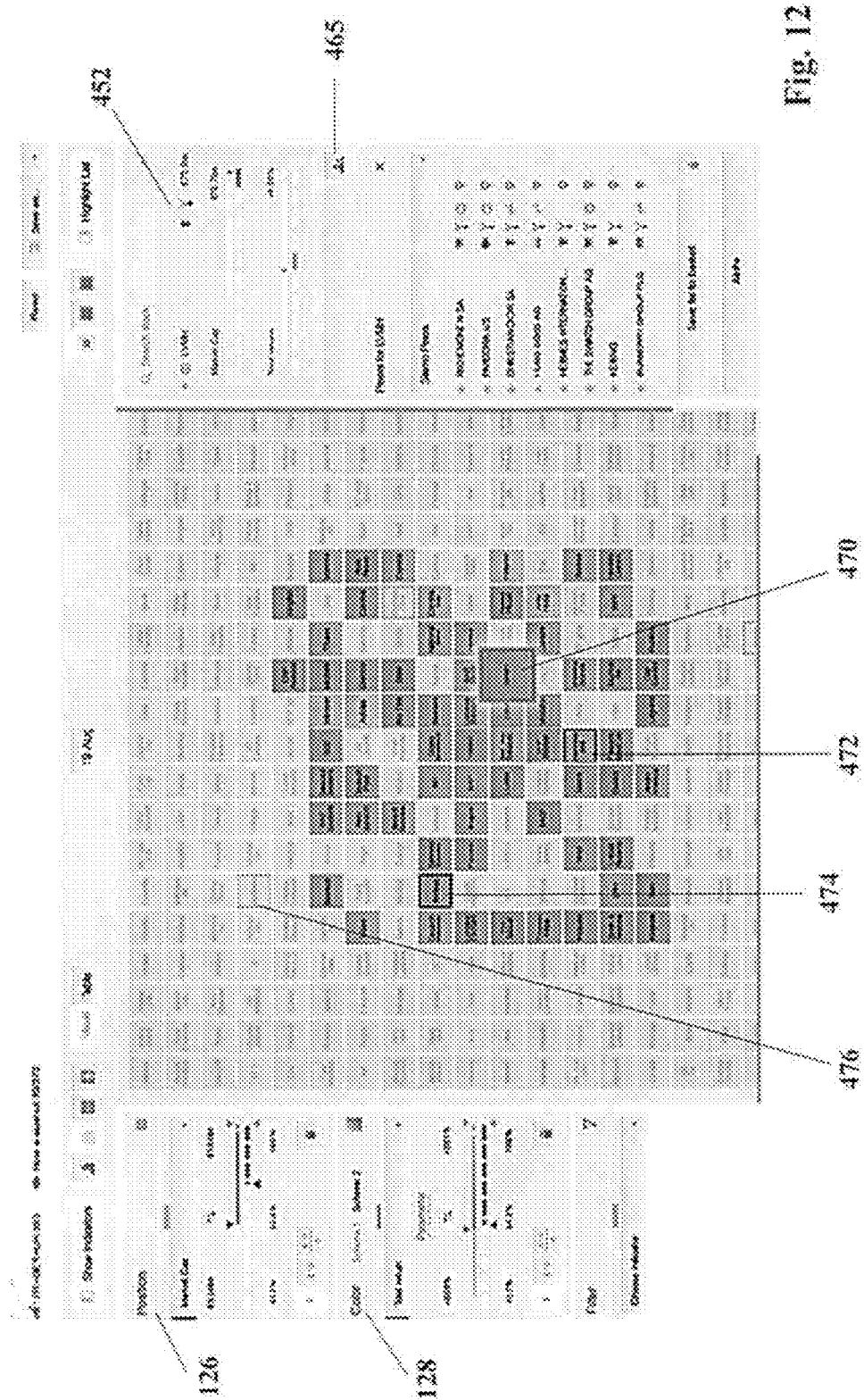
FIGS. 12(a)-12(d) illustrate examples of highlighting, in accordance with one embodiment.
Figure 12:
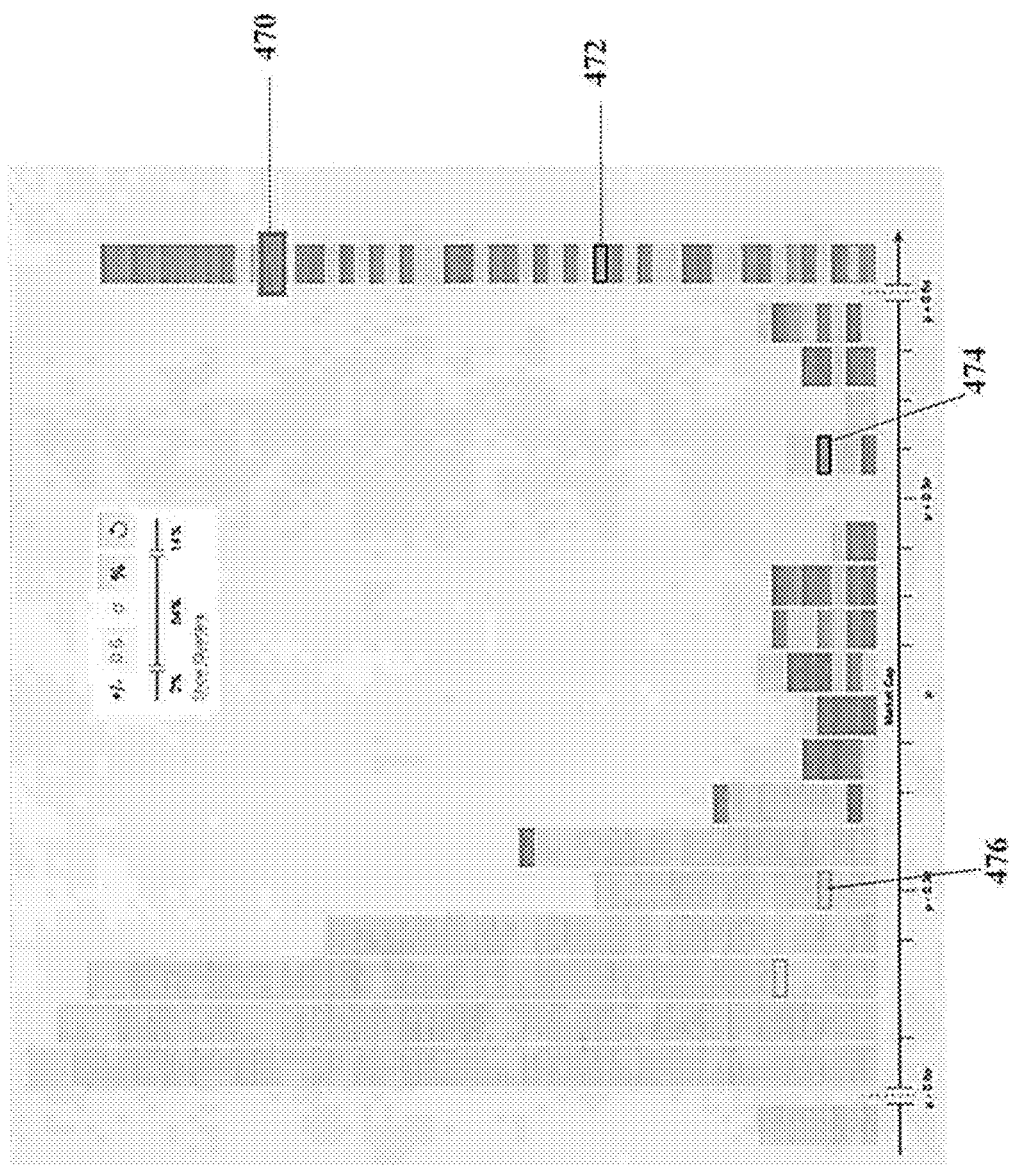
Figure 12:
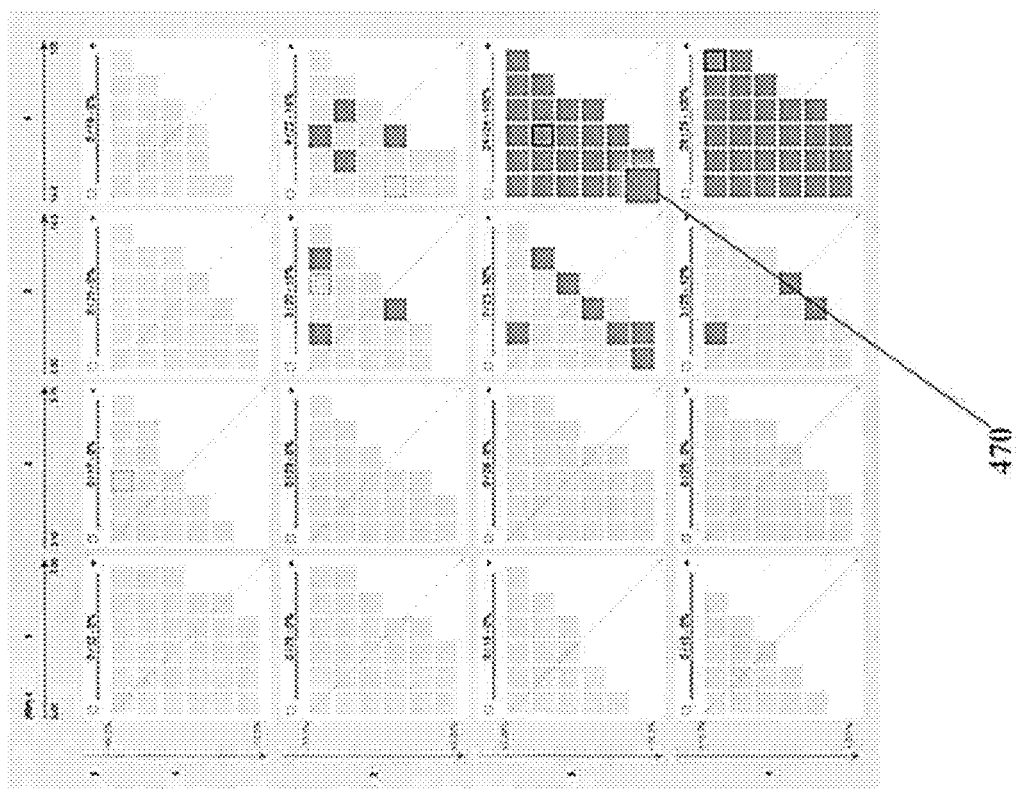
Figure 12:
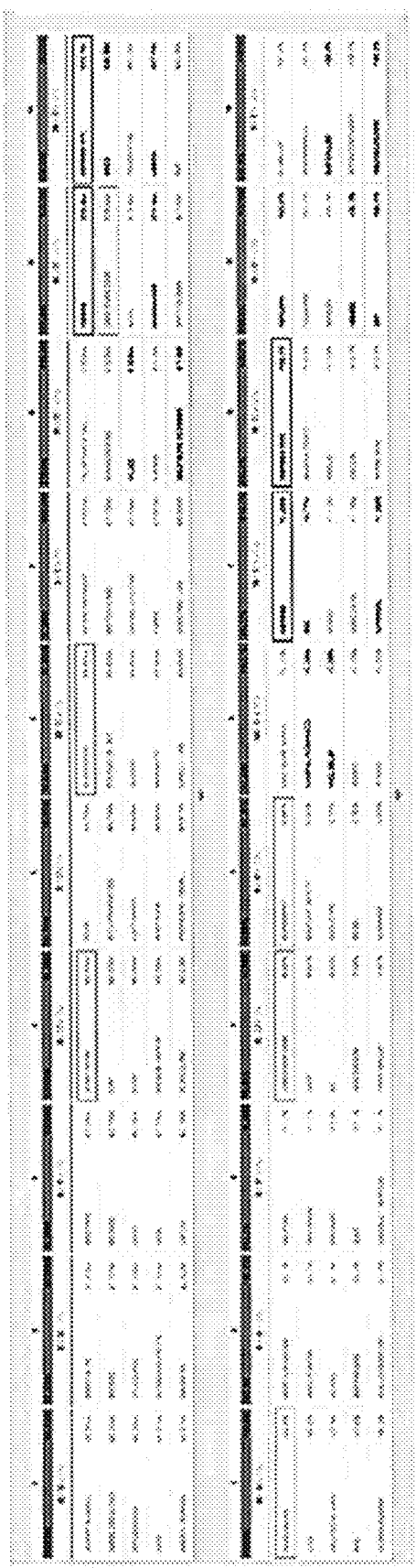

FIG. 12(*a*) illustrates an example of highlighting in accordance with one embodiment. As illustrated a user may type in LVMH in field 452 for highlighting. Here the user has not only typed in LVMH but also clicked on button 465 with double-head icon which calls for peers. In the drill-down below, the user has then the option to call for default system-defined peers (which is the case in FIG. 12(*a*) or user-defined peers.

A list of peer companies appears in field 462. At the same time, tile 470 corresponding to LVMH is highlighted on the corresponding view Chart. Tile 472 representing Hermes, tile 474 representing Kering are also highlighted. Since both tiles 472 and 474 are visible, the user understands that they both meet the criteria selected for each of the indicators Market Cap and Total Return as shown at slots 126 and 128. However, tile 476 which is dimmed and not visible relates to Burberry, which has failed to meet the criteria set forth for the selected indicators. FIG. 12(*b*) shows the same example as displayed on a Shape Chart, where all companies considered peers to LVMH are highlighted. Similarly, FIG. 12(*c*) shows the same example as displayed on a Quartile Chart, where all companies considered peers to LVMH are highlighted. FIG. 12(*d*) shows the same example as displayed on a Matrix chart where all companies considered peers to LVMH are highlighted. As illustrated in FIG. 12(*c*) Luxury goods companies (as peers for LVMH) are pushed up in the first rows of their respective decile columns so as to be visible in the first 5 rows that are permanently on display. The peers can be easily distinguished with their borders, such as white or grey depending if they are within the ranges specified by the user on all indicators.

Figure 13A:
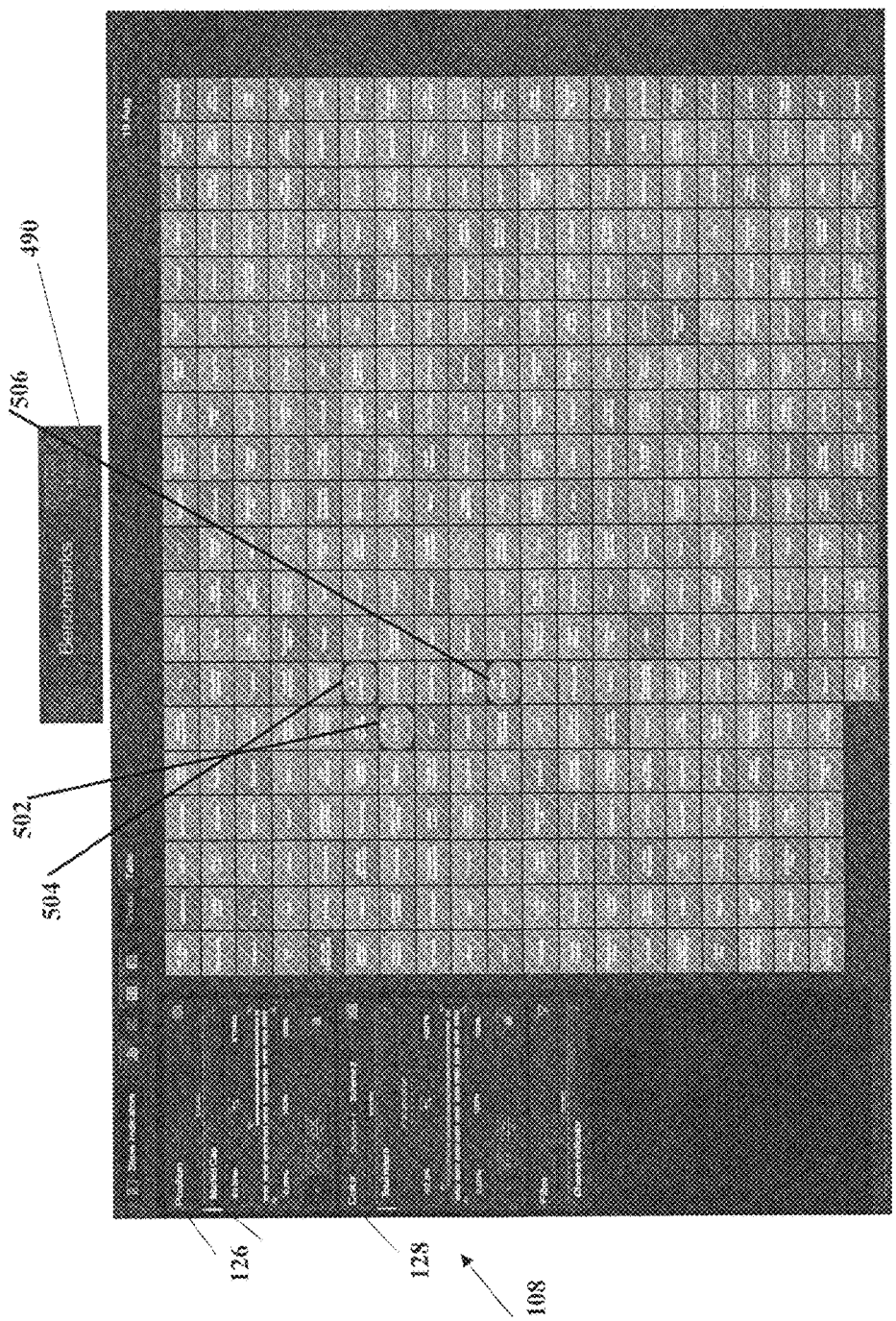
FIG. 13(a) illustrates a benchmark selection of the luxury goods sector; in accordance with one embodiment.
Figure 13:
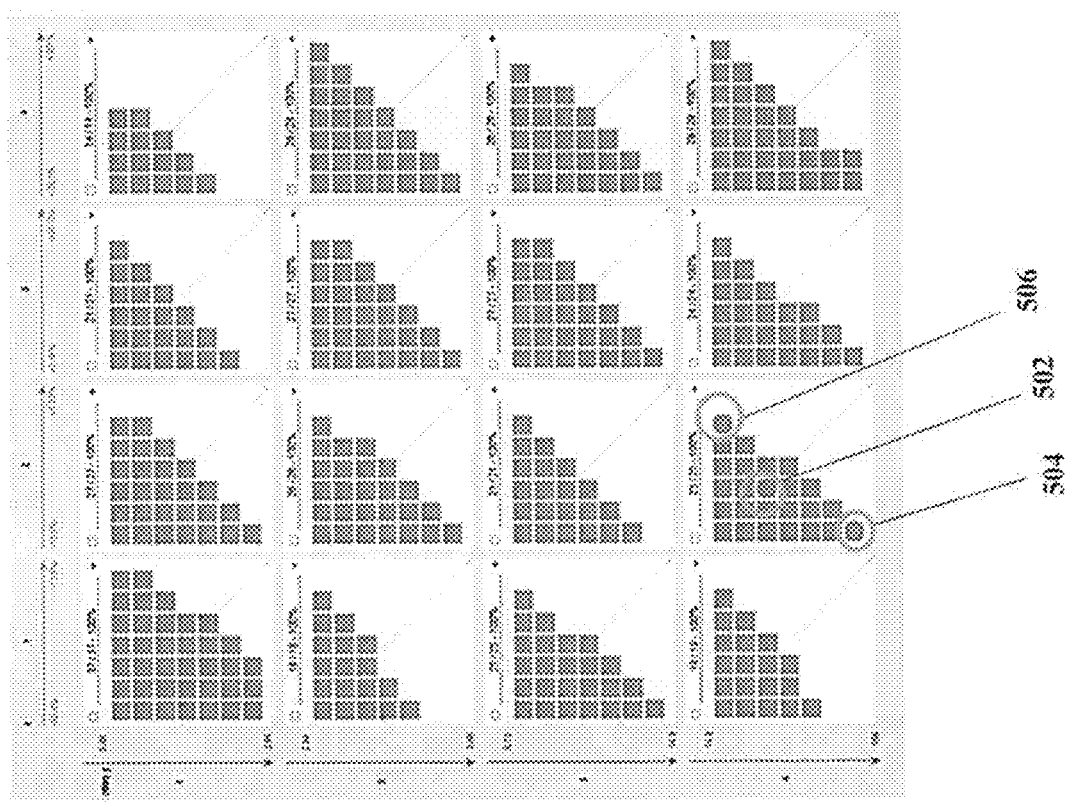
FIG. 13(b) illustrates the same selected benchmarks as viewed on a quartile chart, in accordance with one embodiment.

In accordance with another embodiment, all picking views allow the user to see the position of stocks relative to one or more selected benchmarks. In accordance with one embodiment, a benchmark is a stock index (national or international), a country or a sector. As illustrated in FIG. 13(*a*), the user selects as one benchmark the Luxury Goods sector.

The benchmark function can be activated by selecting benchmark button 490 (FIG. 1) and FIG. 13(*a*) on the navigation bar. The benchmark value is computed using median of the components' values for the selected indicators. As a result, the benchmark is represented as a tile with a distinctive spatial position or color which convey to the user the relative position of the benchmark compared to the stocks of the selected universe. In one example, the user also selects as benchmark, European stock indices, such as CAC 40 and Stoxx Europe 50 equity indices. Although the selected chart for this example is a Rank Chart, it is appreciated that in accordance with other embodiments, benchmarks can be visualized in other picking views as well.

Depending on the choice of the indicators, display 80 allows the user to visualize the ranking of the benchmarks compared to the selected Universe. For example, the indicator for the Position slot is Market Cap and the indicator for the Color slot is Total Return. Tile 502 which is shown as a circle tile represents the median of CAC 40 index components, whose position reflects Market Cap and whose color reflects Total Return. Tile 504 represents the median of the Luxury Goods sector, whose position reflects Market Cap and whose color reflects Total Return, while tile 506 represents the median of the Stoxx Europe 50 components, whose position reflects Market Cap and whose color reflects Total Return.

FIG. 13(*b*) illustrates the same selected benchmarks as viewed on a Quartile Chart showing circle tiles 502,504 and 506 representing the benchmarks.

Additional navigation features available at display 80 (FIG. 1) include zoom functionality through buttons 491, 493 and 495, where the user can zoom in and out of various views for more detailed images. Highlight list button 497 provides the functionality discussed in connection with right panel 80 as discussed above in reference with FIG. 1 and FIG. 12(*a*).

Figure 14:
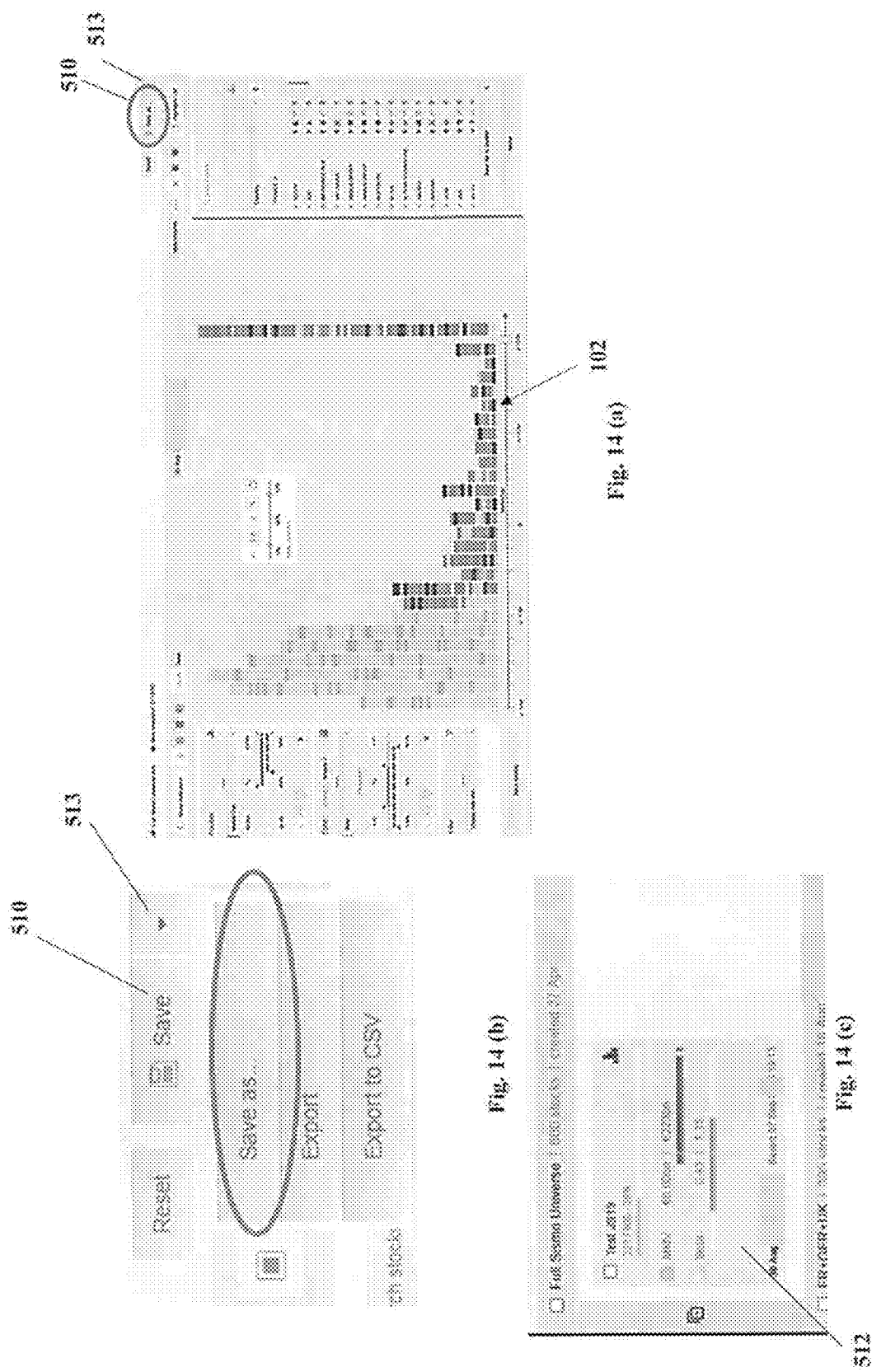
FIGS. 14(a) through 14(c) illustrate the arrangement where a user's desired analysis and its corresponding results can be saved as snapshots, in accordance with one embodiment.

In accordance with one embodiment FIGS. 14(*a*) through 14(*c*) illustrate the arrangement where a user's desired analysis and its corresponding results can be saved as snapshots. As illustrated in FIG. 14(*a*) a user may have performed an analysis based on a selection of two indicators (for the example illustrated) and the relevant slider ranges, in response to which Shape Chart 511 is displayed on middle portion 102. The Shape Chart is advantageously referred to as a snapshot.

The user has the possibility to save the currently displaying snapshot with all the corresponding parameters such as date of analysis, the currently selected indicators, slider ranges as specified, by activating save button 510. This snapshot can be later loaded at any time from the Universe management menu. When the user clicks on the down arrow drop down menu as illustrated in FIG. 14(b) appears, allowing the user to save the snapshot page as a file, or to export the information or download the Chart information with their corresponding indicator values to a designated file location. Save button 510 allows the user to override the previous status of the current snapshot (e.g. indicators used, filters applied, date, etc.).

FIG. 14(c) illustrates a snapshot 512 as saved under a filename TestJS19. As illustrated, the information in FIG. 14(c) includes the Universe selected by the user in the bottom of the snapshot, which in this case is a full system's Universe, reflected by the indications in the upper band of FIG. 14(c), that fall within the scope of indicator parameters identified in the snapshot illustration. The snapshots are automatically located to the most left position inside a "Universe" band, each newly created Universe being reflected by a new Universe band. The Universe name is displayed on top of the band.

Figure 15:
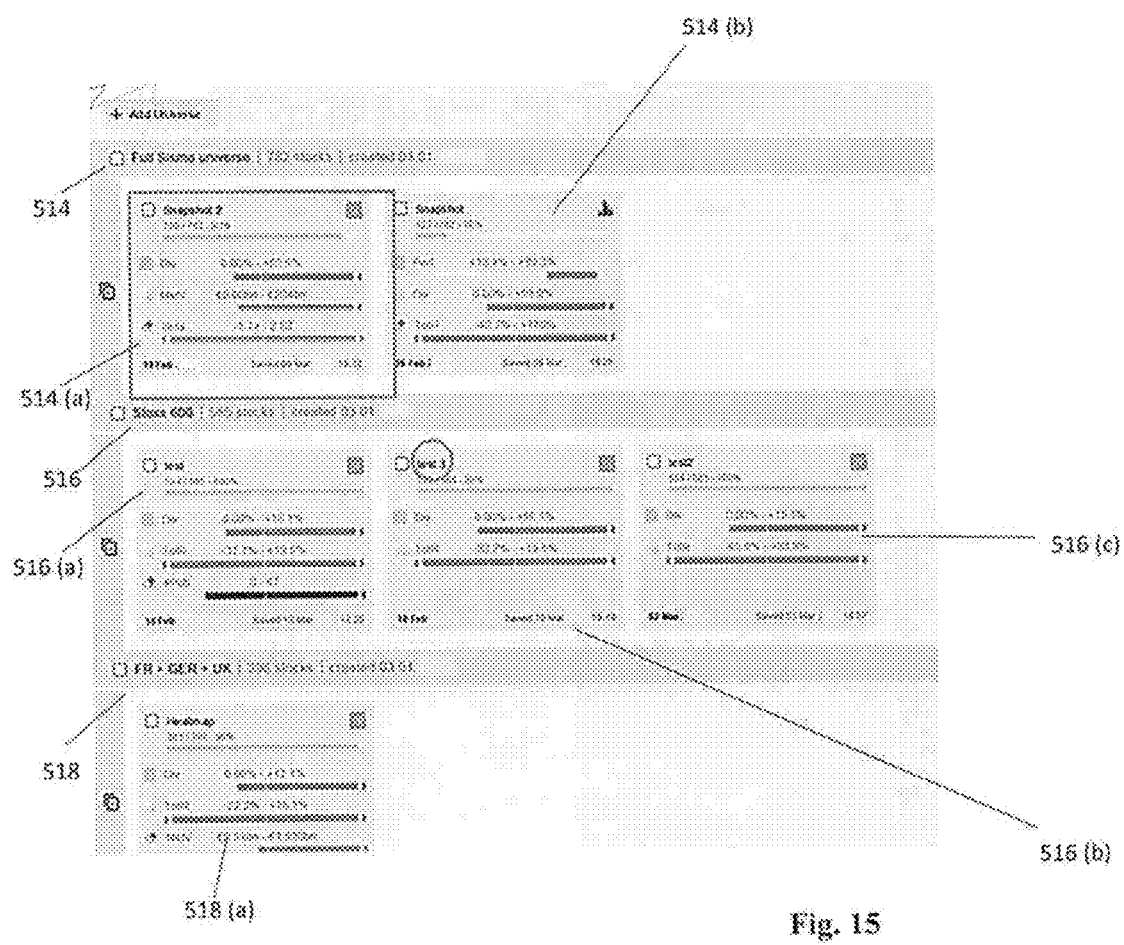
FIG. 15 illustrates an arrangement for managing saved snapshots in various user defined Universes, in accordance with one embodiment.

FIG. 15 illustrates an arrangement for managing saved snapshots in various user defined Universes. As illustrated an exemplary list of Universes may include Stoxx 600 and FR+GER+UK stocks. Full system defined universe is available by default to all users.

The user can visualize in horizontal bands all universes previously created. For example, in each band the user can see the snapshots that were previously saved with many underlying information that are available at a glance, such as the snapshot name, number of stocks within the indicators' value ranges specified and date of the analysis. To this end, within the full system Universe the user has saved two snapshots, whereas within the Stoxx 600 Universe, the user has saved three snapshots and within the French, German, UK Universe the user has saved only one snapshot.

Figure 16:
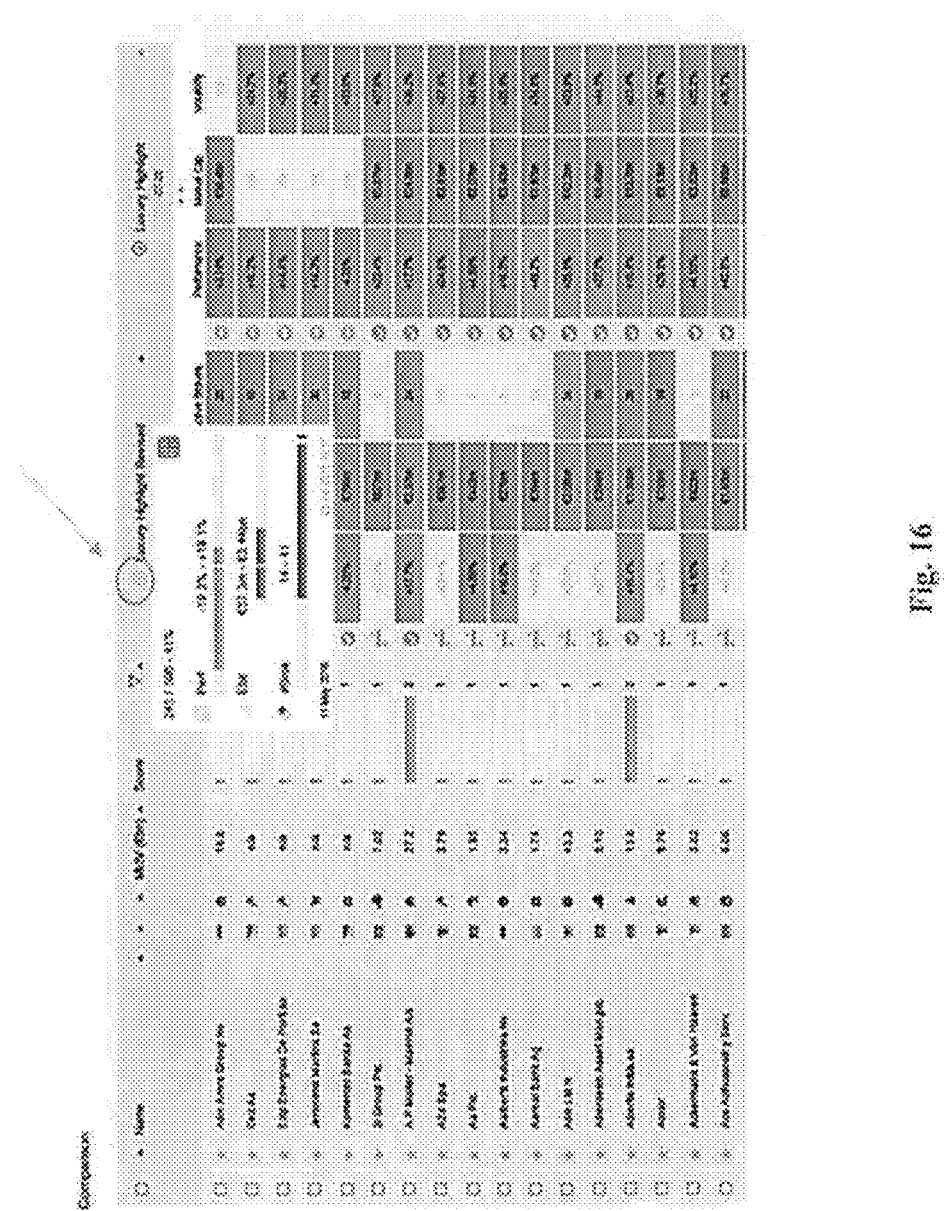
FIG. 16 illustrates an exemplary display to perform a comparison analysis, in accordance with one embodiment.

In accordance with another embodiment, the user can left click on or input any snapshot name to reload it or select multiple snapshots and/or universes to perform a comparison analysis. Thus as illustrated in FIG. 16, the user can load multiple snapshots (in this example 2 snapshots) and see in each line the corresponding indicators values for each stock and see whether the stock was within the criteria specified or not (greyed out fonts and black background). A summary of each snapshot criteria is available by tooltip on the information icon. Stocks can be selected and then exported to create a new list.

Furthermore as illustrated in FIG. 16, stocks with highest scores are stocks that are visible in the highest number of snapshots among the snapshots selected for comparison purpose. Each horizontal band conveys the indicator values, relative positioning using color background and black background with grey fonts for absence of value or for indicators values outside a selected range.

In this example, only two snapshots were selected so that the highest score is 2 meaning that the stock is visible in both snapshots, which means that the stock is within the specified range for both snapshots indicators. Icons 517 and 519 respectively show why the stock is or is not visible. As such a Validation icon appearing as a check mark means that the stock is visible within a saved Chart. A Validation icon appearing as a stop sign means that an indicator is not available for the particular stock. A Cursor sign 519 means that an indicator value for a stock is outside a specified range defined by the value sliders.

Figure 17:
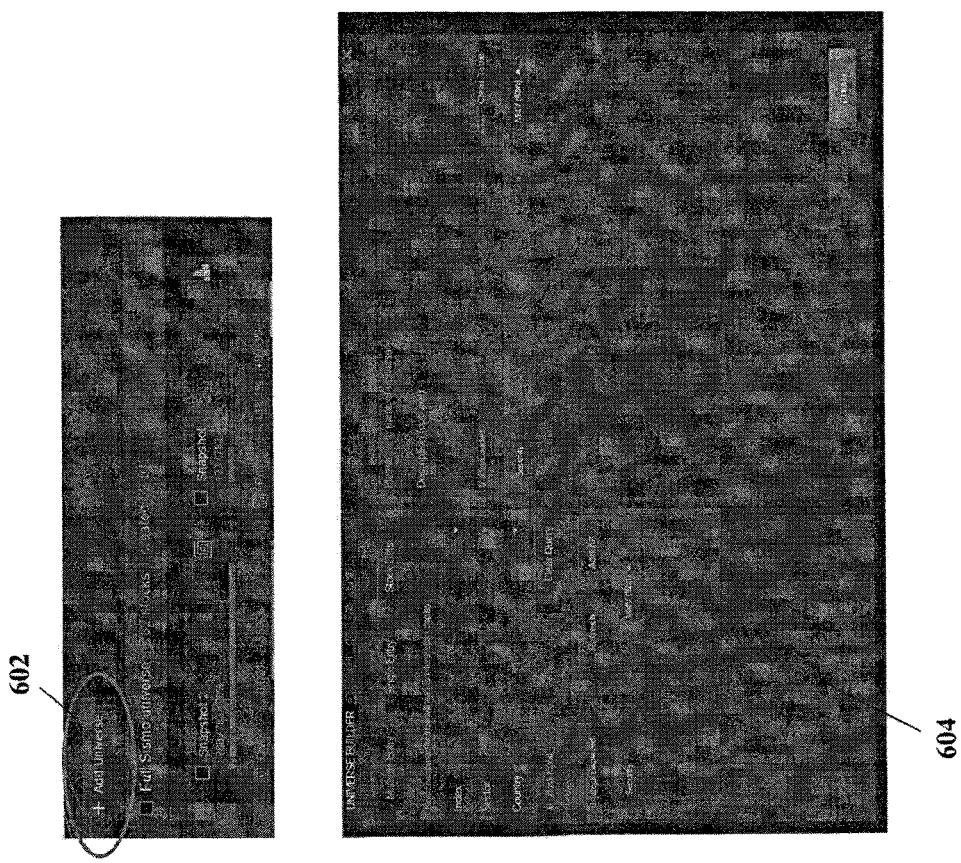
FIG. 17(a) illustrates one example for managing a user's set of multiple Universes, in accordance with one embodiment.
FIG. 17(b) illustrates the arrangement enabling a user to get immediate access to various detailed information about a given stock, in accordance with one embodiment.

FIG. 17(a) illustrates one example for managing a user's set of multiple Universes. When user clicks on the Add Universe button 602, by first activating button 118 in FIG. 1, display 80 provides a visual image of a menu allowing the user to easily build a custom universe of analysis. User can fetch complex intersection of lists based on a desired selection of stock categories. For example the user can define a Universe including stocks of all banks and insurance companies from France, Germany and the UK, and then add some single entries and also add stocks from a previously saved list. This can be accomplished by providing the user's selection on the Universe Builder page 604.

Figure 17B:
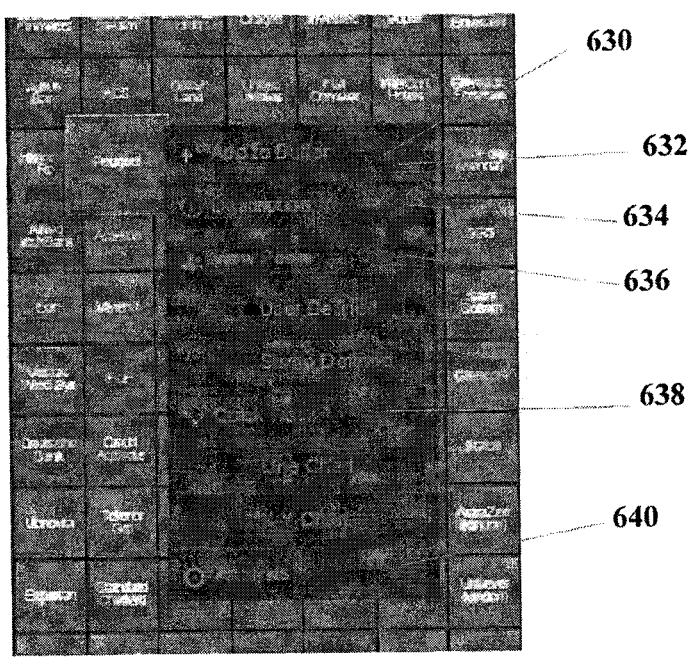

FIG. 17(b) illustrates the arrangement enabling a user to get immediate access to various detailed information about a given stock by pressing a right click or any other activating means relating to a tile that is displayed within a Chart. As illustrated in FIG. 17(b) by pressing a right click on a desired tile, drop down menu appears for the user's control. To this end, the user at field 632 is enabled to add the selected stock in a buffer list so that the stock can be viewed as highlighted on any other chart until it is deleted from the list. Description field 634 loads a screen that provides the most essential information for the selected stock. For field 636 the user can highlight peers of the selected stock, where the peers are based on the system default definition or based on the user-defined list. For field 638, the user can quickly track the historical indicator values of the selected stock by selecting a line chart or by selecting an X/Y chart which would show the historical values of a selected set of two indicators. At field 640 the user can select Analysts option where the system loads a polar chart with consensus and estimates from the financial analysts covering the company on a historical basis through an animation.

Figure 18:
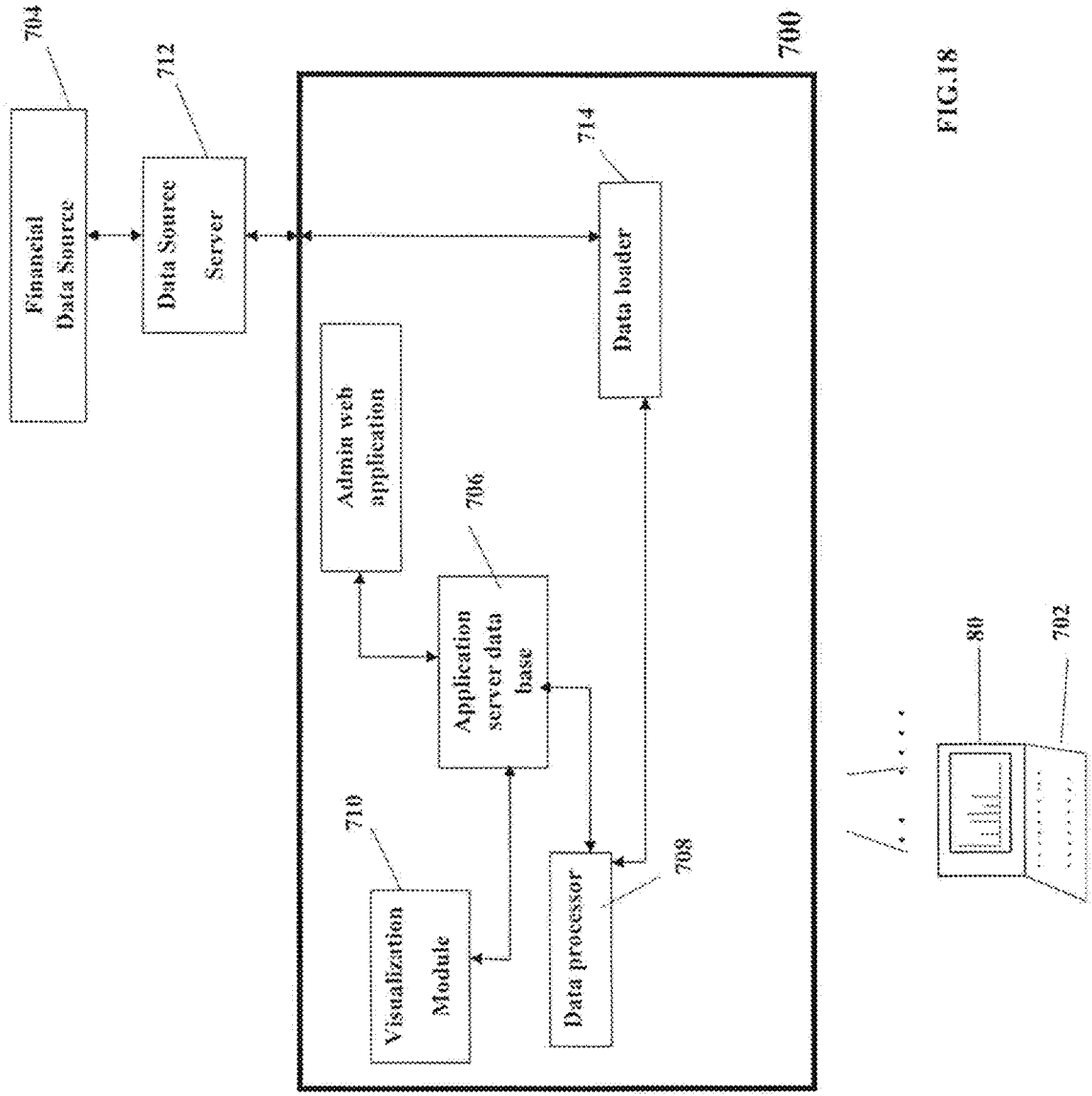
FIG. 18 shows a visualization system for visualizing stocks in three or more dimensions having the features described in reference with FIGS. 1-17, in accordance with one embodiment.

In accordance with one embodiment, the features described in reference with FIGS. 1-17 for visualizing stocks in three or more dimensions a visualization system such as 700 is employed as illustrated by FIG. 18. As it can be appreciated, system 700 can be deployed locally or in the cloud, with access over the Internet. A personal computer or smart screen such as 702 is adapted to communicate with system 700, so as to display the visualization features discussed above on its display 80. A plurality of users can individually communicate with system 700 over the Internet, or directly, each user having the ability to visualize financial information as described before.

System 700 consists of databases and processes involved in the treatment of third party data such as Thomson Reuters and providing visualization tools described above. Financial data source 704 provides all the up to date financial information, along with historic information to system 700. In accordance with one embodiment of the invention, data source 704 can be a commercial data vendor such as Thomson Reuters that provides all the necessary data from various databases like DataStream, WorldScope and I/B/E/S. In accordance with one embodiment, the system 700 is fed by a financial data source server 712 such as a Thomson server with MS SQL Server installed on it. Thomson is in charge of updating data on this server from its own financial data source such as 704, for example by using database replication.

An additional local server 714 acts as a data loader and has a Java Console application installed on it. Data loader 714 runs periodically, such as every night and receives all information that system 700 needs from Thomson database, adjusts or modifies it in some cases and packs it to a zip archive. Data loader 714 fetches all the information regarding each stock and not just updates.

When the data arrives, data processor 708 extracts data from archive and starts to load data to application server database 706 (PostgreSQL). It removes/updates/inserts data.

In the same way as during loader process and in certain cases, adjustments are performed.

When all new data is saved in the application server database 706, data processor 708 calculates indicators For example, it takes all prices for a company and calculates performance for each day. After this process, all performances are saved in the database on a daily basis. For some indicators it may not be necessary to pre-calculate them or they have too many input parameters so the calculations for them are made "on the fly" on each user request. After indicators calculation, data processor 708 performs some maintenance on the database to make data ready to use.

Visualization module also referred to as web application module 710 receives all the necessary information relating to the financial data and assembles the information in such a fashion so as to allow the viewing on each display 80 of a plurality of users.

Figure 19:
Figure 22:
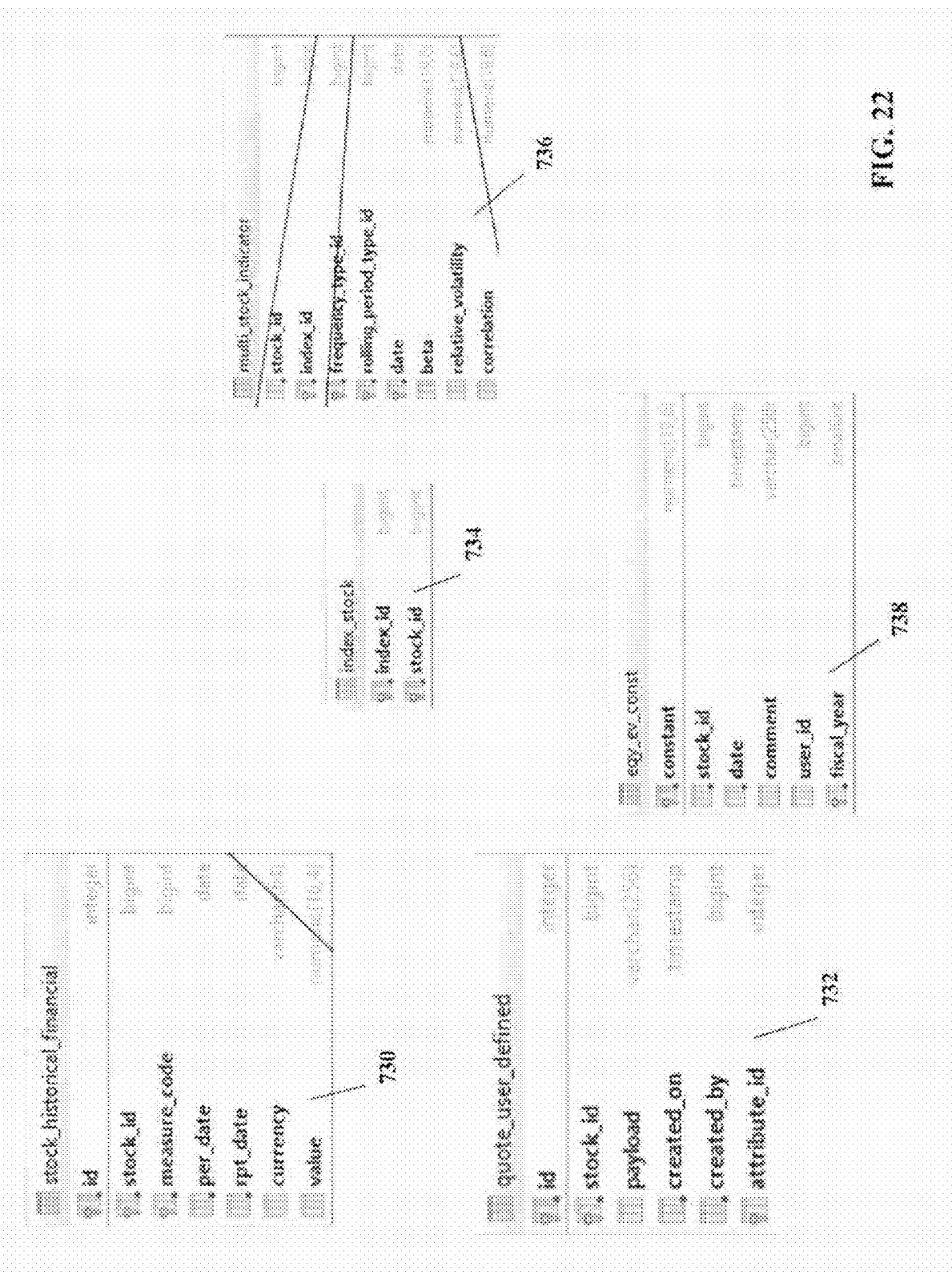

FIGS. 19-30 illustrate the various data tables that server 700 employs so as to prepare the picking views for visualizing stock data as described before. To this end, FIG. 19 illustrates stock financials table 720 that includes the financial information for each of the stocks followed by server 700. Table 720 includes information relating to various indicators available for selection by the user. FIG. 20 includes Stock historical financial table 722 that contains stocks historical information. Table 724 includes information relating to stock forecast consensus. FIG. 21 illustrates tables 726 and 728, relating to stock-target price consensus and stock mean and standard deviation information. As illustrated in FIG. 22, table 730 relates to the stock historical financial information, while table 732 includes information modified by the admin on a given stock like the company name that will be displayed to the user.

Table 734 includes the stock index information, while table 736 and 750 includes precomputed risk indicators like beta, relative volatility, correlation, skewness or kurtosis in order to make computations less intensive. Table 738 includes a quote-user defined information.

FIG. 23, includes stock volume price table 740 that contains mean volume and price precomputed data for each stock for 3, 6, 9 and 12 months past periods at any date in order to make computations less intensive. Table 742 contains stock performance data.

Figure 25:
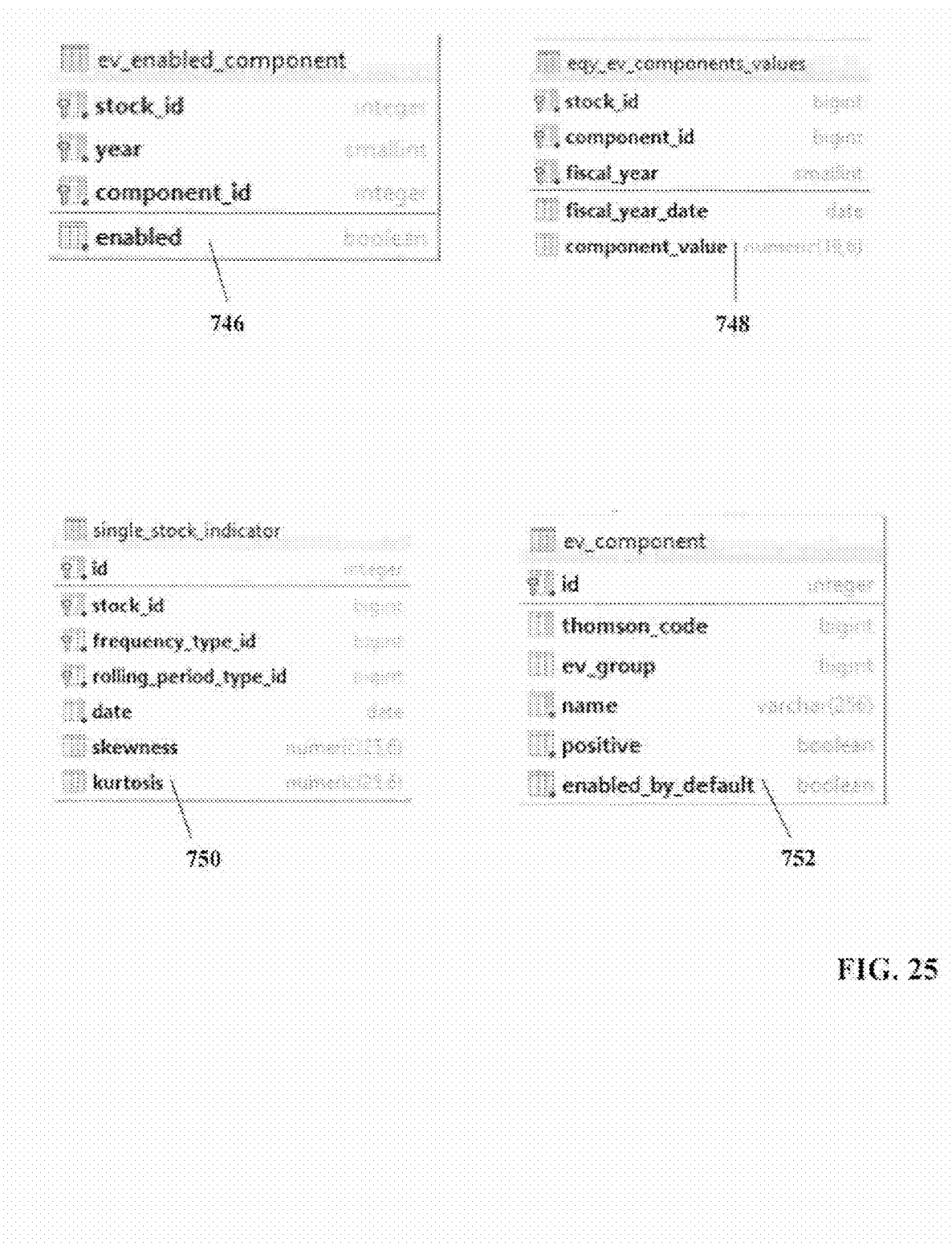

FIG. 24 includes stock-daily table 744, which includes a stock information on a daily basis. Table 744 includes market indicators like the closing price, volume, number of shares, float, dividend, index used to compute total returns and market cap. FIG. 25 includes table 746, 748 and 752 components for Enterprise Value computation.

Figure 26:
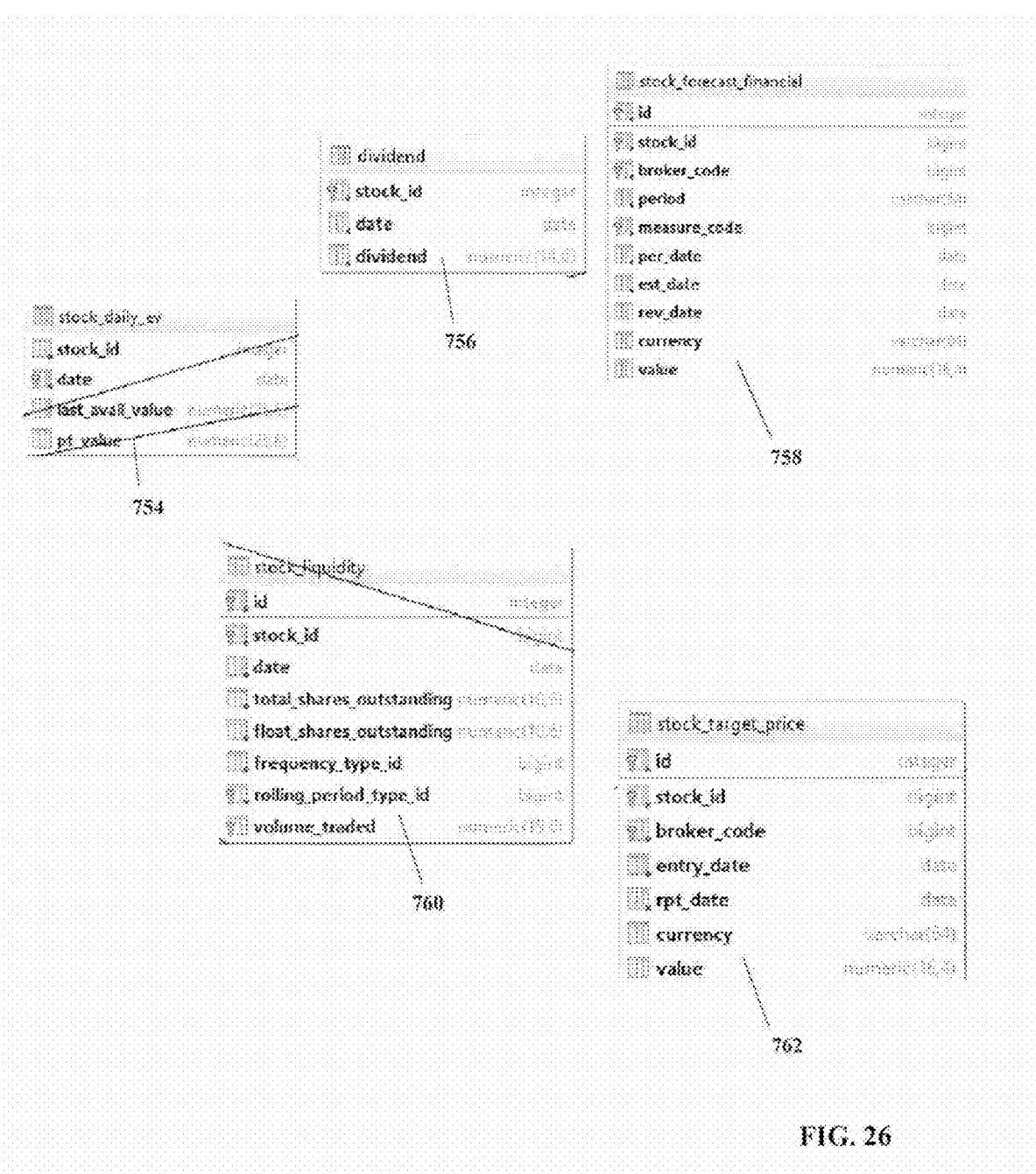

Furthermore, FIG. 26 illustrates tables 754, through 762. Table 754 stores the Enterprise Value computed for each stock, while table 756 includes dividend yields computation. Table 758 includes each broker publication estimates.

Table 760 includes stock liquidity data such as the floating number of shares out of the total shares outstanding and the volume traded on various periods. Table 762 includes each broker Target Price consensus data with information such as the date of estimation, the currency used and the value.

Figure 27:
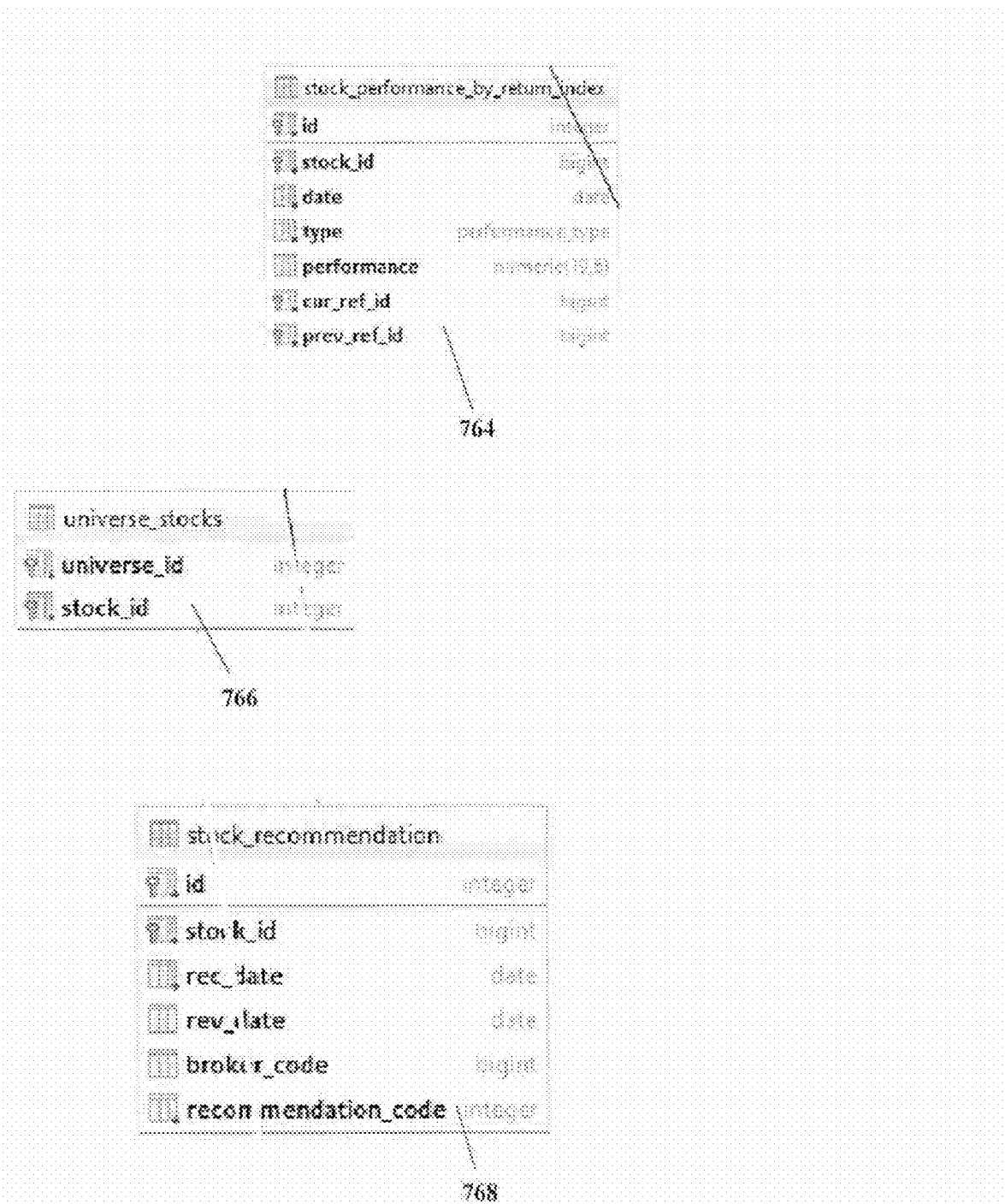

FIG. 27 illustrates tables 764-770. Table 764 stores the Total return computation made for all stocks and table 766 stores relations between universes and stocks so that we can assess which stocks are included in which universe user related table.

Table 768 stores the recommendation (buy hold sell) made by brokers with the date this recommendation was made. Table 772 stores latest fiscal year for any given stock and some other indicators value linked mostly to security detail. Table 776 stores a risk indicator data (volatility).

Figure 28:

FIG. 28 illustrates tables 772-776. Table 774 stores calculated brokers' consensus of recommendation (buy hold sell).

Figure 30:
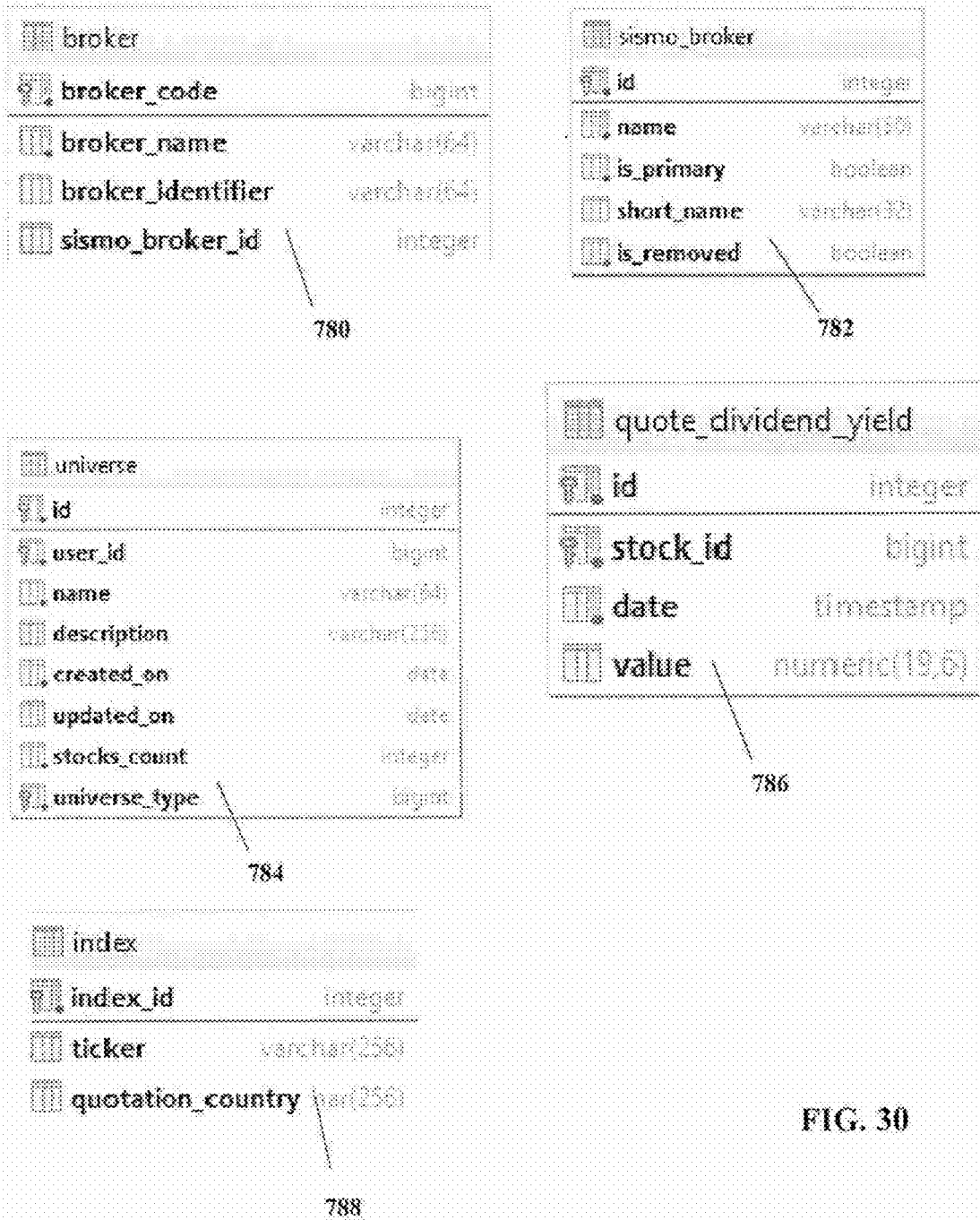

FIG. 29 illustrates table 778 which includes all textual data associated to a given stock like its long and short names, country and currency used. FIG. 30 illustrates Tables 780 through 788. Tables 780 and 782 are brokers' correspondence tables. Table 784 stores universes made by user data. Table 786 stores dividend yield data. Table 788 is a table with country indices list.

Figure 31:
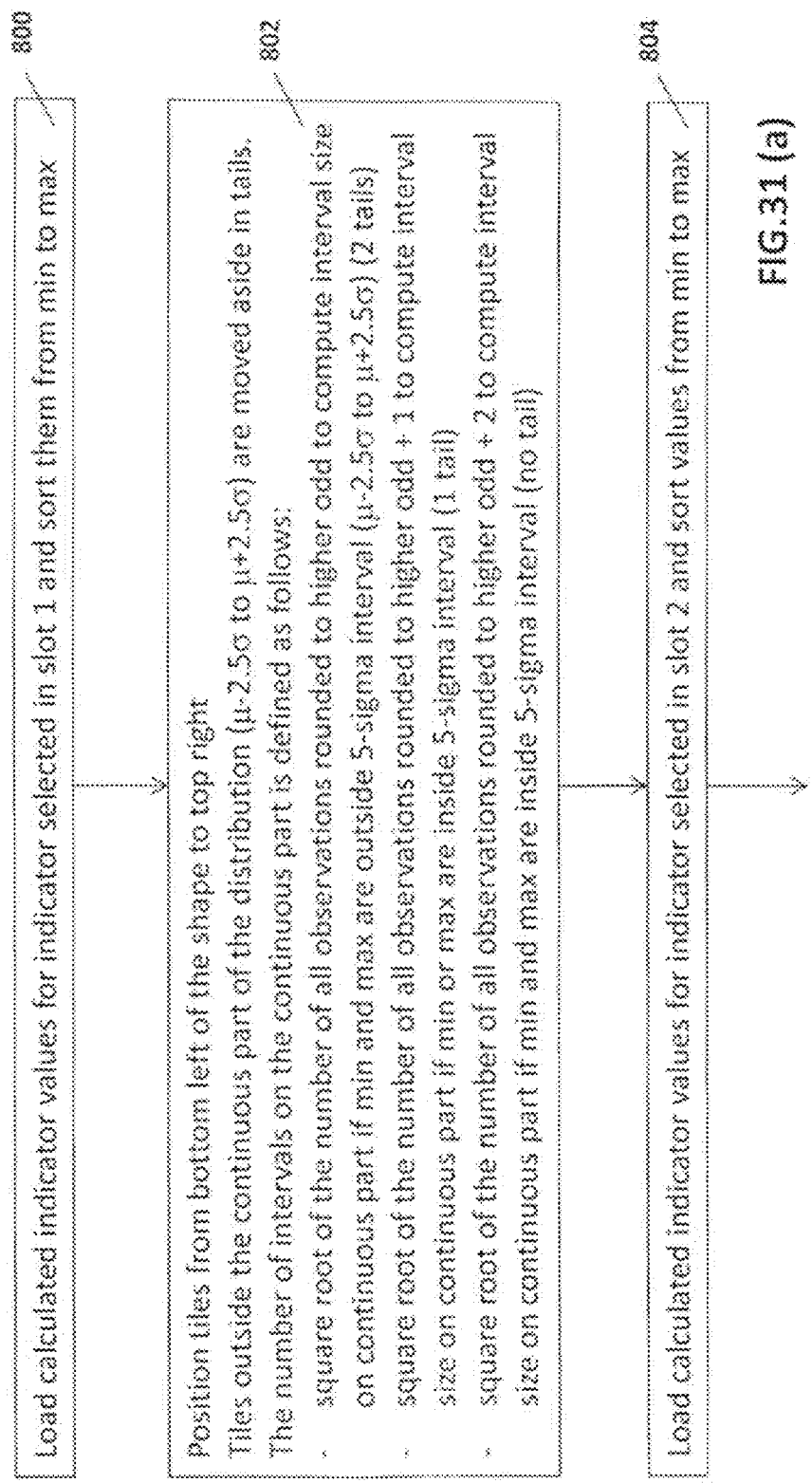
FIG. 31(a) is a flow chart illustrating the steps that data processor 708 follows to create a Shape Chart, in accordance with one embodiment.
FIG. 31(b) is a flow chart illustrating the steps for defining tile background colors, in accordance with one embodiment.
FIG. 31(c) is a flow chart illustrating the steps for creating the Shape Chart, in accordance with one embodiment.
Figure 31:
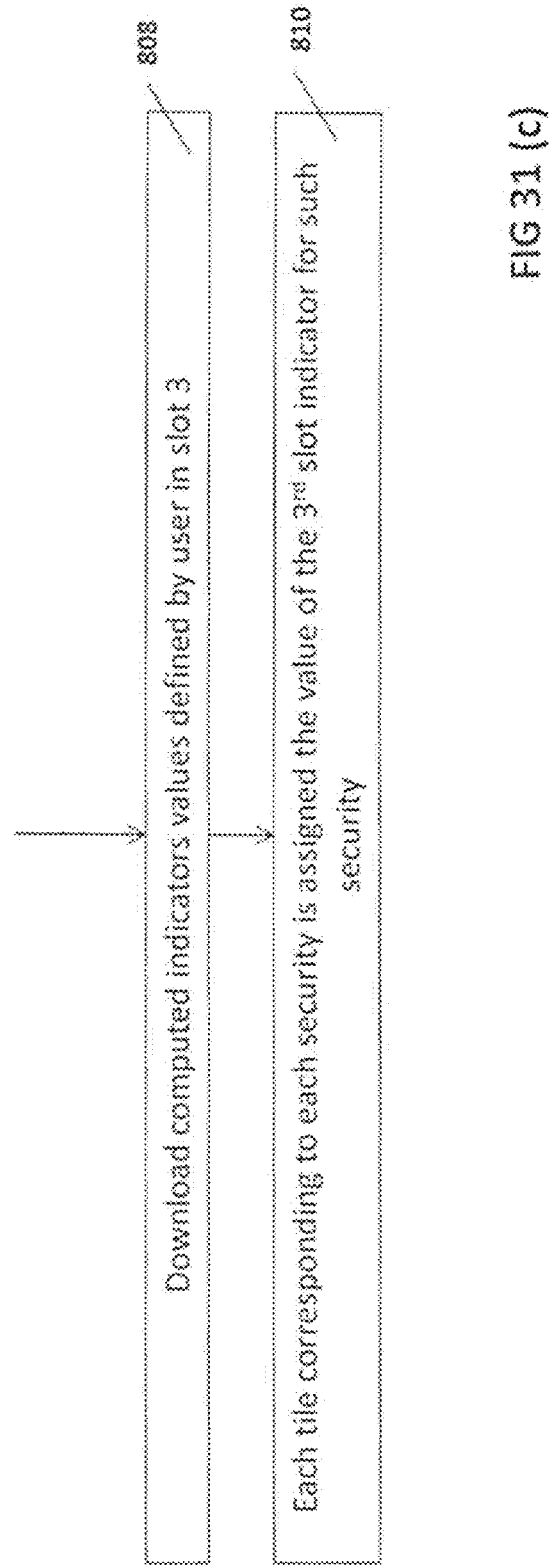

FIG. 31(*a*) is a flow chart illustrating the steps that data processor 708 follows to create a Shape Chart as discussed above. To this end, at step 800, the system for the indicator selected in the Position slot, calculates the indicator values for each stock in the Universe, and sorts them from minimum to maximum. Such indicators values may have been calculated and stored beforehand as explained above in reference to description of daily calculation vs on the fly calculations. At step 802, visualization module 710 positions tiles from bottom left of the shape to top right on display 80. Tiles outside the continuous part of the distribution (m−2.5 s to m+2.5 s) are moved aside in tails.

As explained before, the term continuous here refers to the situation whereby all frequency intervals have the same length expressed in standard deviation (eg steps of 0.5σ). As discussed above in reference with the Space chart, the continuous part relates to the central part of the distribution which by default includes all data included in a ±2.5 standard deviation range by default, although in accordance with other embodiments, the user can adjust the distance in terms of standard deviation is with a movable pad on the Shape chart. Data that do not fall in the continuous interval (whether the one defined by default or the one selected or defined by the user) are vertically grouped (ie one tile on top of the other) in the bottom tail or the top tail.

In accordance with one embodiment, the number of intervals on the continuous part is defined as follows:

square root of the number of all observations rounded to higher odd to compute interval size on continuous part if min and max are outside 5-sigma interval (m−2.5 s to m+2.5 s) (2 tails). In an exemplary situation the Universe of data includes 400 tiles spread between −3 and +4 standard deviation from mean. To this end, the system allocates 21 intervals (square root of 400 rounded to higher odd) and dedicate 1 "interval" to bottom tail at extreme left (that will include all data below mean minus 2.5 sd), 1 to upper tail (that will include all data above mean+2.5 sd), and use the 19 remaining intervals to cover the 5 sd interval between mean−2.5 sd and mean+2.5 sd. In this case each interval will be 0.26 sd wide (5 sd/19). Using odd number allows the system to have the mean at the middle of the central interval.—square root of the number of all observations rounded to higher odd+1 to compute interval size on continuous part if min or max are inside 5-sigma interval (1 tail). In this case there is one tail as one of them is no further than 2.5 sd from mean.

square root of the number of all observations rounded to higher odd+2 to compute interval size on continuous part if min and max are inside 5-sigma interval (no tail). This follows because both tails are actually less than 2.5 sd far from mean.

At step 804, data processor 708 loads calculated indicator values for indicator selected in the color slot and sorts the values from minimum to maximum. As illustrated in FIG. 31(b) at step 806, indicator values selected in color slot define tiles background color. Items are colored with a color gradient defined on two intervals:

From most negative, which in accordance with one embodiment is associated with the red color, to Neutral, which in accordance with one embodiment is associated with the grey color. To this end, the color gradient varies gradually from an intense red to red colors with lesser intensity, until they appear grey;

From Neutral grey color to Positive, which in accordance with one embodiment is associated with the green color. To this end, the color gradient varies gradually from a grey color to green colors with higher intensity.

The color gradient is always used only on the continuous part of the distribution (5-sigma interval). As such, if min (max) value of the distribution is outside 5-sigma interval, discrete part i.e. values between min(xi) and m−2.5 s (m+2.5 s and max(xi)) have a single color: the most negative (positive) one on the whole discrete interval. On the other hand, if min (max) is within the 5-sigma interval, color gradient is set starting from the most negative (positive) color inside the continuous interval.

Each indicator has its own defined point for neutral color. There are 2 categories of indicators: (a) Those indicators that their values are centered around mean; and (2) those indicators that their values are centered around a predefined value, which is any number that is specifically defined, such as 0, for example or a fixed number like 0 or 1 for neutral. For example, if Historical Financials Sales performance is selected as an indicator on color slot the user can see that the neutral color point is indeed the mean value of all historical sales within the selected universe. If however, Performance is selected as an indicator on color slot the user can see that the neutral color point is 0 so that it is not necessarily the mean that is neutral. Mean performance within the selected universe can be below 0 (red) or above (green). Advantageously, the selection of any of the indicators triggers an exemplary algorithm sequence of events as follows:

Calculate edge-values of the 5-sigma interval;

Define centered value, which is either mean or a fixed number like 0 or 1. The fixed number is not necessarily 0 and can be 1 for instance for Beta indicator (a beta of 1 indicates that the security's price moves with the market which is a good reference to define the neutral point.

Use gradient from negative to neutral for items distributed from max(min($x_i$), m−2.5 s) to centered value, where $x_i$ are items in selected population;

Use gradient from neutral to positive for items distributed from centered value to min(max($x_i$), m+2.5 s), where $x_i$ are items in selected population;

If min (max) is outside the 5-sigma interval, use the same single color—the most negative (positive).

At step 808, visualization module 710, provides the computed indicators value defined by user in the filter slot, so that the stocks falling outside the filtering values appear dimmed. Thereafter, at step 810, each tile corresponding to each security is assigned the value of the $3^{rd}$ slot indicator for such security.

Figure 32:
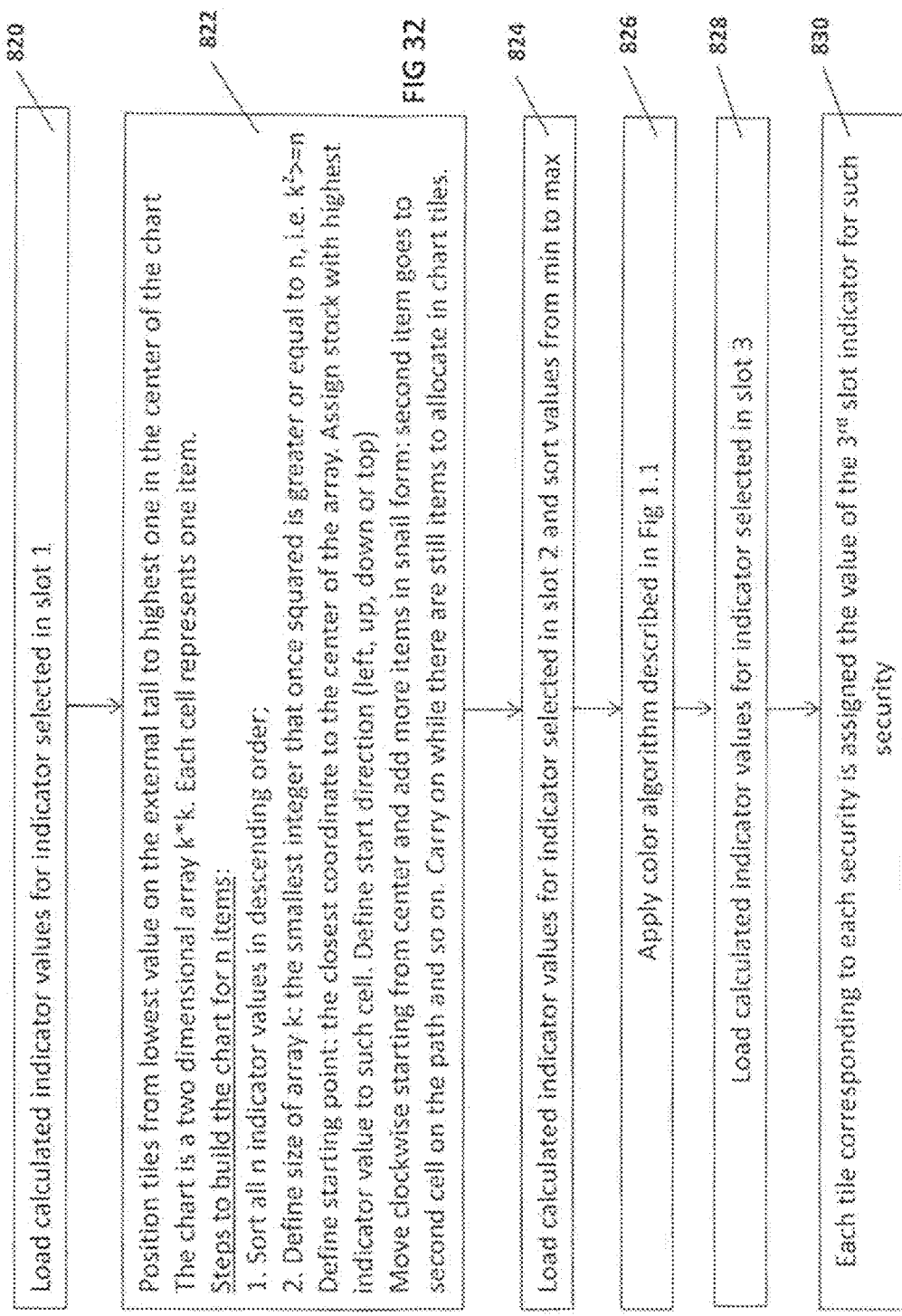
FIG. 32 is a flow chart illustrating the steps for generating a Rank Chart or a heat map, in accordance with one embodiment.

In order to generate a Rank Chart or a heat map, server 700 follow the steps exemplified in FIG. 32(a). In accordance with one embodiment, at step 820, indicator values selected in the position slot are calculated and loaded for further processing.

At step 822, visualization module arranges the tiles for display 80 in such a format where the tile representing the lowest indicator value is positioned on the external tail of the chart and the tile with the highest indicator value is positioned in the center of the chart. As explained before, the chart is a two dimensional array k*k. Each cell representing one item such as a stock. As further illustrated in FIG. 32(a), assuming that the number of stocks for a selected indicator is n, server 700 first sorts all the n indicator values in a descending order, and then defines the size of array k. As such the system defines k as the smallest integer that once squared is greater or equal to n, i.e. $k^2$>=n. Visualization module 710, then defines a starting point, which is the closest coordinate to the center of the array, and assigns the stock with the highest indicator value to that cell. In accordance with one embodiment visualization module 710, defines the start direction as left, up, down or top.

Visualization module 710 then moves clockwise starting from center and adds more items in a snail formation: second item goes to second cell on the path and so on. The system continues as long as there are still items to allocate in the chart tiles.

At step 824, the values for the selected indicator are calculated and loaded for the indicator selected in the color slot. The values are then sorted from minimum to maximum. At step 826, the visualization module applies the same color algorithm to the charts as the one described in reference with step 806 in FIG. 31(b).

At step 828, the values for selected indicator at the third slot, for example, such as the filter slot depicted in FIG. 1 is calculated and loaded. At step 830, each tile corresponding to each security is assigned the value of the $3^{rd}$ slot indicator for such security. Visualization module 710 then determines whether the tile should appear visibly or dimmed depending on whether the values assigned to each stock or security fall within or outside a selected filtering range.

Figure 33:
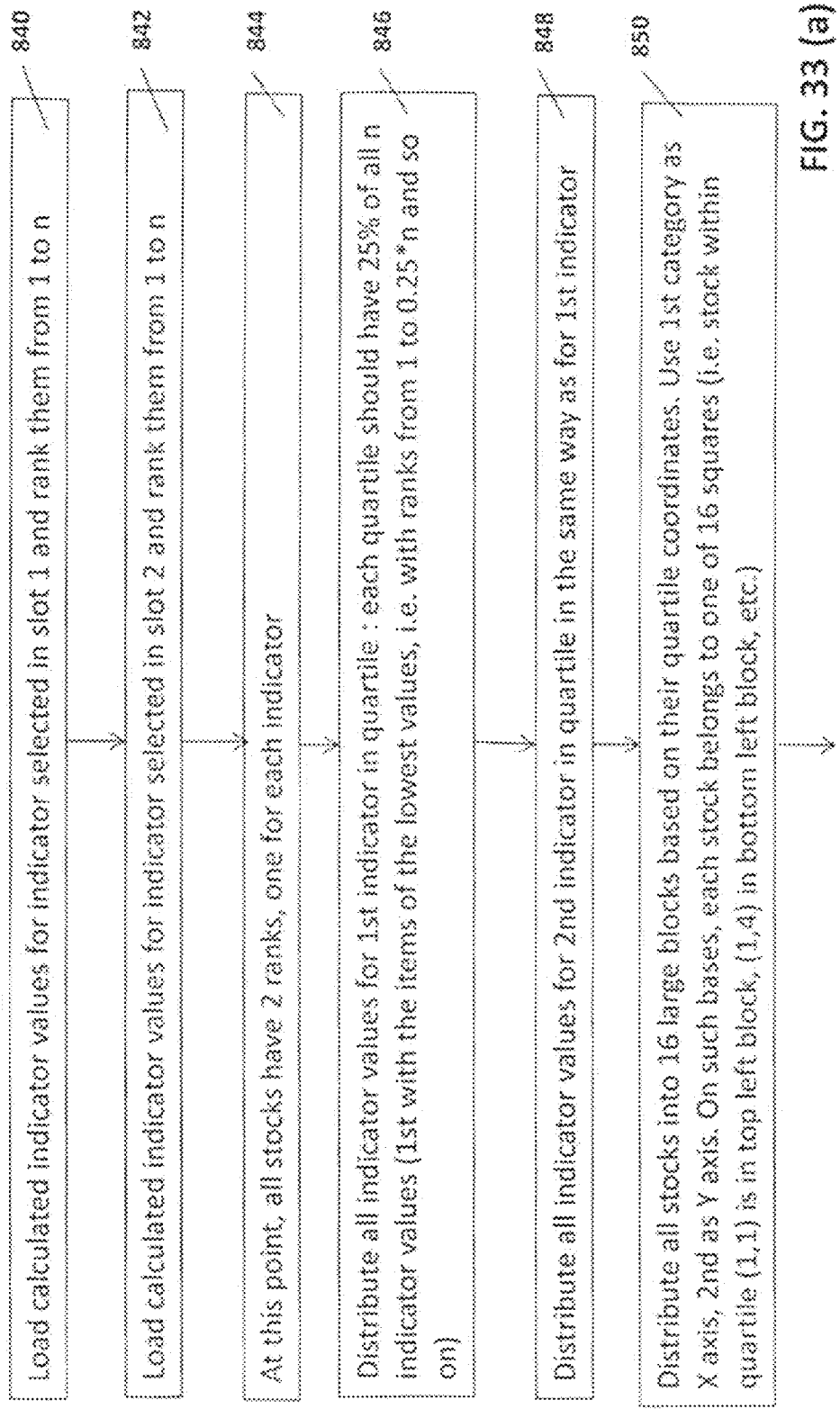
FIG. 33a is a flow chart describing the steps for displaying a Quartile Chart, in accordance with one embodiment.
FIG. 33(b) is a flow chart illustrating steps for creating the Quartile Chart, in accordance with one embodiment.
Figure 33:
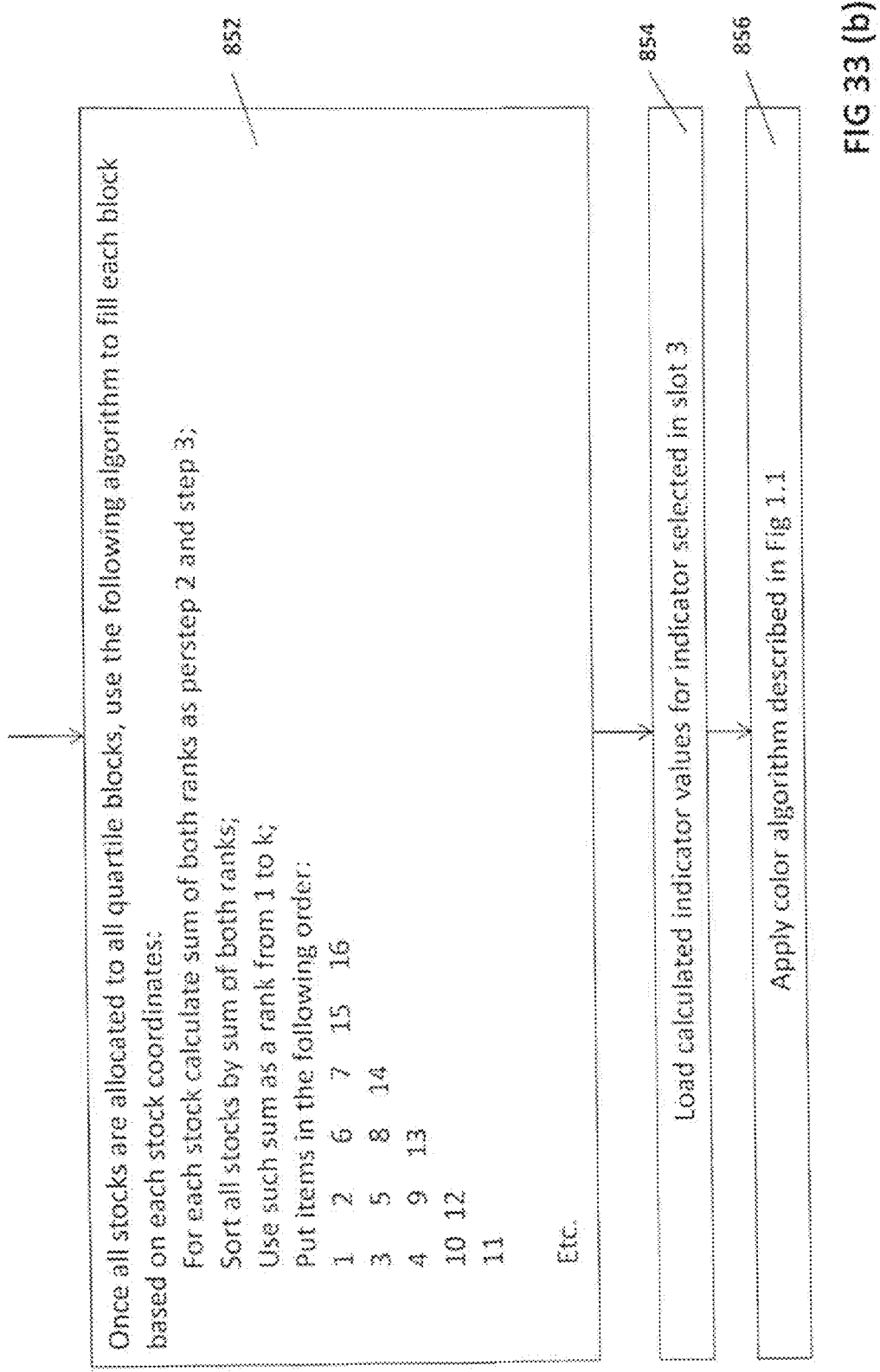

FIG. 33(a) is a flow chart describing the steps for displaying a Quartile Chart. At step 840, the values for a selected indicator in the first Position Slot representing the X or horizontal axis are calculated and loaded. At step 842, the values for another selected indicator in the second Position Slot representing the Y or vertical axis are calculated and loaded. At step 844, visualization module 710 confirms that all the stocks in the selected Universe have 2 ranks, one for each indicator. At step 846, visualization module 710 distributes all indicator values for the first indicator in quartile. Each quartile advantageously has 25% of all indicator values wherein the first quartile contains items of the lowest values with rank 1 to rank n*0.25, where n is the total number of the stocks, and so on.

At step 848, visualization module 710 distributes all indicator values for the second indicator in the quartile, the same way as for the first indicator as described in reference with step 846.

At step 850, all the stocks in the selected Universe are distributed into 16 large sub-quartiles within their corresponding quartile coordinates. The first indicator is used for distribution along the X axis, while the second indictor is used for distribution along the Y axis. To this end, each stock belongs to one of the 16 subdivisions or sub-quartiles. For example, a stock within quartile (1,1) is displayed at the top left block, while a stock within quartile (1,4) is displayed at the bottom left block.

At step 852, once all stocks are allocated to all quartile blocks, visualization module 710 employs the following steps to fill each block based on each stock coordinates:

For each stock, visualization module calculates the sum of both ranks derived at steps 846 and 848. Thereafter, the stocks are sorted based on the sum of both ranks. The stocks are then ranked from 1 to k. Visualization module 710 arranges the stocks in the order illustrated in Table 2 below:

| 1  | 2  | 6  | 7  | 15 | 16 |
|----|----|----|----|----|----|
| 3  | 5  | 8  | 14 |    |    |
| 4  | 9  | 13 |    |    |    |
| 10 | 12 |    |    |    |    |
| 11 |    |    |    |    |    |

At step 854, indicator values for indicator selected in the third slot, such as the filer slot is calculated and loaded. At step 856, each tile is rendered with a color as described in reference with step 806 in FIG. 31(*b*).

Figure 34:
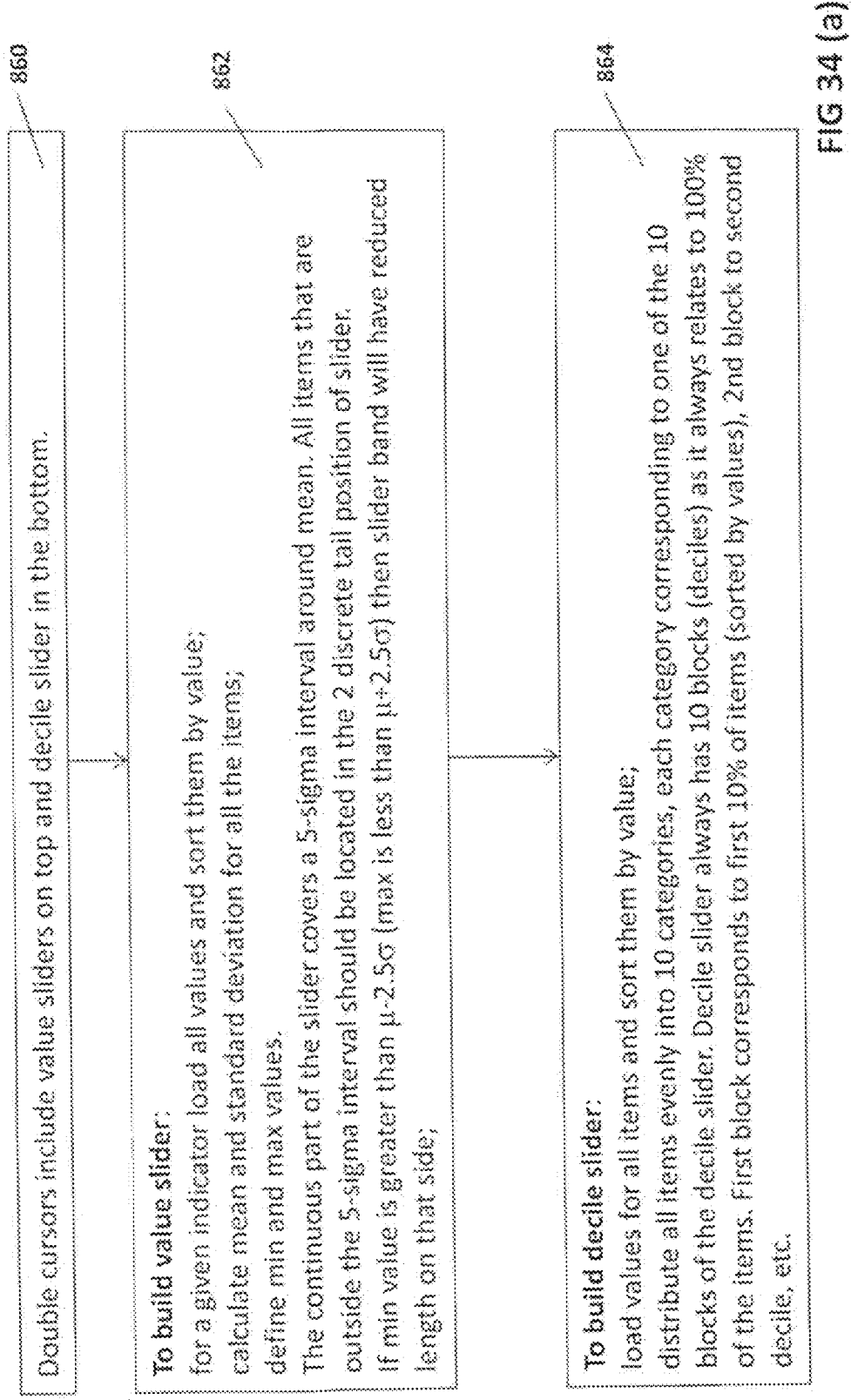
FIG. 34(a) is a flow chart explaining the steps that enable a user to employ the value and decile sliders in accordance with one embodiment.
FIG. 34(b) is a flow chart illustrating the steps for moving or using one or the other value or decile slider, in accordance with one embodiment.
FIG. 34(c) is a flow chart illustrating the steps relating to the bottom decile slide band, in accordance with one embodiment.
Figure 34:
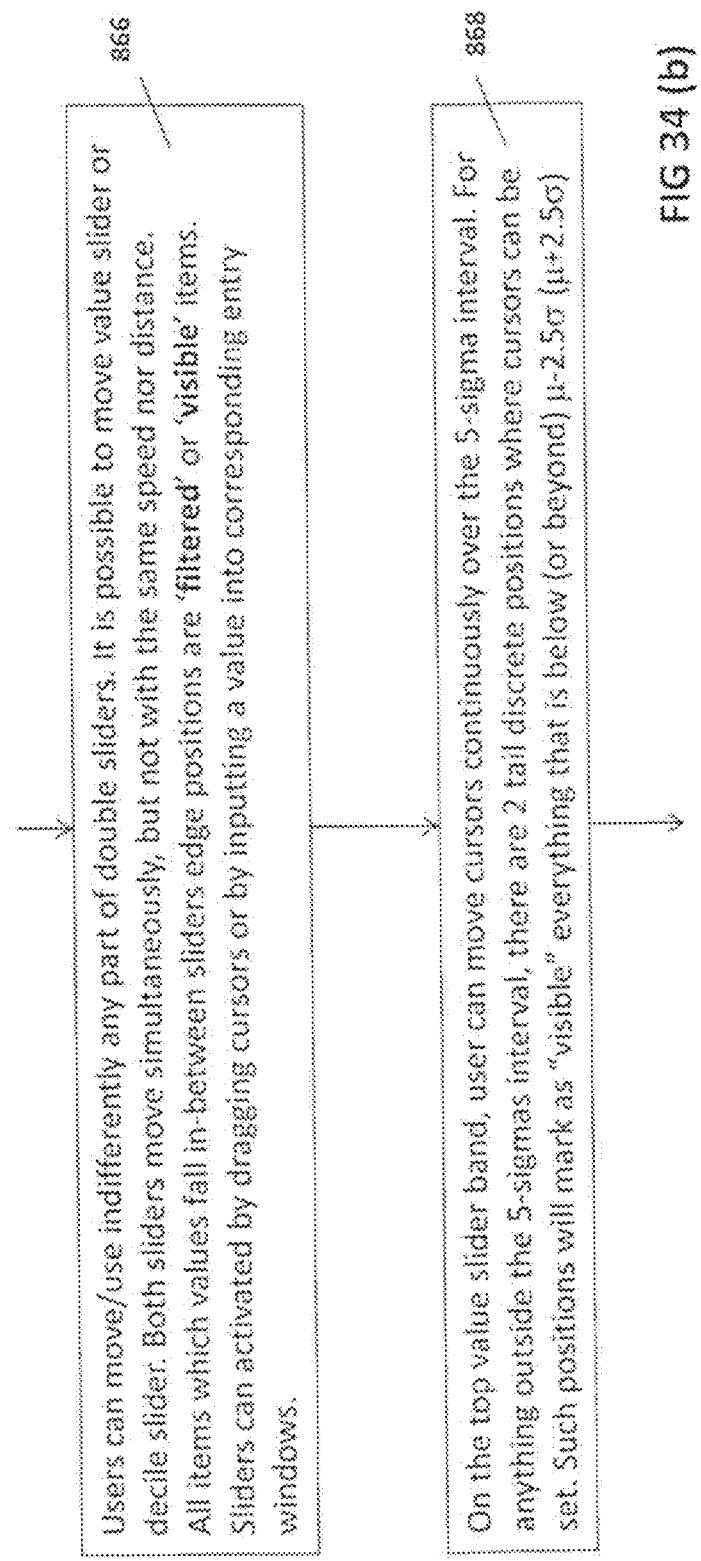

FIG. 34 (*a*) illustrates a flow chart explaining the steps that enable a user to employ the value and decile sliders to allow visualization of stocks based on threshold ranges a user can define for each selected indicator. At step 860, visualization module 710 renders a value slider and a decile slider as explained before in reference with FIG. 5.

At step 862, in order to build the value slider, visualization module 710, for a given indicator loads all values for the selected indicator and sorts them by value. Thereafter, module 710 calculates the mean and standard deviation for all the items. Once the mean and standard deviation has been calculated the minimum and maximum values are identified. Module 710 then separates the stocks that have values within 5 standard deviation or 5-sigma interval around the mean. The stocks that fall within this criterion cover the continuous part of the value and decile sliders. All items that are outside the 5-sigma interval would be located in the 2 discrete tail position of the sliders. If the minimum value is greater than [mean−2.5σ] and maximum value is less than [mean+2.5 a] then the value and decile slider bands would have a reduced length on the side that the minimum or maximum value meet the criteria.

At step 864 in order to build the decile slider, visualization module 710, for a given indicator loads all values for the selected indicator and sorts them by value. Thereafter module 710 distributes all items evenly into 10 categories, each category corresponding to one of the 10 blocks of the decile slider. Decile slider advantageously has 10 blocks (deciles) as it always relates to 100% of the items. First block corresponds to first 10% of items (sorted by values), 2nd block to second decile, etc.

As illustrated in FIG. 34(*b*), at step 866, a user can move/use one or the other value or decile slider. Both sliders move simultaneously, but not with the same speed or distance. Moving one of the sliders enables the other to move automatically. All items which values fall in-between sliders' edge positions are 'filtered' or rendered 'visible'. Sliders can be moved or activated by dragging cursors or by inputting a value into corresponding entry windows.

At step 868, on the top value slider band, user can move cursors continuously over the 5-sigma interval. For any indicator value outside the 5-sigmas interval, there are 2 tail discrete positions where cursors can be set. Such positions will mark as "visible" everything that is below (or beyond) m−2.5 s (m+2.5 s).

At step 870, on the bottom decile slider band, user can filter items based on rank in a sorted array of such items. Dragging left cursor from 0 to 10 will filter out first 10% of items (with ranks from 1 to 0.1*n), further movement from 10 to 20 will filter out additional 10% of population (leaving top 80% of items visible), etc.

As both parts of double sliders work simultaneously, when a value cursor is moved, corresponding position for decile part is calculated and vice versa. For example if value slider is set such as it filters out bottom 35%, then decile slider will move from 0 (extreme left position) to middle of 4th block (decile).

FIG. 35(*a*) is a flow chart for displaying a Matrix Chart. To this end, at step 880, for a selected indicator, the values are calculated and loaded and sorted by value. Thereafter, the items are distributed evenly into 10 categories, each category corresponding to one of the 10 decile column in a Matrix. In accordance with one embodiment, the matrix advantageously has 10 columns or deciles as it relates to 100% of items. First block corresponds to first 10% of items (sorted by values), 2nd to second decile, etc At step 882, the same process described in reference with step 880 is applied to any other indicator selected by the user. At step 884, value and decile slider filtering work in the same manner as for the other charts described in reference with the prior flow charts.

Thus, while there have been shown and described and pointed out fundamental novel features of the invention as applied to alternative embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended thereto.

We claim:
1. A system for displaying a visualization of a financial market, said system comprising:
   a user display device;
   said system receiving financial data belonging to a plurality of stocks from an external data source, said financial data including a plurality of available indicator values, where each indicator value corresponds to an information relevant to said plurality of stocks;
   said system further providing a navigation bar on said user display device, enabling said user to select a plurality of indicators from a list of said available indicator values, for visualization of said indicators on said user's display device; said system providing information for displaying a plurality of tiles on said display device, each tile representing a stock from a selected universe of stocks, wherein each tile includes a multi-dimensional information corresponding to one or more indicators from said user selected indicators,
   wherein a first dimension of information is position of said tile on said display device depending on a value of a first selected indictor, the second dimension of information is the background color of said tile on said display device depending on a value of a second selected indicator and the third dimension is visibility of said tile depending on a value of a third selected indicator,
   wherein, said system further provides, on said display:
   a position slot for said user to select an indicator such that the position of each of said tiles on said display device is determined based on the value of said selected indicator corresponding to said tile;
   a color slot for said user to select an indicator such that the background color of each of said tiles on said display device is determined based on the value of said selected indicator corresponding to said tile; and a filter slot for said user to select an indicator such that the visibility of each of said tiles on said display device is determined based on the value of said selected indicator corresponding to said tile, wherein said system further provides on said display: a selection button that allows a user to view all indicators available for each of said stocks, wherein said system further provides on said display: a selection button that allows a user to select one of a plurality of picking views, wherein one or more of said picking views display a position of each tile relative to all other tiles based on an indicator selected in said position slot, wherein one or more of said picking views display a background color for each tile with an intensity level corresponding to a value of an indicator selected in said color position relative to said indicator value corresponding to the remaining tiles, wherein one or more of said picking views display or hide each tile based on a value of an indicator selected in said filter slot, and wherein one of said picking views is a shape chart, for displaying said tiles as a distribution plot, providing an indication where any given stock stand in an overall distribution.

2. The system in accordance with claim 1 wherein a top right tile represents a stock with the selected indicator having the highest indicator value and a bottom left tile represents a stock with said selected indicator having the lowest indicator value.

3. The system in accordance with claim 2, wherein said system provides a statistical data table for selection by a user for applying a scaling function to said distribution plot.

4. The system in accordance with claim 3, wherein said scaling function is controllable by a user with an option to display a symmetrical distribution plot where tiles are distributed symmetrically from a mean value.

5. The system in accordance with claim 4, where a user has an option to display an asymmetrical distribution plot where the tiles are distributed asymmetrically from a mean value by expressing a size of the left and right distribution tails in percentages.

6. The system in accordance with claim 1, wherein one of said picking views is a rank chart for displaying said tiles with a helicoid arrangement from a center of said display to a periphery of said display, providing an indication where any given stock stand in an overall helicoid arrangement depending on a distance of tile from the center of said display.

7. The system in accordance with claim 1, wherein said system further provides on said display one or more variable slider controls corresponding to said position, color and filter slots, allowing a user to define a range of values for a corresponding selected indicator within which tiles displayed on said display remain visible if each of their corresponding indicator values falls within the value range defined by said slider control.

8. The system in accordance with claim 7, wherein a first slider control receives a range of defined values based on the minimum and maximum values available for a selected indicator.

9. The system in accordance with claim 8, wherein a second slider control receives a range of defined value as a percentage based on the minimum and maximum values available for a selected indictor.

10. The system in accordance with claim 9, wherein a change of values of either one of said first and second slider controls proportionally varies the value of the other slider control.

11. The system in accordance with claim 10 further comprising a reverse ranking button displayed on said display, so as to reverse the default order of a selected indicator on said display chart.

12. The system in accordance with claim 10, further comprising a benchmarking option, wherein a tile representing a defined benchmark is displayed among said plurality of tiles based on a mean indicator value of said benchmark.

13. A system for displaying a visualization of a financial market, said system comprising:

a user display device;

said system receiving financial data belonging to a plurality of stocks from an external data source, said financial data including a plurality of available indicator values, where each indicator value corresponds to an information relevant to said plurality of stocks;

said system further providing a navigation bar on said user display device, enabling said user to select a plurality of indicators from a list of said available indicator values, for visualization of said indicators on said user's display device;

said system providing information for displaying a plurality of tiles on said display device, each tile representing a stock from a selected universe of stocks, wherein each tile includes a multi-dimensional information corresponding to one or more indicators from said user selected indicators, wherein a first dimension of information is a horizontal position of said tile on said display device depending on a value of a first selected indictor, the second dimension of information is a vertical position of said tile on said display device depending on a value of a second selected indicator and the third dimension of information is the background color of said tile on said display device depending on a value of a third selected indicator, wherein said system further provides on said display: a selection button that allows a user to view all indicators available for each of said stocks, wherein said system further provides on said display: a selection button that allows a user to select one of a plurality of picking views, wherein one or more of said picking views display a position of each tile relative to all other tiles based on an indicator selected in said position slot, wherein said further provides on said display one or more variable slider controls corresponding to said first and second positions, and color slots, allowing a user to define a range of values for a corresponding selected indicator within which tiles displayed on said display remain visible if each of their corresponding indicator values falls within the value range defined by said slider control, wherein a first slider control receives a range of defined values based on the minimum and maximum values available for a selected indicator, wherein a second slider control receives a range of defined value as a percentage based on the minimum and maximum values available for a selected indictor, and wherein a change of values of either one of said first and second slider controls proportionally varies the value of the other slider control.

14. The system in accordance with claim 13 further comprising a reverse ranking button displayed on said display, so as to reverse the default order of a selected indicator on said display chart.

15. The system in accordance with claim 13, further comprising a benchmarking option, wherein a tile representing a defined benchmark is displayed among said plurality of tiles based on a mean indicator value of said benchmark.

16. A system for displaying a visualization of a financial market, said system, comprising:
   a user display device;
   said system receiving financial data belonging to a plurality of stocks from an external data source, said financial data including a plurality of available indicator values, where each indicator value corresponds to an information relevant to said plurality of stocks;
   said system providing a navigation bar on said user display device, enabling said user to select a plurality of indicators from a list of said available indicator values, for visualization of said indicators on said user's display device;
   said system further providing information for displaying a plurality of tiles on said display device, each tile representing a stock from a selected universe of stocks said display having a plurality of position slots for said user to select an indicator such that said tiles are presented in a matrix arrangement with a horizontal axis divided into a plurality of columns and a vertical axis divided into a plurality of rows, wherein a selected number of rows is allocated for each of said position slots and each tile populates said columns and said selected number of rows based on its indicator value,
   wherein said system further provides on said display one or more variable slider controls corresponding to said first and second positions, and color slots, allowing a user to define a range of values for a corresponding selected indicator within which tiles displayed on said display remain visible if each of their corresponding indicator values falls within the value range defined by said slider control,
   wherein a first slider control receives a range of defined values based on the minimum and maximum values available for a selected indicator,
   wherein a second slider control receives a range of defined value as a percentage based on the minimum and maximum values available for a selected indictor, and
   wherein a change of values of either one of said first and second slider controls proportionally varies the value of the other slider control.

17. The system in accordance with claim 16 further comprising a reverse ranking button displayed on said display, so as to reverse the default order of a selected indicator on a display chart.

18. The system in accordance with claim 16, further comprising a benchmarking option, wherein a tile representing a defined benchmark is displayed among said plurality of tiles based on a mean indicator value of said benchmark.

* * * * *